US010623590B2

(12) United States Patent
Odagaki et al.

(10) Patent No.: US 10,623,590 B2
(45) Date of Patent: Apr. 14, 2020

(54) IMAGING APPARATUS, METHOD FOR CONTROLLING THE SAME, AND IMAGING SYSTEM

(71) Applicant: CANON KABUSHIKI KAISHA, Tokyo (JP)

(72) Inventors: Koichi Odagaki, Kawasaki (JP); Shinga Nakashima, Yokohama (JP); Katsuhiro Doshin, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 81 days.

(21) Appl. No.: 15/867,497

(22) Filed: Jan. 10, 2018

(65) Prior Publication Data

US 2018/0205836 A1    Jul. 19, 2018

(30) Foreign Application Priority Data

Jan. 16, 2017   (JP) ................................. 2017-005095
Jan. 16, 2017   (JP) ................................. 2017-005273
Jan. 16, 2017   (JP) ................................. 2017-005279
Jan. 16, 2017   (JP) ................................. 2017-005322

(51) Int. Cl.
| H04N 1/00 | (2006.01) |
| H01R 24/62 | (2011.01) |
| H04N 5/225 | (2006.01) |
| G06F 13/42 | (2006.01) |
| H04N 5/232 | (2006.01) |
| H01R 107/00 | (2006.01) |

(52) U.S. Cl.
CPC ..... *H04N 1/00127* (2013.01); *G06F 13/4282* (2013.01); *H01R 24/62* (2013.01); *H04N 5/2256* (2013.01); *H04N 5/23203* (2013.01); *G06F 2213/0042* (2013.01); *H01R 2107/00* (2013.01); *H04N 2201/0063* (2013.01)

(58) Field of Classification Search
CPC .......... H04N 1/00127; H04N 5/23203; H04N 5/2256; H04N 2201/0063; G06F 13/4282; G06F 2213/0042; G06F 2213/4282; G06F 2213/4022; H01R 24/62; H01R 2107/00
See application file for complete search history.

(56) References Cited

U.S. PATENT DOCUMENTS

| 2012/0274269 A1* | 11/2012 | Ohkuma | H02J 7/047 320/107 |
| 2015/0303724 A1* | 10/2015 | Lin | H02J 7/0052 320/162 |
| 2018/0060270 A1* | 3/2018 | Schnell | G06F 13/4282 |

FOREIGN PATENT DOCUMENTS

JP    2013207325 A    10/2013

* cited by examiner

*Primary Examiner* — Yogesh K Aggarwal
(74) *Attorney, Agent, or Firm* — Canon U.S.A., Inc., IP Division

(57) ABSTRACT

An imaging apparatus includes a USB connector compliant with a USB standard, and is configured to be electrically connectable to a device including an adaptor apparatus via the USB connector. The imaging apparatus includes a system control circuit that detects whether the adaptor apparatus is electrically connected via the USB connector, and a switch that performs processing for changing a signal group to be assigned to terminals of the USB connector, according to a result of detection by the system control circuit.

21 Claims, 30 Drawing Sheets

FIG.9A

| | A1 | A2 | A3 | A4 | A5 | A6 | A7 | A8 | A9 | A10 | A11 | A12 |
|---|---|---|---|---|---|---|---|---|---|---|---|---|
| | GND | TX1+ | TX1- | VBUS | CC | D+ | D- | STROBE DET SW | VBUS | STROBE CLOCK | STROBE TX | GND |
| | GND | RX1+ | RX1- | VBUS | STROBE FLASH | EF CLOCK | SW2 | SW1 | VBUS | EF CHIP SELECT | STROBE RX | GND |
| | B12 | B11 | B10 | B9 | B8 | B7 | B6 | B5 | B4 | B3 | B2 | B1 |

FIG.9B

| | A1 | A2 | A3 | A4 | A5 | A6 | A7 | A8 | A9 | A10 | A11 | A12 |
|---|---|---|---|---|---|---|---|---|---|---|---|---|
| | GND | SW1 | SW2 | VBUS | CC | D+ | D- | STROBE DET SW | VBUS | STROBE CLOCK | STROBE TX | GND |
| | GND | | EF CLOCK | VBUS | STROBE FLASH | | | | VBUS | EF CHIP SELECT | STROBE RX | GND |
| | B12 | B11 | B10 | B9 | B8 | B7 | B6 | B5 | B4 | B3 | B2 | B1 |

FIG.9C

| | A1 | A2 | A3 | A4 | A5 | A6 | A7 | A8 | A9 | A10 | A11 | A12 |
|---|---|---|---|---|---|---|---|---|---|---|---|---|
| | GND | TX1+ | TX1- | VBUS | CC | D+ | D- | SBU1 | VBUS | RX2- | RX2+ | GND |
| | GND | RX1+ | RX1- | VBUS | SBU2 | D- | D+ | CC2 | VBUS | TX2- | TX2+ | GND |
| | B12 | B11 | B10 | B9 | B8 | B7 | B6 | B5 | B4 | B3 | B2 | B1 |

FIG.11A

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | STROBE DET SW | VBUS | STROBE CLOCK | STROBE TX | GND |
| GND | RX1+ | RX1- | VBUS | STROBE FLASH | EF CLOCK | SW2 | SW1 | VBUS | EF CHIP SELECT | STROBE RX | GND |
| B12 | B11 | B10 | B9 | B8 | B7 | B6 | B5 | B4 | B3 | B2 | B1 |

FIG.11B

| A1 | A2 | A3 | A4 | A5 | A6 | A7 | A8 | A9 | A10 | A11 | A12 |
|---|---|---|---|---|---|---|---|---|---|---|---|
| GND | SW1 | SW2 | VBUS | CC1 | D+ | D- | STROBE DET SW | VBUS | STROBE CLOCK | STROBE TX | GND |
| GND |  | EF CLOCK | VBUS | STROBE FLASH |  |  |  | VBUS | EF CHIP SELECT | STROBE RX | GND |
| B12 | B11 | B10 | B9 | B8 | B7 | B6 | B5 | B4 | B3 | B2 | B1 |

FIG.11C

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

FIG.11D

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | STROBE DET SW | VBUS | RX2- | RX2+ | GND |
| GND | RX1+ | RX1- | VBUS | SBU2 | SW2 | SW1 | CC2 | VBUS | TX2- | TX2+ | GND |
| B12 | B11 | B10 | B9 | B8 | B7 | B6 | B5 | B4 | B3 | B2 | B1 |

FIG.11E

| A1 | A2 | A3 | A4 | A5 | A6 | A7 | A8 | A9 | A10 | A11 | A12 |
|---|---|---|---|---|---|---|---|---|---|---|---|
| GND | SW1 | SW2 | VBUS | CC1 | D+ | D- | STROBE DET SW | VBUS | RX2- | RX2+ | GND |
| GND |  |  | VBUS | SBU2 |  |  |  | VBUS | TX2- | TX2+ | GND |
| B12 | B11 | B10 | B9 | B8 | B7 | B6 | B5 | B4 | B3 | B2 | B1 |

FIG.11F

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | SW1 | SW2 | STROBE DET SW | VBUS | RX2- | RX2+ | GND |
| GND | RX1+ | RX1- | VBUS | SBU2 |  |  |  | VBUS | TX2- | TX2+ | GND |
| B12 | B11 | B10 | B9 | B8 | B7 | B6 | B5 | B4 | B3 | B2 | B1 |

FIG.16A

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | STROBE DET SW | VBUS | STROBE CLOCK | STROBE TX | GND |
| GND | RX1+ | RX1- | VBUS | STROBE FLASH | EF CLOCK | SW2 | SW1 | VBUS | EF CHIP SELECT | STROBE RX | GND |
| B12 | B11 | B10 | B9 | B8 | B7 | B6 | B5 | B4 | B3 | B2 | B1 |

FIG.16B

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | STROBE FLASH | SW2 | SW1 | VBUS | TX2- | TX2+ | GND |
| B12 | B11 | B10 | B9 | B8 | B7 | B6 | B5 | B4 | B3 | B2 | B1 |

FIG.16C

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

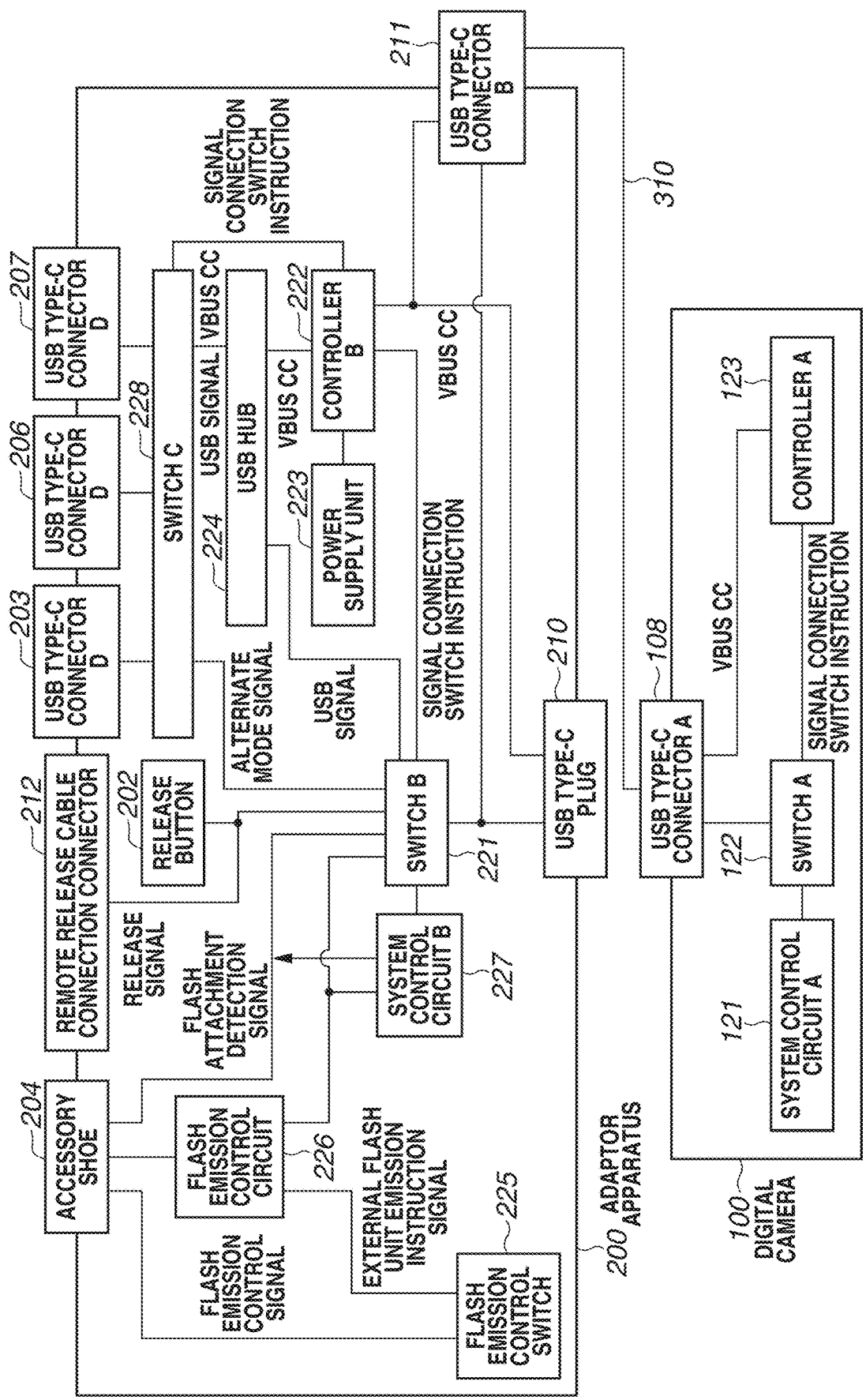

FIG.20A

STATE OF FIGS. 3A AND 18

| | A1 | A2 | A3 | A4 | A5 | A6 | A7 | A8 | A9 | A10 | A11 | A12 |
|---|---|---|---|---|---|---|---|---|---|---|---|---|
| | GND | TX1+ (USB3.1[1]) | TX1- (USB3.1[1]) | VBUS | CC1 | D+ (DEDICATED LINE) | D- (DEDICATED LINE) | SBU1 | VBUS | RX2- (USB3.1[2]) | RX2+ (USB3.1[2]) | GND |
| | GND | RX1+ (USB3.1[1]) | RX1- (USB3.1[1]) | VBUS | SBU2 | STROBE FLASH | SW2 | SW1 | VBUS | TX2- (USB3.1[2]) | TX2+ (USB3.1[2]) | GND |
| | B12 | B11 | B10 | B9 | B8 | B7 | B6 | B5 | B4 | B3 | B2 | B1 |

FIG.20B

STATE OF FIGS. 3B AND 19

| | A1 | A2 | A3 | A4 | A5 | A6 | A7 | A8 | A9 | A10 | A11 | A12 |
|---|---|---|---|---|---|---|---|---|---|---|---|---|
| | GND | SW1 | SW2 | VBUS | CC1 | D+ (DEDICATED LINE) | D- (DEDICATED LINE) | SBU1 | VBUS | RX2- (USB3.1[2]) | RX2+ (USB3.1[2]) | GND |
| | GND | | STROBE FLASH | VBUS | SBU2 | | | | VBUS | TX2- (USB3.1[2]) | TX2+ (USB3.1[2]) | GND |
| | B12 | B11 | B10 | B9 | B8 | B7 | B6 | B5 | B4 | B3 | B2 | B1 |

FIG.20C

STATE OF FIGS. 5 AND 8

| | A1 | A2 | A3 | A4 | A5 | A6 | A7 | A8 | A9 | A10 | A11 | A12 |
|---|---|---|---|---|---|---|---|---|---|---|---|---|
| | GND | TX1+ (USB3.1[1]) | TX1- (USB3.1[1]) | VBUS | CC1 | D+ (USB2.0[1]) | D- (USB2.0[1]) | SBU1 | VBUS | RX2- (USB3.1[2]) | RX2+ (USB3.1[2]) | GND |
| | GND | RX1+ (USB3.1[1]) | RX1- (USB3.1[1]) | VBUS | SBU2 | D- (USB2.0[2]) | D+ (USB2.0[2]) | CC2 | VBUS | TX2- (USB3.1[2]) | TX2+ (USB3.1[2]) | GND |
| | B12 | B11 | B10 | B9 | B8 | B7 | B6 | B5 | B4 | B3 | B2 | B1 |

FIG.24A

STATE OF FIGS. 22A AND 18

| A1 | A2 | A3 | A4 | A5 | A6 | A7 | A8 | A9 | A10 | A11 | A12 |
|---|---|---|---|---|---|---|---|---|---|---|---|
| GND | TX1+ (USB3.1[1]) | TX1- (USB3.1[1]) | VBUS | CC1 | D+ (DEDICATED LINE) | D- (DEDICATED LINE) | AUX+ (ALT COMMUNICATION SIGNAL) | VBUS | DS LANE 0- (ALT COMMUNICATION SIGNAL) | DS LANE 0+ (ALT COMMUNICATION SIGNAL) | GND |
| GND | RX1+ (USB3.1[1]) | RX1- (USB3.1[1]) | VBUS | AUX- (ALT COMMUNICATION SIGNAL) | STROBE FLASH | SW2 | SW1 | VBUS | DS LANE 1+ (ALT COMMUNICATION SIGNAL) | DS LANE 1- (ALT COMMUNICATION SIGNAL) | GND |
| B12 | B11 | B10 | B9 | B8 | B7 | B6 | B5 | B4 | B3 | B2 | B1 |

FIG.24B

STATE OF FIGS. 22B AND 18

| A1 | A2 | A3 | A4 | A5 | A6 | A7 | A8 | A9 | A10 | A11 | A12 |
|---|---|---|---|---|---|---|---|---|---|---|---|
| GND | TX1+ (USB3.1[1]) | TX1- (USB3.1[1]) | VBUS | CC1 | D+ (DEDICATED LINE) | D- (DEDICATED LINE) | SBU1 | VBUS | RX2- (USB3.1[2]) | RX2+ (USB3.1[2]) | GND |
| GND | RX1+ (USB3.1[1]) | RX1- (USB3.1[1]) | VBUS | SBU2 | STROBE FLASH | SW2 | SW1 | VBUS | TX2- (USB3.1[2]) | TX2+ (USB3.1[2]) | GND |
| B12 | B11 | B10 | B9 | B8 | B7 | B6 | B5 | B4 | B3 | B2 | B1 |

FIG. 24C

STATE OF FIGS. 23A AND 19

| A1 | A2 | A3 | A4 | A5 | A6 | A7 | A8 | A9 | A10 | A11 | A12 |
|---|---|---|---|---|---|---|---|---|---|---|---|
| GND | SW1 | SW2 | VBUS | CC1 | D+ (DEDICATED LINE) | D- (DEDICATED LINE) | AUX+ (ALT COMMUNICATION SIGNAL) | VBUS | DS LANE 0- (ALT COMMUNICATION SIGNAL) | DS LANE 0+ (ALT COMMUNICATION SIGNAL) | GND |
| GND | | STROBE FLASH | VBUS | AUX- (ALT COMMUNICATION SIGNAL) | | | | VBUS | DS LANE 1- (ALT COMMUNICATION SIGNAL) | DS LANE 1+ (ALT COMMUNICATION SIGNAL) | GND |
| B12 | B11 | B10 | B9 | B8 | B7 | B6 | B5 | B4 | B3 | B2 | B1 |

FIG. 24D

STATE OF FIGS. 23B AND 19

| A1 | A2 | A3 | A4 | A5 | A6 | A7 | A8 | A9 | A10 | A11 | A12 |
|---|---|---|---|---|---|---|---|---|---|---|---|
| GND | SW1 | SW2 | VBUS | CC1 | D+ (DEDICATED LINE) | D- (DEDICATED LINE) | SBU1 | VBUS | RX2- (USB3.1[2]) | RX2+ (USB3.1[2]) | GND |
| GND | | STROBE FLASH | VBUS | SBU2 | | | | VBUS | TX2- (USB3.1[2]) | TX2+ (USB3.1[2]) | GND |
| B12 | B11 | B10 | B9 | B8 | B7 | B6 | B5 | B4 | B3 | B2 | B1 |

# IMAGING APPARATUS, METHOD FOR CONTROLLING THE SAME, AND IMAGING SYSTEM

BACKGROUND

Field of the Disclosure

The present disclosure relates to an imaging apparatus configured to be electrically connectable to a device including an adaptor apparatus, a method for controlling the same, and an imaging system including the imaging apparatus and the adaptor apparatus.

Description of the Related Art

A digital camera, or imaging apparatus, having a Universal Serial Bus (USB) connector which is a general-purpose connector as an external interface has been known in recent years.

For example, Japanese Patent Application Laid-Open No. 2013-207325 discusses an imaging apparatus that controls a device, such as an external flash unit which is mounted on an accessory shoe, while making a USB connection. The accessory shoe is a configuration of an adaptor apparatus.

In the imaging apparatus discussed in Japanese Patent Application Laid-Open No. 2013-207325, the accessory shoe includes a connector in which dedicated terminals are provided both for signals from a USB control unit and for control signals for controlling the device electrically connected to the imaging apparatus. The imaging apparatus discussed in Japanese Patent Application Laid-Open No. 2013-207325 therefore includes a large number of connector terminals and has a problem of increased connector size.

The imaging apparatus discussed in Japanese Patent Application Laid-Open No. 2013-207325 has a dedicated connector with a dedicated terminal layout. The imaging apparatus is therefore not directly connectable to general electronic devices equipped with a USB communication unit, and thus has an issue of poor versatility.

SUMMARY OF THE DISCLOSURE

The present disclosure is directed to providing a mechanism that enables high versatility of an imaging apparatus making a connection according to a USB standard without an increase in the size of the connector. According to an aspect of the present disclosure, an imaging apparatus including a Universal Serial Bus (USB) connector compliant with a USB standard, the imaging apparatus being configured to be electrically connectable to a device including an adaptor apparatus via the USB connector, includes a first detection unit configured to detect whether the adaptor apparatus is electrically connected via the USB connector, and a signal assignment unit configured to perform processing for changing a signal group to be assigned to terminals of the USB connector according to a result of detection by the first detection unit whether the adaptor apparatus is connected.

Other aspects of the present disclosure include a method for controlling the foregoing imaging apparatus, and an imaging system including the foregoing imaging apparatus and the foregoing adaptor apparatus.

Further features of the present disclosure will become apparent from the following description of exemplary embodiments with reference to the attached drawings.

BRIEF DESCRIPTION OF THE DRAWINGS

FIGS. 9A, 9B, and 9C are tables illustrating examples of signal groups to be assigned to terminals of a Universal Serial Bus (USB) Type-C connector A of a digital camera included in camera systems according to a first exemplary embodiment of the present disclosure.

FIGS. 11A, 11B, 11C, 11D, 11E, and 11F are charts illustrating examples of signal groups to be assigned to terminals of a USB Type-C connector A of a digital camera included in camera systems according to a second exemplary embodiment of the present disclosure.

FIG. 19 is a diagram illustrating an example of a schematic diagram of a camera system connected via a communication cable according to the fourth exemplary embodiment of the present disclosure.

FIGS. 20A, 20B, and 20C are tables illustrating examples of signal groups to be assigned to terminals of a USB Type-C connector A of a digital camera included in camera systems according to the fourth exemplary embodiment of the present disclosure.

FIGS. 24A, 24B, 24C, and 24D are tables illustrating examples of signal groups to be assigned to the terminals of the USB Type-C connector A of the digital camera included in the camera systems according to the fourth exemplary embodiment of the present disclosure.

DESCRIPTION OF THE EMBODIMENTS

Modes (exemplary embodiments) for carrying out the present disclosure will be described below with reference to the drawings.

Figure 1A:
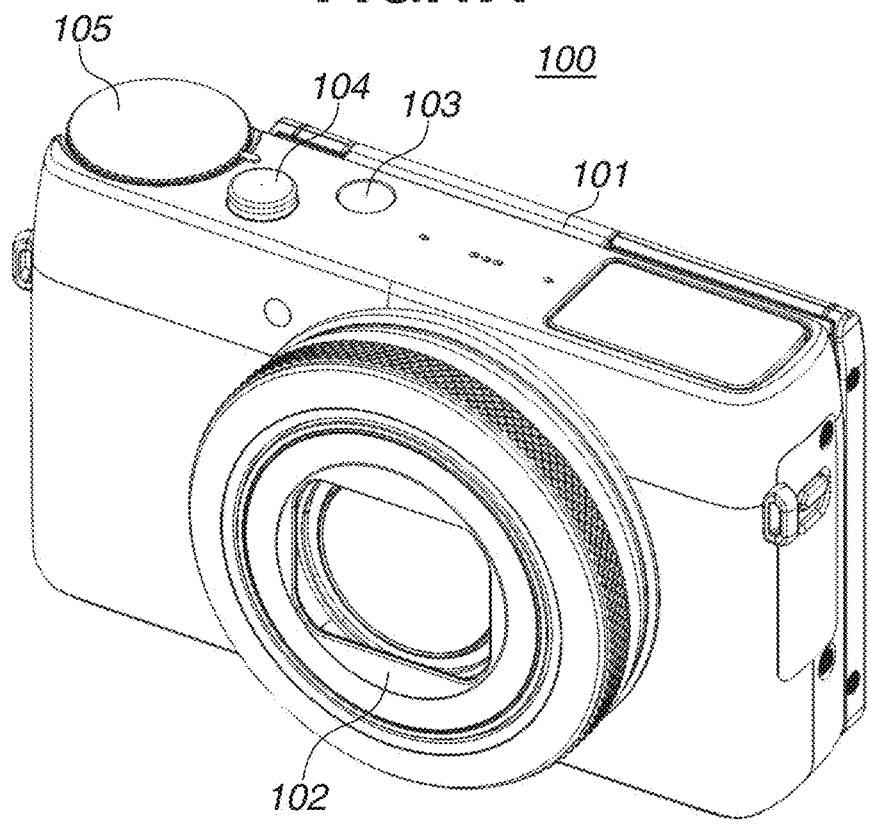
FIGS. 1A and 1B are diagrams illustrating an example of a digital camera (imaging apparatus) according to an exemplary embodiment of the present disclosure.
Figure 1B:
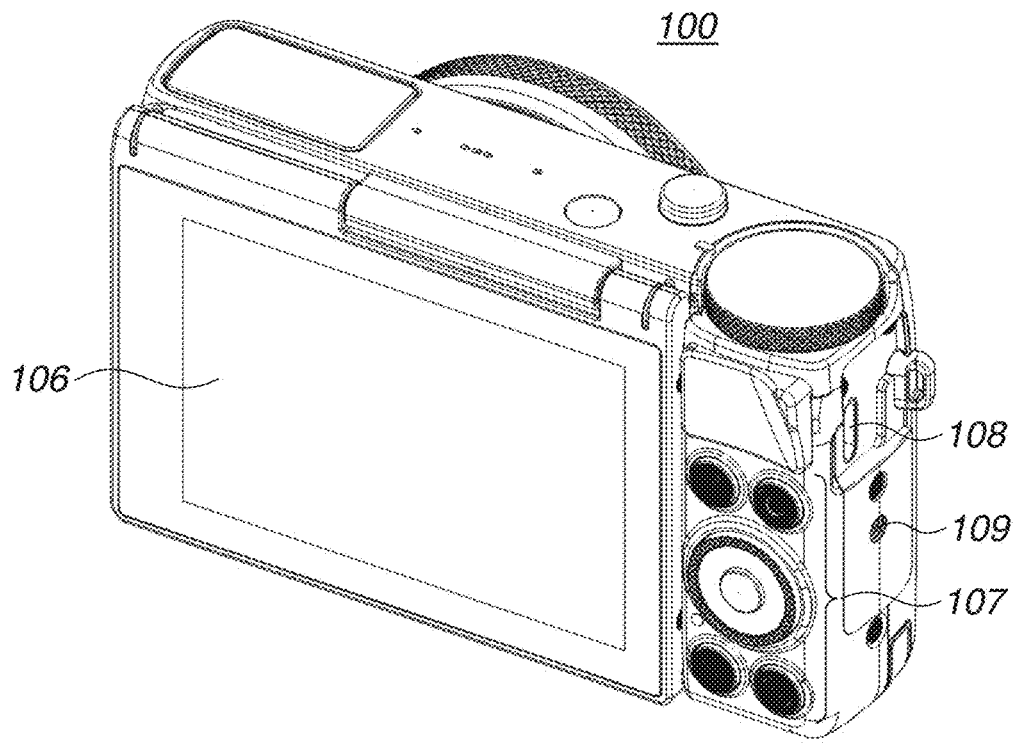

FIGS. 1A and 1B are diagrams illustrating an example of appearance of a digital camera (imaging apparatus) 100 according to a first exemplary embodiment of the present disclosure. Specifically, FIG. 1A illustrates a perspective view of a digital camera 100 seen from a front side (object side). FIG. 1B illustrates a perspective view of the digital camera 100 seen from a rear side.

As illustrated in FIG. 1A, the digital camera 100 according to the present exemplary embodiment includes a lens barrel 102 on the front side of a camera main body 101. A power button 103, a release button 104, and a mode dial 105 are provided on a top surface portion of the camera main body 101.

As illustrated in FIG. 1B, the digital camera 100 according to the present exemplary embodiment includes a display unit 106 on the rear side of the camera main body 101. An example of the display unit 106 is a liquid crystal display (LCD). A group of various operation buttons 107 is provided on the right of the display unit 106 when the camera main body 101 is seen from the rear side. A USB Type-C connector A 108 and an adaptor apparatus attachment screw hole 109 are provided in the right side surface of the camera main body 101 when the camera main body 101 is seen from the rear side. The USB Type-C connector A 108 is a USB connector compliant with the USB standard and the only external interface connector that the digital camera 100 has. The digital camera 100 according to the present exemplary embodiment is an imaging apparatus configured to be electrically connectable to a device including an adaptor apparatus (200 in FIGS. 2A and 2B) via the USB Type-C connector A 108. The adaptor apparatus attachment screw hole 109 is used to fix the adaptor apparatus 200 illustrated in FIGS. 2A and 2B.

Figure 2A:
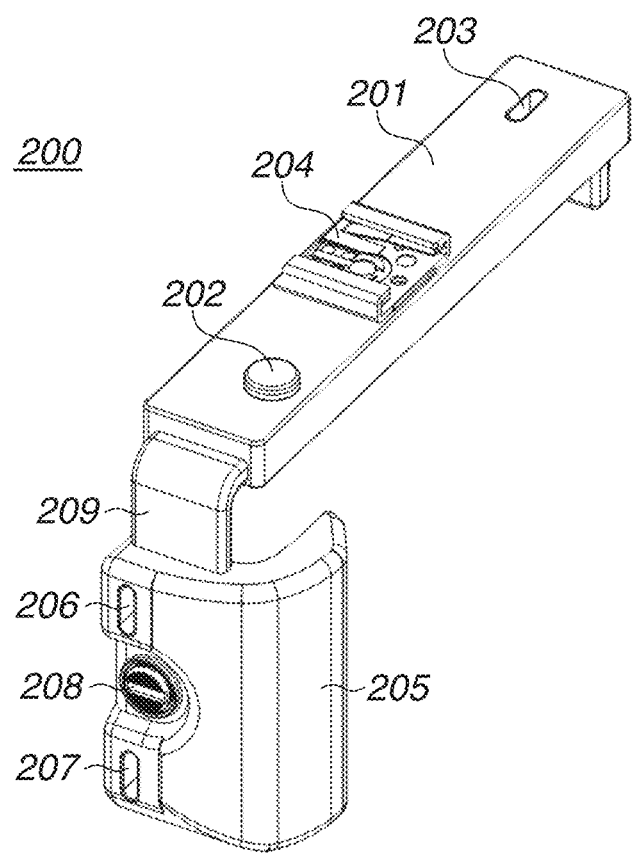
FIGS. 2A and 2B are diagrams illustrating an example of an adaptor apparatus according to an exemplary embodiment of the present disclosure.
Figure 2B:
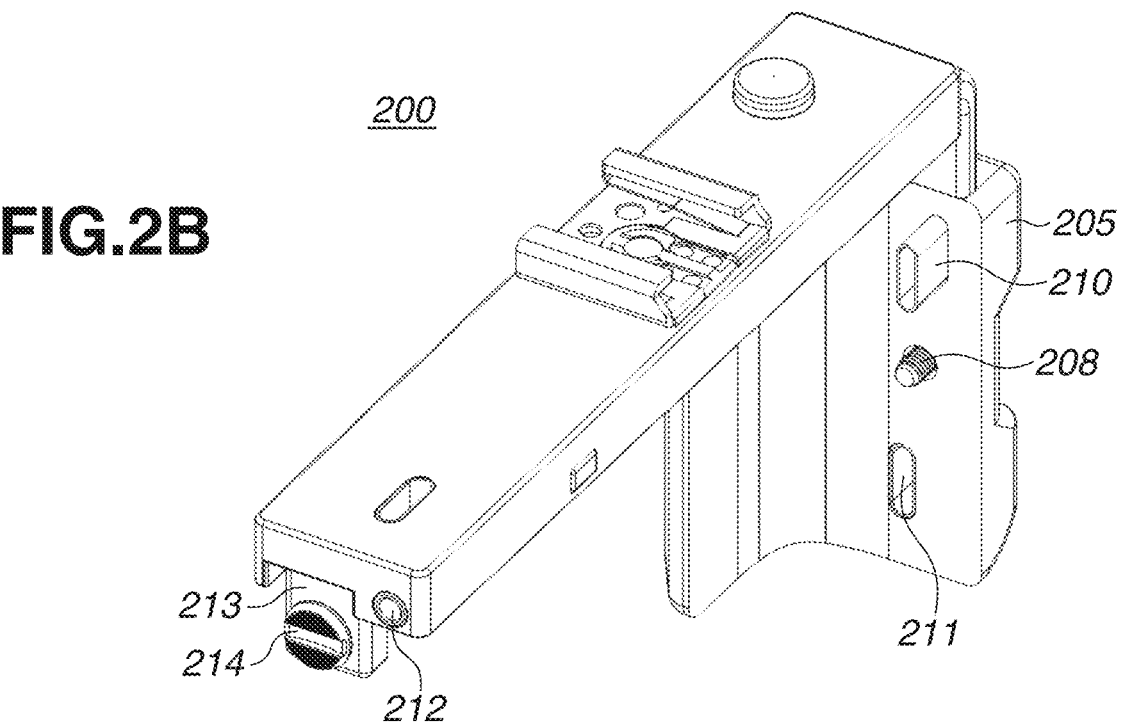

FIGS. 2A and 2B are diagrams illustrating an example of appearance of the adaptor apparatus 200 according to the present exemplary embodiment. The adaptor apparatus 200 illustrated in FIGS. 2A and 2B is an apparatus configured to be attachable to the digital camera (imaging apparatus) 100 illustrated in FIGS. 1A and 1B. Specifically, FIG. 2A illustrates a perspective view of the adaptor apparatus 200 seen from the front side (object side). FIG. 2B illustrates a perspective view of the adaptor apparatus 200 seen from the rear side.

The adaptor apparatus 200 according to the present exemplary embodiment is an apparatus for allowing use of an external flash unit and a remote release cable to be described below with the digital camera 100 illustrated in FIGS. 1A and 1B when attached to the digital camera 100. As illustrated in FIG. 2A, the adaptor apparatus 200 includes a top portion 201, a grip portion 205, and a connection portion 209 which connects the top portion 201 and the grip portion 205.

As illustrated in FIG. 2A, a release button 202, a USB Type-C connector D 203, and an accessory shoe 204 are provided on an upper outer side of the top portion 201 of the adaptor apparatus 200. The accessory shoe 204 is intended to fix and electrically connect an external flash unit (320 in FIG. 4).

As illustrated in FIG. 2A, two USB Type-C connectors D 206 and 207 and a fixing first screw 208 are provided on the outer side of the grip portion 205 of the adaptor apparatus 200. As illustrated in FIG. 2B, a screw thread portion of the fixing first screw 208 protrudes from the inner side of the grip portion 205.

As illustrated in FIG. 2B, a remote release cable connection connector 212 for connecting a remote release cable (321 in FIG. 4) is provided in a side surface of the top portion 201 of the adaptor apparatus 200. A protruding portion 213 protruding from the inner side of the top portion 201 of the adaptor apparatus 200 has a screw hole (not illustrated). A fixing second screw 214 is threadedly engaged with the screw hole (not illustrated) of the protruding portion 213.

As illustrated in FIG. 2B, a USB Type-C plug 210 and a USB Type-C connector B 211 of the adaptor apparatus 200 are provided on the inner side of the grip portion 205.

Figure 3A:
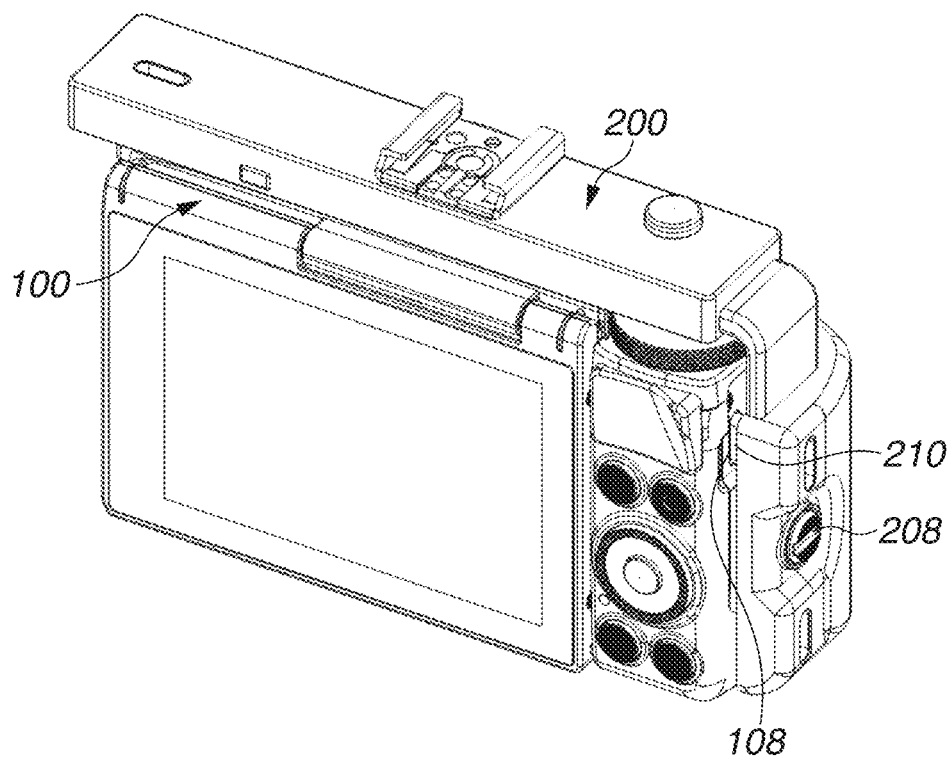
FIGS. 3A and 3B are diagrams illustrating examples of a camera system (imaging system) configured by electrically connecting the digital camera (imaging apparatus) illustrated in FIGS. 1A and 1B and the adaptor apparatus illustrated in FIGS. 2A and 2B, according to one or more embodiment of the present disclosure.
Figure 3B:
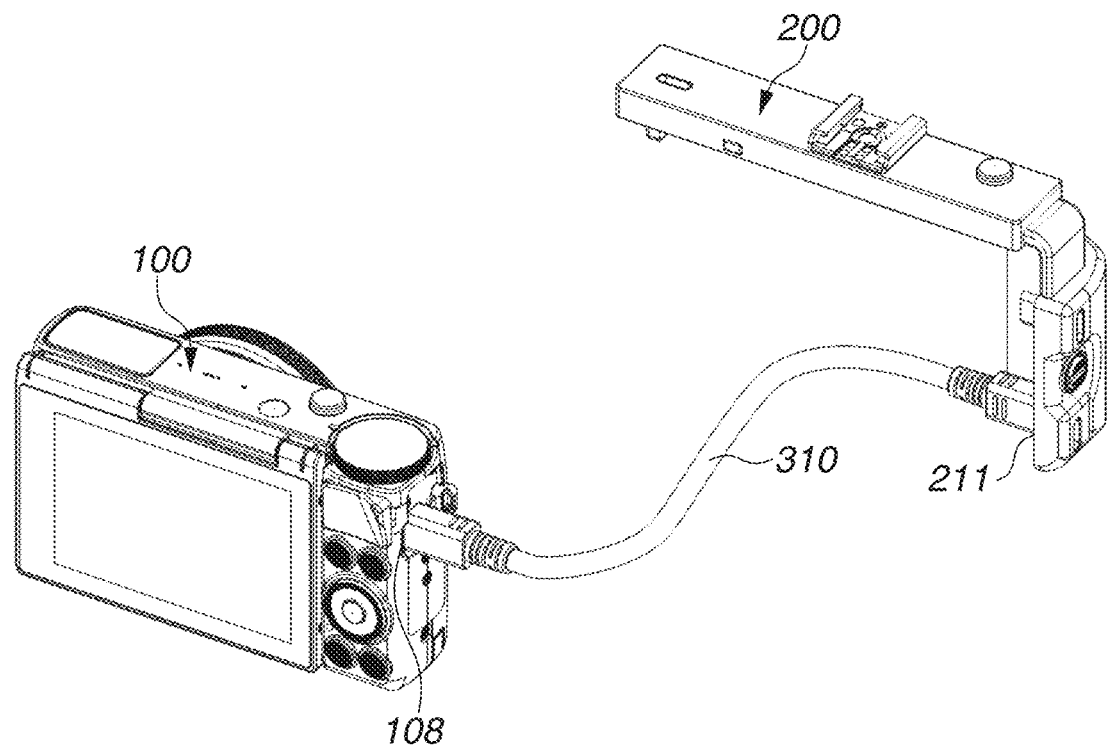

FIGS. 3A and 3B are diagrams illustrating examples of appearance of a camera system (imaging system) configured by electrically connecting the digital camera (imaging apparatus) 100 illustrated in FIGS. 1A and 1B and the adaptor apparatus 200 illustrated in FIGS. 2A and 2B. In FIGS. 3A and 3B, components similar to those illustrated in FIGS. 1A, 1B, 2A, and 2B are designated by the same reference numerals. Specifically, FIG. 3A illustrates a camera system in which the digital camera 100 illustrated in FIGS. 1A and 1B and the adaptor apparatus 200 illustrated in FIGS. 2A and 2B are directly connected. FIG. 3B illustrates a camera system in which the digital camera 100 illustrated in FIGS. 1A and 1B and the adaptor apparatus 200 illustrated in FIGS. 2A and 2B are connected via a communication cable 310.

In the case of the camera system illustrated in FIG. 3A, the USB Type-C plug 210 of the adaptor apparatus 200 is directly inserted into the USB Type-C connector A 108 of the digital camera 100. The fixing first screw 208 of FIGS. 2A and 2B is threadedly engaged with the adaptor apparatus attachment screw hole 109 of FIG. 1B, provided in the digital camera 100. The fixing second screw 214 of FIG. 2B is fastened into the screw hole of the protruding portion 213. The extremity of the fixing second screw 214 thus presses the digital camera 100, whereby the adaptor apparatus 200 can be fixed to the digital camera 100.

In the case of the camera system illustrated in FIG. 3B, one end of the communication cable 310 is initially inserted into the USB Type-C connector B 211 of the adaptor apparatus 200. The other end of the communication cable 310 is inserted into the USB Type-C connector A 108 of the digital camera 100. The digital camera 100 illustrated in FIGS. 1A and 1B and the adaptor apparatus 200 illustrated in FIGS. 2A and 2B are thereby connected via the communication cable 310.

As described above in FIGS. 2A and 2B, the adaptor apparatus 200 includes the accessory shoe 204, the remote release cable connection connector 212, and the USB Type-C connectors D 203, 206, and 207 as external interfaces. If the digital camera 100 and the adaptor apparatus 200 are connected as illustrated in FIG. 3A or 3B, circuits configured inside such apparatuses (FIGS. 6 and 7) are electrically connected via the external interfaces provided on the apparatuses. The digital camera 100 can thus electrically connect to other devices, such as the external flash unit 320, the remote release cable 321, and electronic devices equipped with a USB communication unit of the USB standard, by using the external interfaces of the adaptor apparatus 200.

Figure 4:
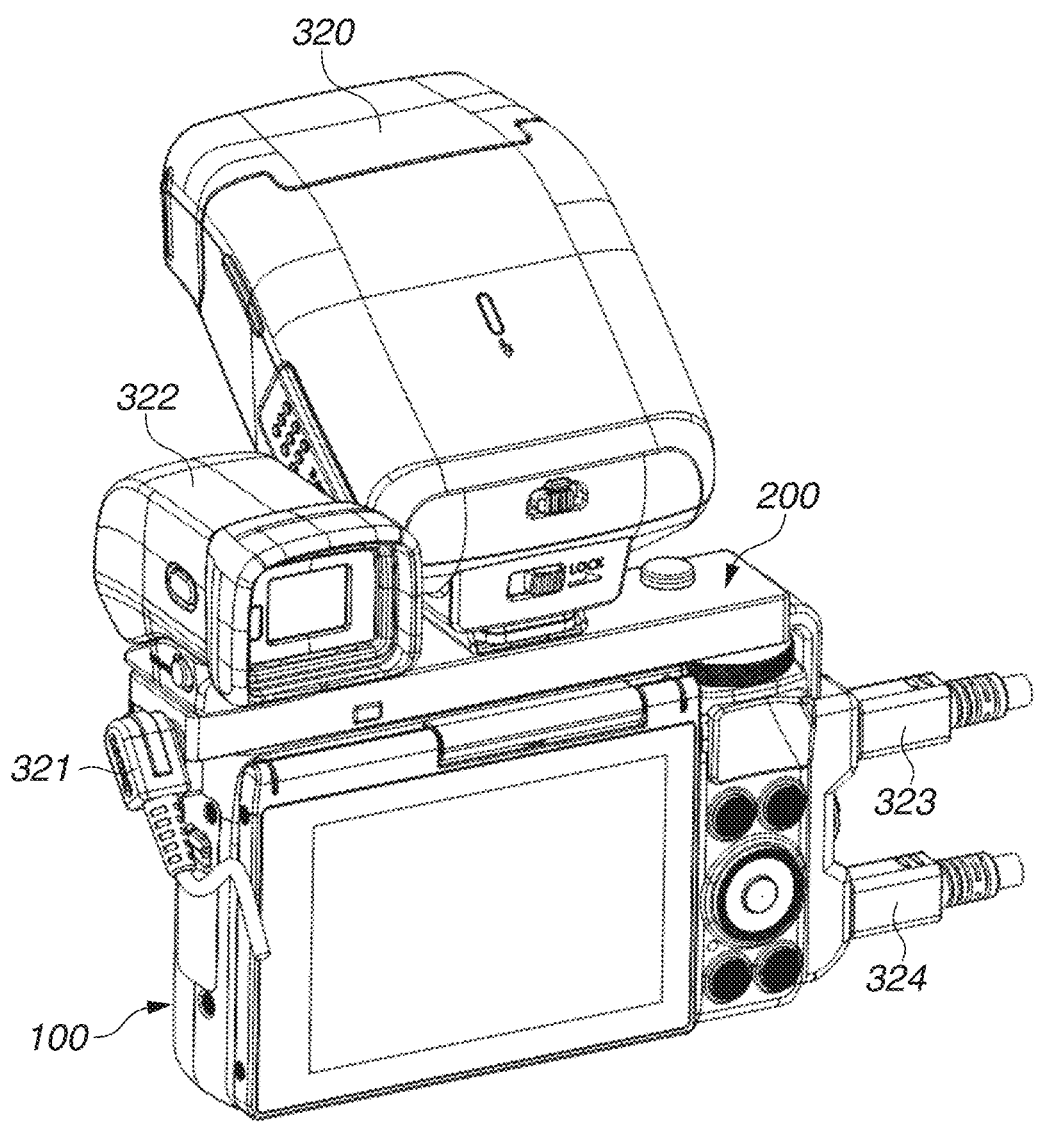
FIG. 4 is a diagram illustrating an example of a camera system (imaging system) configured by electrically connecting the digital camera (imaging apparatus) illustrated in FIGS. 1A and 1B with various devices via the adaptor apparatus illustrated in FIGS. 2A and 2B, according to one or more embodiment of the present disclosure.

FIG. 4 is a diagram illustrating an example of appearance of a camera system (imaging system) configured by electrically connecting the digital camera (imaging apparatus) 100 illustrated in FIGS. 1A and 1B with various devices via the adaptor apparatus 200 illustrated in FIGS. 2A and 2B. Specifically, FIG. 4 is a diagram illustrating an example where other devices are connected to the respective external interfaces of the adaptor apparatus 200, with the USB Type-C plug 210 of the adaptor apparatus 200 directly inserted into the USB Type-C connector A 108 of the digital camera 100 (the state of FIG. 3A).

In FIG. 4, an external flash unit 320 is fixed to the accessory shoe 204 of the adaptor apparatus 200 and electrically connected to the adaptor apparatus 200 via the accessory shoe 204.

An electrical contact portion (not illustrated) of a remote release cable 321 is inserted into the remote release cable connection connector 212 illustrated in FIG. 2B. The remote release cable 321 includes the electrical contact portion, a cable portion, and a switch holding portion. For simplicity of the drawing, only a vicinity of the electrical contact portion of the remote release cable 321 is illustrated. The other parts of the remote release cable 321 are omitted. The switch holding portion, i.e., an omitted part, includes an operation unit similar to the release button 104 of the digital camera 100. By using the remote release cable 321, the user can issue instructions for an imaging operation of the digital camera 100 from a position remote from the digital camera 100.

An external electronic viewfinder 322 includes a USB Type-C plug (not illustrated). The USB Type-C plug is inserted into the USB Type-C connector D 203 of the adaptor apparatus 200, whereby the external electronic viewfinder 322 is electrically connected to the adaptor apparatus 200. The external electronic viewfinder 322 and the digital camera 100 communicate with each other via the adaptor apparatus 200 by using a communication method compliant with the USB standard.

Communication cables 323 and 324 are communication cables each having USB Type-C plugs (not illustrated) at both cable ends. While the communication cables 323 and 324 are cables having USB Type-C plugs at both cable ends as described above, only a vicinity of the USB Type-C plug at one end of each communication cable is illustrated in FIG. 4 for the sake of simplicity. The USB Type-C plug at one end of the communication cable 323 is inserted into the USB Type-C connector D 206. The USB Type-C plug at the other end is inserted into a USB Type-C connector of an electronic apparatus (not illustrated) including a USB-standard communication unit. Similarly, the USB Type-C plug at one end of the communication cable 324 is inserted into the USB Type-C connector D 207. The USB Type-C plug at the other end is inserted into a USB Type-C connector of an electronic apparatus (not illustrated) including a USB-standard communication unit.

In such a manner, the digital camera 100 is configured to be able to perform communication according to the USB standard with the electronic apparatuses (various devices) via the adaptor apparatus 200. The digital camera 100 can also be connected with other devices capable of USB communication, such as a smartphone, and perform mutual communication compliant with the USB standard.

Figure 5:
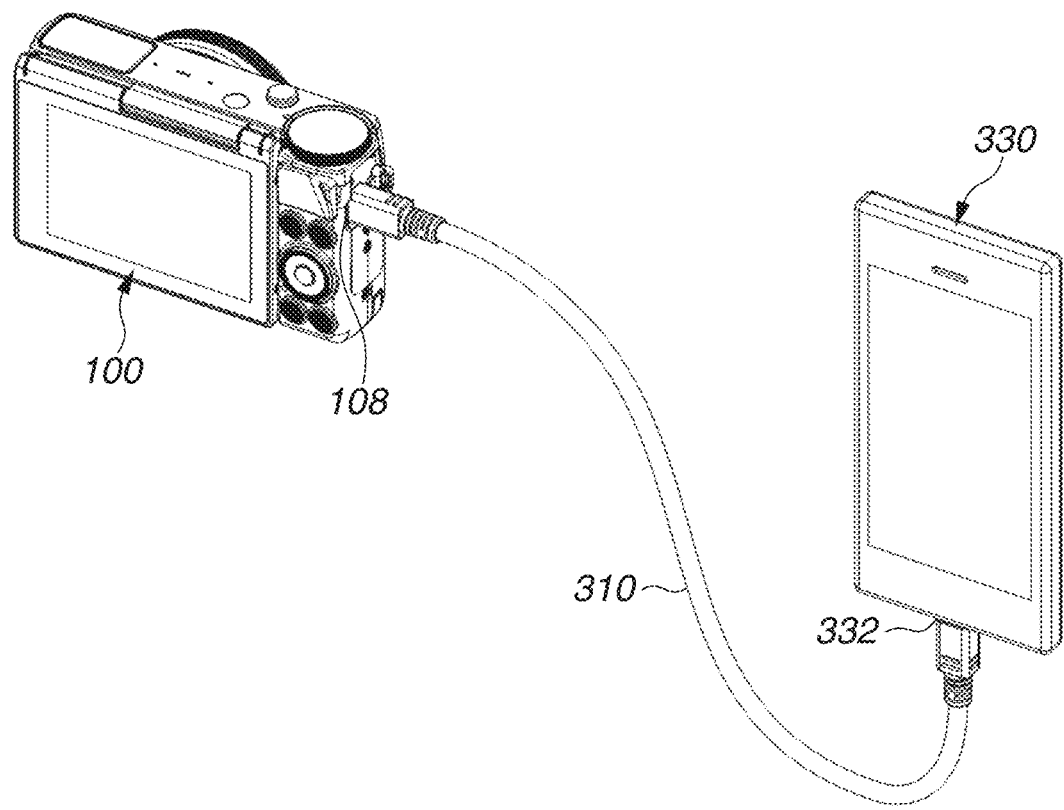
FIG. 5 is a diagram illustrating an example of a camera system (imaging system) configured by connecting the digital camera (imaging apparatus) illustrated in FIGS. 1A and 1B to a smartphone via a communication cable illustrated in FIG. 3B, according to one or more embodiment of the present disclosure.

FIG. 5 is a diagram illustrating an example of appearance of a camera system (imaging system) configured by connecting the digital camera (imaging apparatus) 100 illustrated in FIGS. 1A and 1B to a smartphone 330 via the communication cable 310 illustrated in FIG. 3B. Specifically, in FIG. 5, one end of the communication cable 310 is inserted into a USB Type-C connector E 332 provided on the smartphone 330. The other end of the communication cable 310 is inserted into the USB Type-C connector A 108 of the digital camera 100. The digital camera 100 and the smartphone 330 can thus perform communication compliant with the USB standard.

Next, connection modes of the camera systems (imaging systems) in the following cases will be described with reference to FIGS. 6 to 8, respectively. The connection modes are as follows: the case where the USB Type-C plug 210 of the adaptor apparatus 200 is directly inserted into the USB Type-C connector A 108 of the digital camera 100 (the state of FIG. 3A), the case where one end of the communication cable 310 is inserted into the USB Type-C connector B 211 of the adaptor apparatus 200 and the other end is inserted into the USB Type-C connector A 108 of the digital camera 100 (the state of FIG. 3B), and the case where one end of the communication cable 310 is inserted into the USB Type-C connector E 332 provided on the smartphone 330 and the other is inserted into the USB Type-C connector A 108 of the digital camera 100 (the state of FIG. 5).

Figure 6:
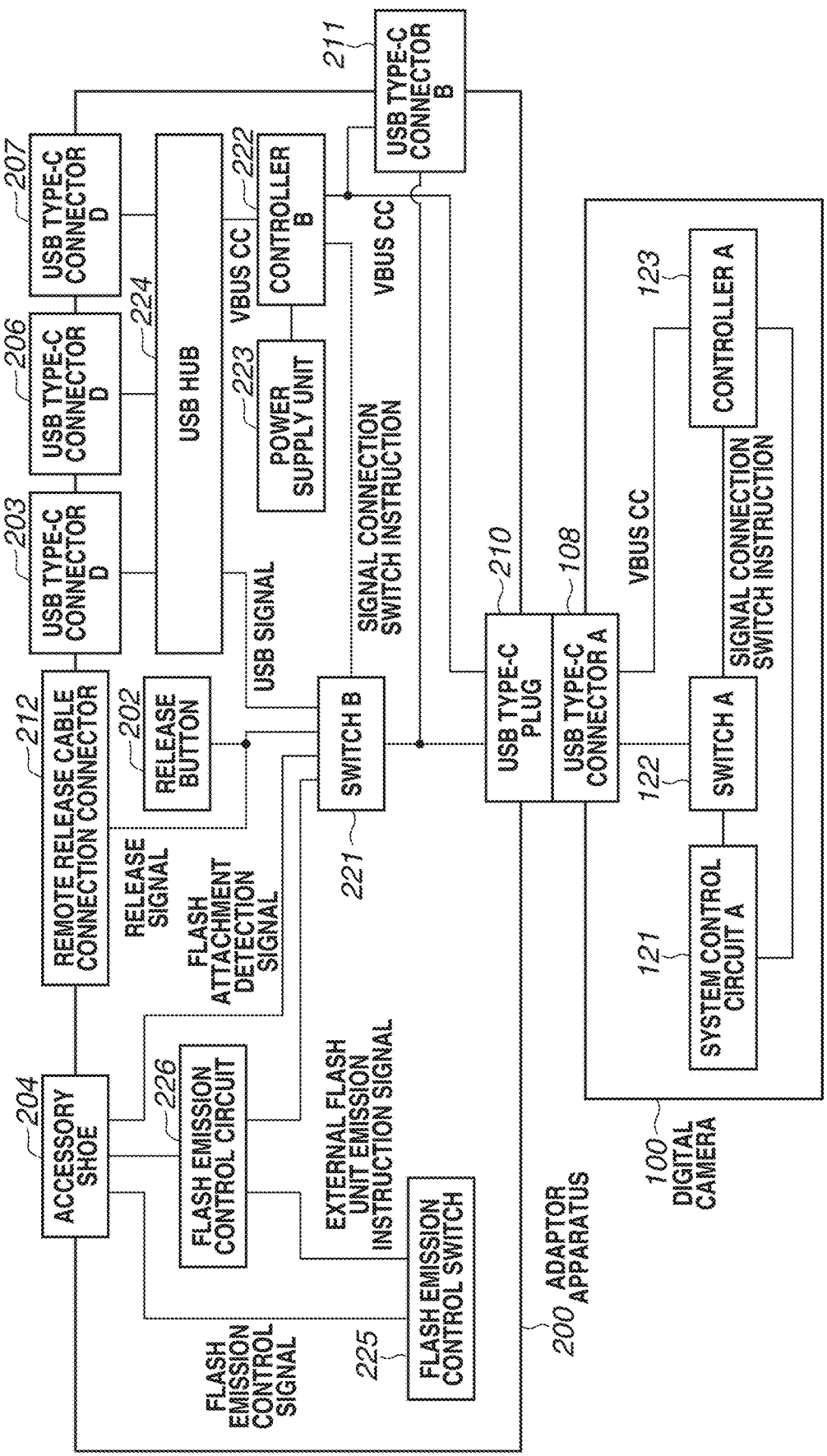
FIG. 6 is a diagram illustrating an example of a schematic configuration of a camera system in which the digital camera illustrated in FIGS. 1A and 1B and the adaptor apparatus illustrated in FIGS. 2A and 2B are directly connected (the camera system of FIG. 3A), according to one or more embodiment of the present disclosure.

FIG. 6 is a diagram illustrating an example of a schematic configuration of the camera system in which the digital camera 100 illustrated in FIGS. 1A and 1B and the adaptor apparatus 200 illustrated in FIGS. 2A and 2B are directly connected (the camera system of FIG. 3A). In FIG. 6, components similar to those illustrated in FIGS. 1A, 1B, 2A, and 2B are designated by the same reference numerals. For simplicity of the drawing, some of the components illustrated in FIGS. 1A, 1B, 2A, and 2B are omitted.

Functional components of the digital camera 100 in FIG. 6 will initially be described.

The digital camera 100 illustrated in FIG. 6 includes the USB Type-C connector A 108, a system control circuit A 121, a switch A 122, and a controller A 123.

The system control circuit A 121 governs various types of control in the digital camera 100. The controller A 123 transmits a signal connection switch instruction to the switch A 122 based on instructions from the system control circuit A 121 or a result of communication with an internal controller of an external apparatus, such as the adaptor apparatus 200, that is connected to the USB Type-C connector A 108. The USB Type-C connector A 108 includes a plurality of terminals (not illustrated) inside. The switch A 122 functions as a signal assignment unit for assigning predetermined signals to the terminals in the USB Type-C connector A 108 based on the signal connection switch instruction from the controller A 123. The assignment of the predetermined signals to the terminals in the USB Type-C connector A 108 will be described in detail below. The controller A 123 also controls transfer of power with the external apparatus, such as the adaptor apparatus 200, via the USB Type-C connector A 108.

Next, functional components of the adaptor apparatus 200 in FIG. 6 will be described.

The adaptor apparatus 200 illustrated in FIG. 6 includes the release button 202, the USB Type-C connectors D 203, 206, and 207, the accessory shoe 204, the USB Type-C plug 210, the USB Type-C connector B 211, the remote release cable connection connector 212, a switch B 221, a controller B 222, a power supply circuit 223, a USB hub 224, a flash emission control switch 225, and a flash emission control circuit 226.

The controller B 222 transmits a signal connection switch instruction to the switch B 221 based on a result of communication with the controller A 123 in the digital camera 100 connected to the USB Type-C plug 210. The switch B 221 assigns predetermined signals to respective terminals in the USB Type-C plug 210 and assigns predetermined signals to respective terminals in the USB Type-C connector B 211 based on the signal connection switch instruction from the controller B 222.

The controller B 222 also controls transfer of power with the digital camera 100 via the USB Type-C plug 210 or the USB Type-C connector B 211. Power received by the controller B 222 from the digital camera 100 is supplied to the power supply circuit 223. The power supply circuit 223 supplies needed power to, for example, the controller B 222 and the flash emission control circuit 226, in the adaptor apparatus 200. In FIG. 6 (and FIG. 7 to be described below), a line for supplying power from the power supply circuit 223 to the flash emission control circuit 226 is omitted for simplicity of the drawing.

The flash emission control circuit 226 is a circuit for controlling light emission of the external flash unit 320 electrically connected to the accessory shoe 204, based on a control signal from the system control circuit A 121 of the digital camera 100 via the USB Type-C plug 210. If the flash emission control switch 225 receives an external flash unit emission instruction signal transmitted from the flash emission control circuit 226, the flash emission control switch 225 short-circuits an emission standby signal of the external flash unit 320 and a ground signal in the adaptor apparatus 200. The external flash unit 320 is configured to emit flash light if the emission standby signal and the ground signal in the adaptor apparatus 200 are short-circuited.

The USB hub 224 has a function of distributing signals for USB communication to each of the USB Type-C connectors D 203, 206, and 207. The release button 202 is an operation unit capable of detecting two levels of pressing. At a first level of detection, the release button 202 transmits an SW1 signal to the system control circuit A 121 of the digital camera 100. At a second level of detection, the release button 202 transmits an SW2 signal to the system control circuit A 121. Specifically, the signals from the release button 202 are transmitted to the system control circuit A 121 via the switch B 221, either the USB Type-C plug 210 or the USB Type-C connector B 211, and the USB Type-C connector A 108 and the switch A 122 of the digital camera 100.

Receiving the SW1 signal, the system control circuit A 121 of the digital camera 100 performs imaging preparation processing including a focus adjustment and calculation of shutter speed. Receiving the SW2 signal, the system control circuit A 121 performs image capturing processing of an image formed by the lens barrel 102. Since the imaging preparation processing and the image capturing processing are widely known techniques, a detailed description thereof will be omitted. During the image capturing processing, the external flash unit 320 performs the foregoing emission of flash light according to need.

As described above, the remote release cable connection connector 212 is a connector for connecting the remote release cable 321. The remote release cable 321 also includes an operation unit similar to the release button 202. The operation unit transmits an SW1 signal at a first level of detection, and transmits an SW2 signal at a second level of detection. In the adaptor apparatus 200, the signal path of the SW1 and SW2 signals from the release button 202 and the signal path of the SW1 and SW2 signals from the remote release cable connection connector 212 are merged together and connected to terminals in the USB Type-C plug 210 and the USB Type-C connector B 211 of the adaptor apparatus 200 via the switch B 221.

Figure 7:
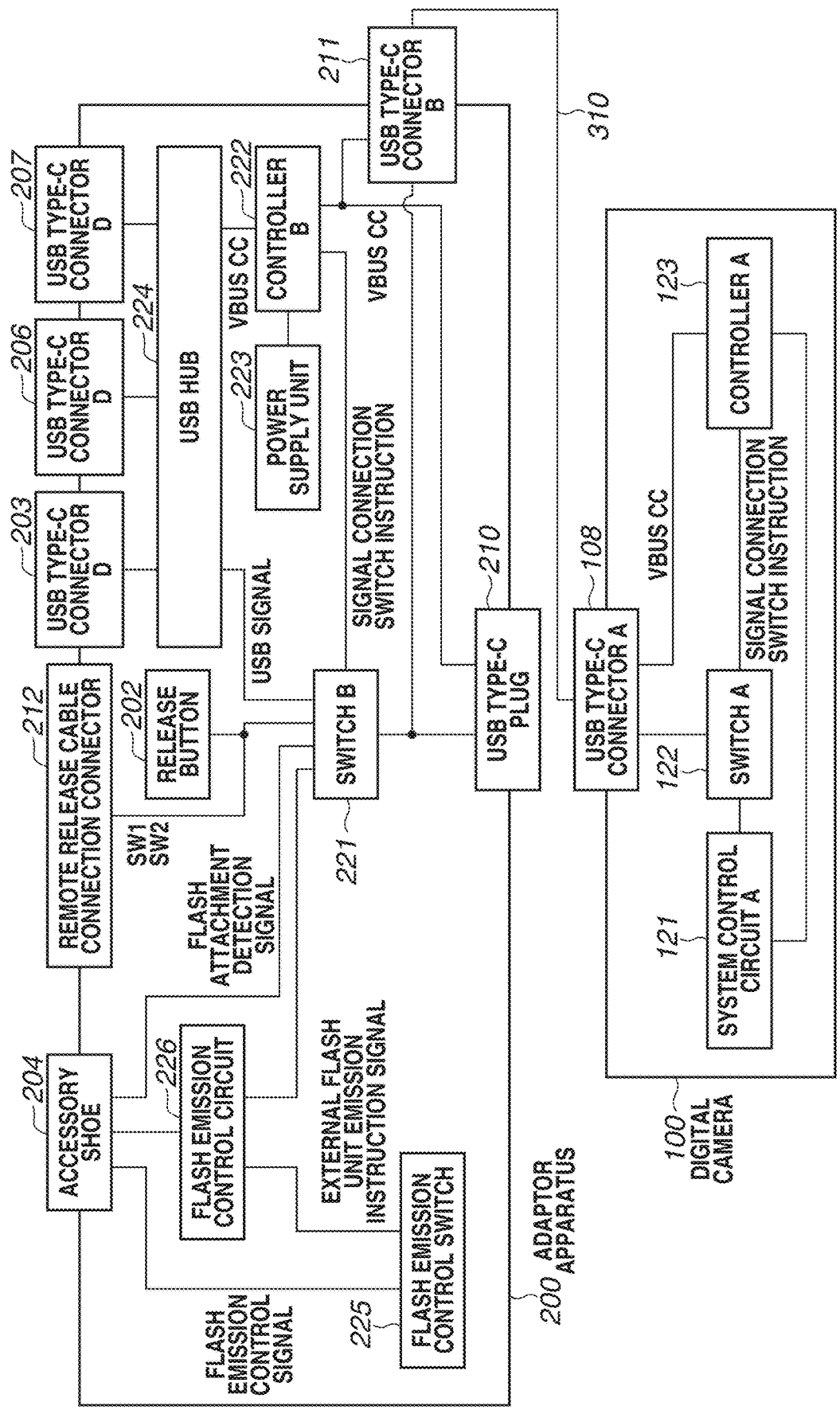
FIG. 7 is a diagram illustrating an example of a schematic configuration of a camera system in which the digital camera illustrated in FIGS. 1A and 1B and the adaptor apparatus illustrated in FIGS. 2A and 2B are connected via the communication cable (the camera system of FIG. 3B), according to one or more embodiment of the present disclosure.

FIG. 7 is a diagram illustrating an example of a schematic configuration of the camera system in which the digital camera 100 illustrated in FIGS. 1A and 1B and the adaptor apparatus 200 illustrated in FIGS. 2A and 2B are connected via the communication cable 310 (the camera system of FIG. 3B). In FIG. 7, components similar to those illustrated in FIG. 6 are designated by the same reference numerals. A detailed description thereof will be omitted. In FIG. 7, like FIG. 6, some of the components illustrated in FIGS. 1A, 1B, 2A, and 2B are omitted for simplicity of the drawing.

Specifically, in the camera system of FIG. 7, the USB Type-C connector A 108 of the digital camera 100 and the USB Type-C connector B 211 of the adaptor apparatus 200 are electrically connected via the communication cable 310, and transfer power and exchange various signals.

Figure 8:
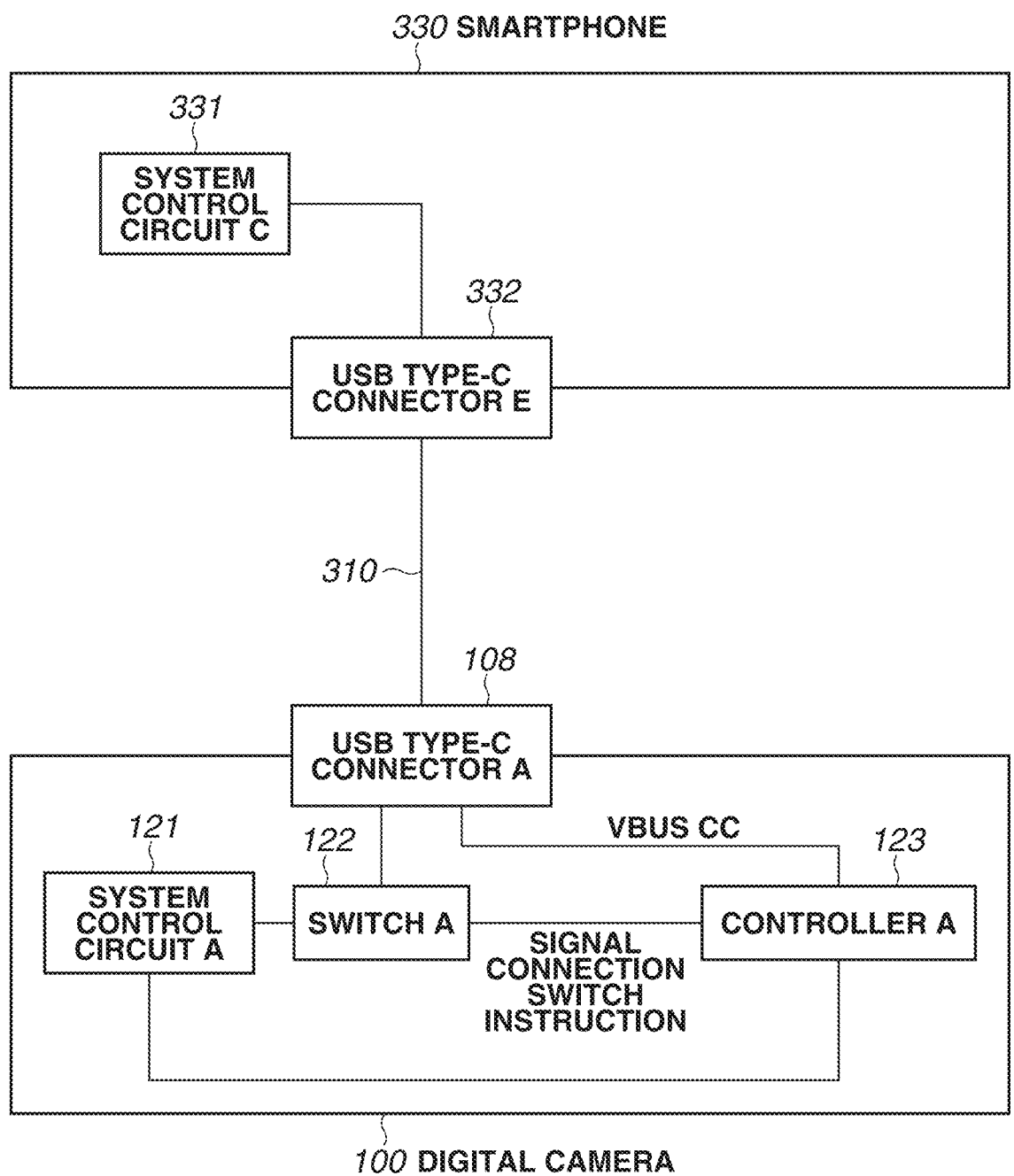
FIG. 8 is a diagram illustrating an example of a schematic configuration of a camera system in which the digital camera (imaging apparatus) illustrated in FIGS. 1A and 1B and the smartphone illustrated in FIG. 5 are connected via the communication cable (the camera system of FIG. 5), according to one or more embodiment of the present disclosure.

FIG. 8 is a diagram illustrating an example of a schematic configuration of the camera system in which the digital camera (imaging apparatus) 100 illustrated in FIGS. 1A and 1B and the smartphone 330 illustrated in FIG. 5 are connected via the communication cable 310 (the camera system of FIG. 5). Specifically, FIG. 8 illustrates a state in which one end of the communication cable 310 is inserted into the USB Type-C connector E 332 provided on the smartphone 330 and the other end is inserted into the USB Type-C connector A 108 of the digital camera 100. In FIG. 8, components similar to those illustrated in FIGS. 6 and 7 are designated by the same reference numerals. A detailed description thereof will be omitted. In FIG. 8, like FIGS. 6 and 7, some of the components illustrated in FIGS. 1A and 1B are omitted for simplicity of the drawing.

The functional components of the digital camera 100 illustrated in FIG. 8 are the same as those of the digital camera 100 illustrated in FIG. 6 (or FIG. 7). A description thereof will thus be omitted.

Next, functional components of the smartphone 330 in FIG. 8 will be described.

The smartphone 330 illustrated in FIG. 8 includes a system control circuit C 331 and the USB Type-C connector E 332. The system control circuit C 331 governs various types of control in the smartphone 330. As described above, the smartphone 330 is configured to be able to perform communication compliant with the USB standard with another apparatus. In the case of FIG. 8, the system control circuit A 121 of the digital camera 100 and the system control circuit C 331 of the smartphone 330 exchange communication signals compliant with the USB standard via the USB Type-C connector A 108 of the digital camera 100, the communication cable 310, and the USB Type-C connector E 332 of the smartphone 330.

As described above, the switch A 122 assigns predetermined signals to the terminals in the USB Type-C connector A 108 of the digital camera 100 based on instructions from the controller A 123. The assignment of signals is described in more detail below.

FIGS. 9A, 9B, and 9C are tables illustrating examples of signal groups to be assigned to the terminals of the USB Type-C connector A 108 of the digital camera 100 included in the camera systems illustrated in FIGS. 6, 7, and 8, respectively.

FIG. 9A will initially be described.

FIG. 9A is a table illustrating an example of the signal group to be assigned to the terminals of the USB Type-C connector A 108 in the camera system illustrated in FIG. 6, i.e., the camera system illustrated in FIG. 3A in which the digital camera 100 and the adaptor apparatus 200 are directly connected.

As illustrated in FIGS. 9A to 9C, the USB Type-C connector A 108 of the digital camera 100 has a two-row terminal layout structure including an A row and a B row. The USB Type-C connector A 108 includes 12 terminals in each row, or a total of 24 terminals. In the examples illustrated in FIGS. 9A to 9C, the terminals in the A row are named A1 to A12. The terminals in the B row are named B1 to B12.

As illustrated in FIG. 9A, a GND signal is assigned to the terminals A1, A12, B1, and B12. The GND signal is a ground signal serving as a reference potential of the digital camera 100 and the adaptor apparatus 200. A TX1+ signal, a TX1− signal, an RX1− signal, and an RX1+ signal are assigned to the terminals A2, A3, B10, and B11, respectively. The TX1+ and TX1− signals constitute a pair of differential signals, and the RX1+ and RX1− signals constitute another pair of differential signals. The TX1+, TX1−, RX1+, and RX1− signals are signals for performing communication according to the USB 3.1 standard.

A VBUS signal is assigned to the terminals A4, A9, B4, and B9. The VBUS signal is a signal for transferring power. A CC signal (this CC signal in FIG. 9A may be referred to as a "CC1 signal") is assigned to the terminal A5. The CC signal is a signal for exchanging information between the controller A 123 in the digital camera 100 and a controller in another device connected via the USB Type-C connector A 108. By communication using the CC signal, the digital camera 100 can learn a communication method of the other device connected, and the other device can learn a communication method of the digital camera 100. For example, if the digital camera 100 is connected to the adaptor apparatus 200 via the USB Type-C connector A 108, the digital camera 100 and the adaptor apparatus 200 can learn each other's communication methods. Since what the connected device is can thus be found out, the digital camera 100 can identify its connection partner as the adaptor apparatus 200. The adaptor apparatus 200 can identify its connection partner as the digital camera 100. As will be described below with reference to the flowchart of FIG. 10, the digital camera 100 and the device connected to the digital camera 100 perform communication by using the CC signal before predetermined signals are assigned to the terminals in the USB Type-C connector A 108 of the digital camera 100.

A D+ signal and a D− signal are assigned to the terminals A6 and A7, respectively. The D+ and D− signals constitute a pair of differential signals. The D+ and D− signals are signals for performing communication according to the USB 2.0 standard. The SW1 and SW2 signals are assigned to the terminals B5 and B6, respectively. As described above, the SW1 and SW2 signals are signals serving as a trigger for the system control circuit A 121 of the digital camera 100 to perform the imaging preparation processing and the image capturing processing.

A STROBE FLASH signal, a STROBE DET SW signal, an EF CLOCK signal, a STROBE CLOCK signal, an EF CHIP SELECT signal, a STROBE TX signal, and a STROBE RX signal are assigned to the terminals B8, A8, B7, A10, B3, A11, and B2, respectively. Such signals are signals related to the external flash unit 320 attached to the accessory shoe 204. Specifically, the STROBE FLASH signal is a signal for the flash emission control circuit 226 to transmit the external flash unit emission instruction signal to the flash emission control switch 225 if the flash emission control circuit 226 detects the STROBE FLASH signal. The STROBE DET SW signal is a signal for detecting whether the external flash unit 320 is mounted on the accessory shoe 204. The EF CLOCK signal is a clock signal for a flash emission control integrated circuit (IC) (not illustrated) in the flash emission control circuit 226 to operate. The STROBE TX signal is a signal for transmitting information from the system control circuit A 121 of the digital camera 100 to the flash emission control IC (not illustrated). The STROBE RX signal is a signal for transmitting information from the flash emission control IC (not illustrated) to the system control circuit A 121 of the digital camera 100. The STROBE CLOCK signal is a reference clock signal during communication using the STROBE TX and STROBE RX signals. The EF CHIP SELECT signal is a signal for maintaining the communication using the STROBE TX and STROBE RX signals between the system control circuit A 121 of the digital camera 100 and the flash emission control IC (not illustrated). The system control circuit A 121 of the digital camera 100 and the flash emission control IC (not illustrated) can exchange various types of information by performing the communication using the STROBE TX and STROBE RX signals. Examples of the information include setting information about an imaging condition of the digital camera 100 and information about whether flash emission by the external flash unit 320 is available.

The SW1, SW2, STROBE FLASH, STROBE DET SW, EF CLOCK, STROBE CLOCK, EF CHIP SELECT, STROBE TX, and STROBE RX signals are signals that do not exist in the standard signal assignment of USB Type-C to be described below. Since such signals are dedicated signals to be used only when the adaptor apparatus 200 and the digital camera 100 are connected, the signals are hereinafter referred to as "dedicated signals".

Next, FIG. 9B will be described.

FIG. 9B is a chart illustrating an example of the signal group to be assigned to the terminals of the USB Type-C connector A 108 in the camera system illustrated in FIG. 7, i.e., the camera system illustrated in FIG. 3B in which the digital camera 100 and the adaptor apparatus 200 are connected via the communication cable 310. In FIG. 9B, signals similar to those described in FIG. 9A are designated by the same reference symbols.

As illustrated in FIG. 9B, the GND signal is assigned to the terminals A1, A12, B1, and B12. The VBUS signal is assigned to the terminals A4, A9, B4, and B9. The CC signal (this CC signal in FIG. 9B may be referred to as a "CC1 signal") is assigned to the terminal A5. The D+ and D− signals are assigned to the terminals A6 and A7, respectively. The SW1 and SW2 signals are assigned to the terminals A2 and A3, respectively.

The STROBE FLASH, STROBE DET SW, EF CLOCK, STROBE CLOCK, EF CHIP SELECT, STROBE TX, and STROBE RX signals are assigned to the terminals B8, A8, B10, A10, B3, A11, and B2, respectively. No signal is assigned to the terminal B5, B6, B7, or B11.

Differences between the signal assignment illustrated in FIG. 9A and the signal assignment illustrated in FIG. 9B are described below.

The SW1 and SW2 signals which are assigned to the terminals B5 and B6 in FIG. 9A are assigned to the terminals A2 and A3 in FIG. 9B. The EF CLOCK signal which is assigned to the terminal B7 in FIG. 9A is assigned to the terminal B10 in FIG. 9B. In FIG. 9B, no signal is assigned to the terminal B5, B6, B7, or B11. The TX1+, TX1−, RX1−, and RX1+ signals, which are assigned to the terminals A2, A3, B10, and B11 in FIG. 9A, respectively, are not assigned to any of the terminals in FIG. 9B. In other words, the signal assignment in FIG. 9B is not capable of communication compliant with the USB 3.1 standard.

The reason why the signal assignments differ as illustrated in FIGS. 9A and 9B between the camera system illustrated in FIG. 6 (camera system illustrated in FIG. 3A in which the digital camera 100 and the adaptor apparatus 200 are directly connected) and the camera system illustrated in FIG. 7 (camera system illustrated in FIG. 3B in which the digital camera 100 and the adaptor apparatus 200 are connected with each other via the communication cable 310) is described below.

There are two types of communication cables compliant with the USB Type-C standard. One is a cable without the signal terminals corresponding to the terminals B5, B6, and B7. The other is a cable without the signal terminals corresponding to the terminals B6 and B7. The purpose of such configurations is to reduce the number of conductor lines in the cable to reduce the thickness and hardness of the cable.

The communication cable 310 according to the present exemplary embodiment is assumed to be one without the signal terminals corresponding to the terminals B5, B6, and B7. Suppose that one end of the communication cable 310 is inserted into the USB Type-C connector B 211 of the adaptor apparatus 200, and the other end of the communication cable 310 is inserted into the USB Type-C connector A 108 of the digital camera 100. In such a case, if the signal assignment illustrated in FIG. 9A is applied, the SW1, SW2, and EF CLOCK signals are unable to be exchanged between the digital camera 100 and the adaptor apparatus 200. In FIG. 9B, the SW1, SW2, and EF CLOCK signals are therefore assigned to the terminals A2, A3, and B10, respectively, which have corresponding signal terminals in the communication cable 310, not to the terminals B5, B6, and B7 which have no corresponding signal terminal in the communication cable 310.

On the other hand, if the USB Type-C plug 210 of the adaptor apparatus 200 is directly inserted into the USB Type-C connector A 108 of the digital camera 100, all the 24 terminals can be used to exchange signals. In FIG. 9A, the SW1, SW2, and EF CLOCK signals are therefore assigned to the terminals B5, B6, and B7, respectively. In FIG. 9A, the TX1+, TX1−, RX1−, and RX1+ signals are respectively assigned to the terminals A2, A3, and B10, to which the SW1, SW2, and EF CLOCK signals are assigned in FIG. 9B, and the terminal B11, which is a vacant terminal in FIG. 9B. For example, if an accessory compliant with the USB 3.1 standard is connected to the USB Type-C connector D 203 provided on the adaptor apparatus 200, the digital camera 100 can therefore perform communication according to the USB 3.1 standard with the accessory compliant with the USB 3.1 standard, connected to the USB Type-C connector D 203, via the adaptor apparatus 200.

As described above, in the present exemplary embodiment, the signal assignment of the dedicated signals to the terminals in the USB Type-C connector A 108 of the digital camera 100 is changed according to whether the digital camera 100 and the adaptor apparatus 200 are connected directly or via the communication cable 310. The signal assignment is changed to give priority to enabling the exchange of the dedicated signals between the digital camera 100 and the adaptor apparatus 200.

Next, FIG. 9C will be described.

FIG. 9C is a table illustrating an example of the signal group to be assigned to the terminals of the USB Type-C connector A 108 in the camera system illustrated in FIG. 8, i.e., the camera system illustrated in FIG. 5 in which the digital camera 100 and the smartphone 330 are connected via the communication cable 310. In FIG. 9C, signals similar to those described in FIG. 9A are designated by the same reference symbols.

As illustrated in FIG. 9C, the GND signal is assigned to the terminals A1, A12, B1, and B12. The TX1+, TX1−, RX1−, and RX1+ signals are assigned to the terminals A2, A3, B10, and B11, respectively. A TX2+ signal, a TX2− signal, an RX2− signal, and an RX2+ signal are assigned to the terminals B2, B3, A10, and A11, respectively. The TX2+, TX2−, RX2−, and RX2+ signals have roles similar to those of the TX1+, TX1−, RX1−, and RX1+ signals. More specifically, the TX2+ and TX2− signals constitute a pair of differential signals and the RX2+ and RX2− signals constitute another pair of differential signals. These differential signals are used to perform communication compliant with the USB 3.1 standard. The VBUS signal is assigned to the terminals A4, A9, B4, and B9. The CC signal (this CC signal in FIG. 9C may be referred to as a "CC1 signal") is assigned to the terminal A5. The D+ and D− signals are assigned to the terminals A6 and A7, respectively. The D+ and D− signals are also assigned to the terminals B6 and B7, respectively. A CC2 signal, an SBU1 signal, and an SBU2 signal are assigned to the terminals B5, A8, and B8, respectively. The CC2 signal is a signal having a role similar to that of the CC signal. The SBU1 and SBU2 signals are preliminary signals and have no particular role.

The signal assignment illustrated in FIG. 9C is the standard signal assignment defined by the standardization organization of USB Type-C. If the smartphone 330, which is an example of another device capable of USB communication, is connected to the USB Type-C connector A 108 of the digital camera 100 as in the camera system of FIG. 5, the digital camera 100 and the smartphone 330 can thus perform communication compliant with the USB standard with each other.

In the present exemplary embodiment, the digital camera 100 switches the assignment of signals illustrated in FIGS. 9A, 9B, and 9C to the terminals in the USB Type-C connector A 108, based on predetermined determinations. Details of such signal assignment processing for the terminals in the USB Type-C connector A 108 will be described below with reference to FIG. 10.

Figure 10:
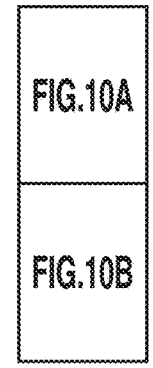
FIG. 10 is a diagram including flowcharts of FIGS. 10A and 10B illustrating an example of a detailed processing procedure of signal assignment processing for the terminals in the USB Type-C connector A of the digital camera (imaging apparatus) according to the first exemplary embodiment of the present disclosure.
Figure 10A:
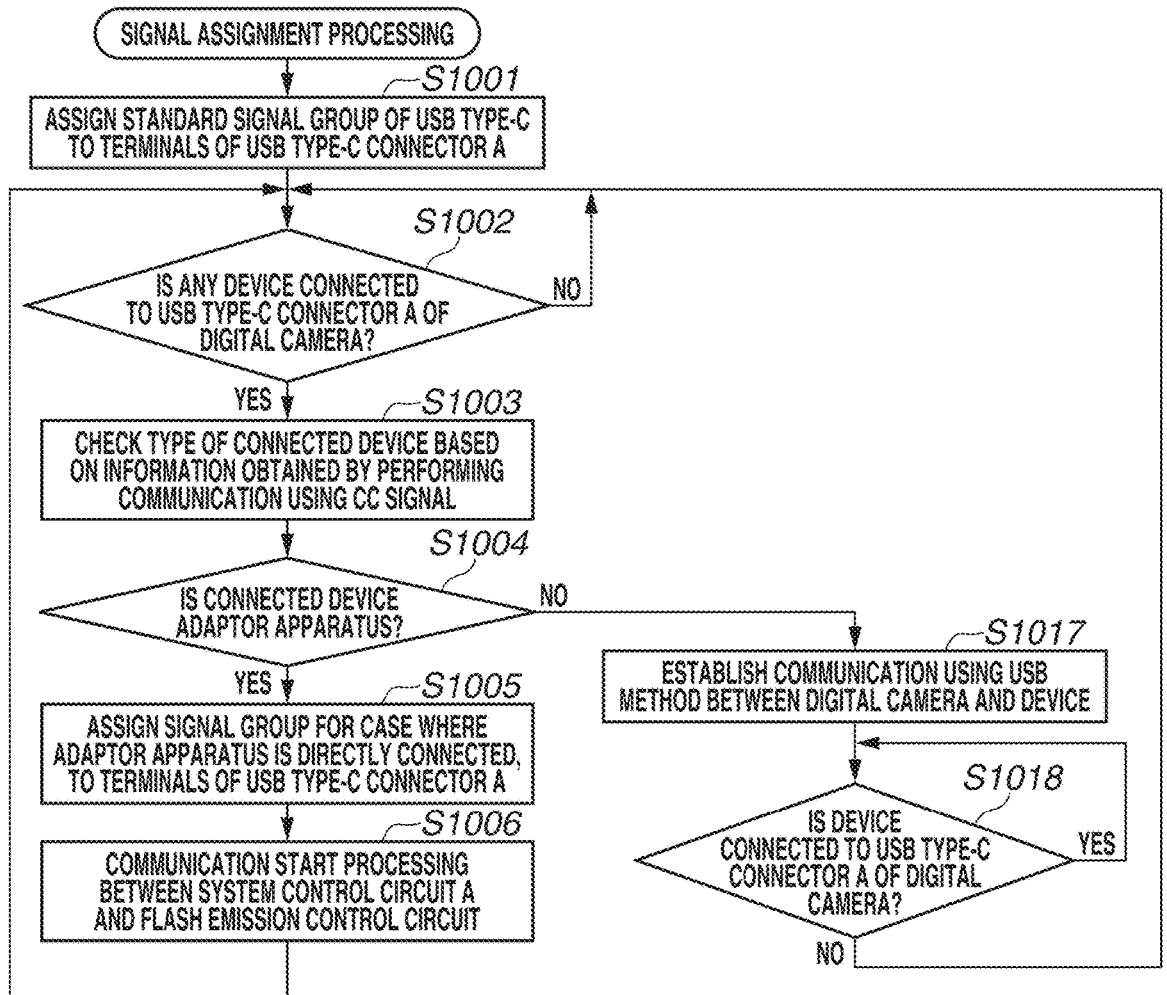
Figure 10B:
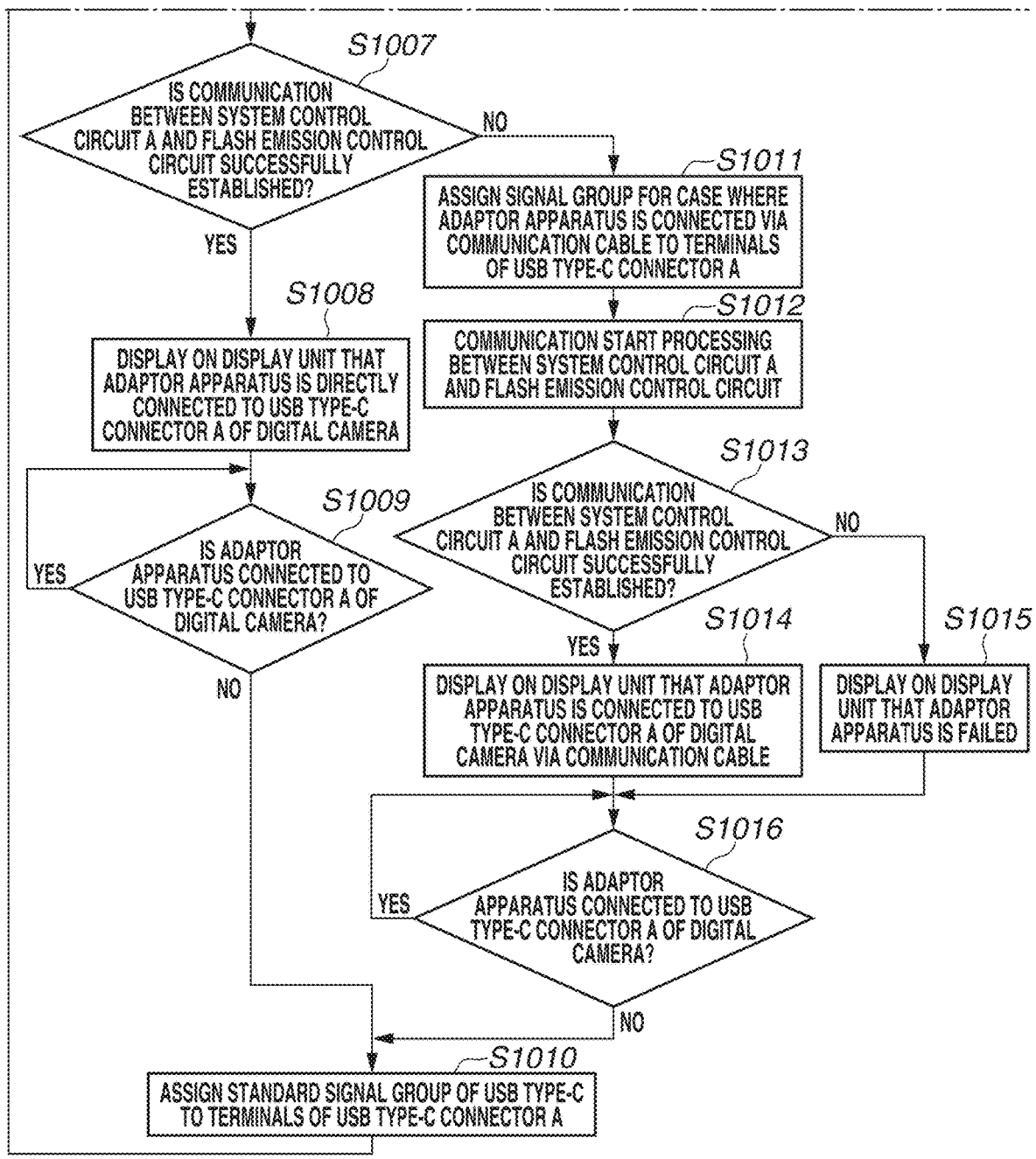

FIG. 10 is a flowchart illustrating an example of a detailed processing procedure of the signal assignment processing for the terminals in the USB Type-C connector A 108 of the digital camera (imaging apparatus) 100 according to the present exemplary embodiment. Specifically, in the present exemplary embodiment, FIG. 10 corresponds to a flowchart illustrating an example of the processing procedure of a method for controlling the digital camera (imaging apparatus) 100 according to the present exemplary embodiment.

If the user presses the power button 103, for example, the system control circuit A 121 turns on power of the digital camera 100. In step S1001, the switch A 122 assigns the standard signal group of USB Type-C illustrated in FIG. 9C to the terminals of the USB Type-C connector A 108, based on control of the controller A 123 and the system control circuit A 121.

In step S1002, the system control circuit A 121 determines (detects), for example, via the controller A 123 whether any device is connected to the USB Type-C connector A 108 of the digital camera 100. In a case where no device is determined to be connected to the USB Type-C connector A 108 (NO in step S1002), the processing proceeds to step S1002. That is, in step S1002, the system control circuit A 121 waits until a device is determined to be connected to the USB Type-C connector A 108.

In step S1002, in a case where a device is determined to be connected to the USB Type-C connector A 108 (YES in step S1002), the processing proceeds to step S1003.

In step S1003, the system control circuit A 121 performs processing for checking and detecting the type of the connected device based on information obtained by the controller A 123 performing communication with the device determined to be connected in step S1002 by using the CC signal.

In step S1004, the system control circuit A 121 determines (detects) whether the device connected to the USB Type-C connector A 108 is the adaptor apparatus 200, based on the detection result obtained by the checking in step S1003.

In step S1004, in a case where the device connected to the USB Type-C connector A 108 of the digital camera 100 is determined to be the adaptor apparatus 200 (YES in step S1004), the processing proceeds to step S1005.

In step S1005, the switch A 122 assigns the signal group illustrated in FIG. 9A to the terminals of the USB Type-C connector A 108 based on control of the controller A 123 and the system control circuit A 121. The signal group illustrated in FIG. 9A is intended for the case where the adaptor apparatus 200 is directly connected (the state of FIG. 3A).

In step S1006, the system control circuit A 121 attempts communication start processing with the flash emission control circuit 226 of the adaptor apparatus 200. Specifically, the system control circuit A 121 transmits the EF CLOCK, STROBE CLOCK, EF CHIP SELECT, STROBE TX, and STROBE RX signals to the flash emission control IC (not illustrated) in the flash emission control circuit 226 to activate the flash emission control IC. In such a manner, the system control circuit A 121 attempts processing for starting communication with the flash emission control IC (not illustrated) in the flash emission control circuit 226 by using the EF CHIP SELECT, STROBE TX, and STROBE RX signals.

In step S1007, the system control circuit A 121 determines (detects) whether communication with the flash emission control circuit 226 (specifically, flash emission control IC (not illustrated)) is successfully established. Since the signal group illustrated in FIG. 9A for the case where the adaptor apparatus 200 is directly connected is assigned to the terminals of the USB Type-C connector A 108 in step S1005, the adaptor apparatus 200 is determined to be directly connected to the USB Type-C connector A 108 of the digital camera 100 in a case where the communication with the flash emission control circuit 226 is successfully established in this step.

In step S1007, in a case where the communication between the system control circuit A 121 and the flash emission control circuit 226 is determined to be successfully established (YES in step S1007), the processing proceeds to step S1008.

In step S1008, the system control circuit A 121 (or controller A 123) displays on the display unit 106 that the adaptor apparatus 200 is directly connected to the USB Type-C connector A 108 of the digital camera 100.

In step S1009, the system control circuit A 121 determines (detects) whether the adaptor apparatus 200 (specifically, USB Type-C plug 210) is connected to the USB Type-C connector A 108 of the digital camera 100. In a case where the adaptor apparatus 200 is determined to be connected to the USB Type-C connector A 108 of the digital camera 100 (YES in step S1009), the processing proceeds to step S1009. That is, in step S1009, the system control circuit A 121 waits until the adaptor apparatus 200 is determined to not be connected.

In step S1009, in a case where the adaptor apparatus 200 is determined to not be connected to the USB Type-C connector A 108 of the digital camera 100 (NO in step S1009), the processing proceeds to step S1010.

In step S1010, the switch A 122 assigns the standard signal group of USB Type-C illustrated in FIG. 9C to the terminals of the USB Type-C connector A 108, based on control of the controller A 123 and the system control circuit A 121. The processing then returns to step S1002, and the processing of step S1002 and subsequent steps is performed.

In step S1007, in a case where the communication between the system control circuit A 121 and the flash emission control circuit 226 is determined to not be successfully established (NO in step S1007), the processing proceeds to step S1011.

In step S1011, the switch A 122 assigns the signal group illustrated in FIG. 9B to the terminals of the USB Type-C connector A 108 based on control of the controller A 123 and the system control circuit A 121. The signal group illustrated in FIG. 9B is intended for the case where the adaptor apparatus 200 is connected via the communication cable 310 (the state of FIG. 3B).

The reason why the signal assignment is changed to that illustrated in FIG. 9B in step S1011 if the communication between the system control circuit A 121 and the flash emission control circuit 226 is not successfully established in step S1007 (NO in step S1007) will be described below.

In step S1005 of FIG. 10, the signal assignment illustrated in FIG. 9A for the case where the adaptor apparatus 200 is directly connected (the state of FIG. 3A) is applied to the USB Type-C connector A 108. If the USB Type-C plug 210 of the adaptor apparatus 200 is in fact directly inserted into the USB Type-C connector A 108 of the digital camera 100, the digital camera 100 and the adaptor apparatus 200 can normally communicate with each other. The communication between the system control circuit A 121 and the flash emission control circuit 226 is therefore successfully established unless the adaptor apparatus 200 is failed. On the other hand, if the adaptor apparatus 200 and the digital camera 100 are in fact connected via the communication cable 310, as illustrated in FIG. 9B, the communication cable 310 is unable to transmit the signals assigned to the terminals B5, B6, B7, and B11 of the USB Type-C connector A 108 of the digital camera 100.

If the signal assignment of the USB Type-C connector A 108 illustrated in FIG. 9A is applied, the SW1, SW2, and EF CLOCK signals which are the signals assigned to the terminals B5, B6, and B7 are unable to be communicated between the adaptor apparatus 200 and the digital camera 100. If the flash emission control circuit 226 of the adaptor apparatus 200 does not receive the EF CLOCK signal, the flash emission control IC (not illustrated) inside of the flash emission control circuit 226 is unable to operate normally. As a result, the system control circuit A 121 is unable to establish communication with the flash emission control circuit 226 (specifically, flash emission control IC (not illustrated)).

In the present exemplary embodiment, in a case where the communication between the system control circuit A 121 and the flash emission control circuit 226 is not successfully established (NO in step S1007), then in step S1011, the switch A 122 applies the signal assignment illustrated in FIG. 9B to the USB Type-C connector A 108.

Now, return to the description of FIG. 10.

When the processing of step S1011 ends, the processing proceeds to step S1012.

In step S1012, like step S1006, the system control circuit A 121 attempts the communication start processing with the flash emission control circuit 226 of the adaptor apparatus 200. Specifically, the system control circuit A 121 transmits the EF CLOCK, STROBE CLOCK, EF CHIP SELECT, STROBE TX, and STROBE RX signals to the flash emission control IC (not illustrated) in the flash emission control circuit 226 to activate the flash emission control IC. In such a manner, the system control circuit A 121 attempts the processing for starting communication with the flash emission control IC (not illustrated) in the flash emission control circuit 226 by using the EF CHIP SELECT, STROBE TX, and STROBE RX signals.

In step S1013, the system control circuit A 121 determines (detects) whether communication with the flash emission control circuit 226, specifically, flash emission control IC (not illustrated), is successfully established. Since the signal group illustrated in FIG. 9B for the case where the adaptor apparatus 200 is connected via the communication cable 310 is assigned to the terminals of the USB Type-C connector A 108 in step S1011, the adaptor apparatus 200 is determined to be connected to the USB Type-C connector A 108 of the digital camera 100 via the communication cable 310 if the communication with the flash emission control circuit 226 is successfully established in this step.

In step S1013, in a case where the communication between the system control circuit A 121 and the flash emission control circuit 226 is determined to be successfully established (YES in step S1013), the processing proceeds to step S1014.

In step S1014, the system control circuit A 121 (or controller A 123) displays on the display unit 106 that the adaptor apparatus 200 is connected to the USB Type-C connector A 108 of the digital camera 100 via the communication cable 310.

In step S1013, in a case where the communication between the system control circuit A 121 and the flash emission control circuit 226 is determined to not be successfully established (NO in step S1013), the processing proceeds to step S1015.

In step S1015, the system control circuit A 121 (or controller A 123) displays on the display unit 106 that the adaptor apparatus 200 is failed.

When the processing of step S1014 ends or the processing of step S1015 ends, the processing proceeds to step S1016.

In step S1016, the system control circuit A 121 determines (detects) whether the adaptor apparatus 200, specifically, communication cable 310, is connected to the USB Type-C connector A 108 of the digital camera 100. In a case where the adaptor apparatus 200 is determined to be connected to the USB Type-C connector A 108 of the digital camera 100 (YES in step S1016), the processing proceeds to step S1016. That is, in step S1016, the system control circuit A 121 waits until the adaptor apparatus 200 is determined to not be connected.

In step S1016, in a case where the adaptor apparatus 200 is determined to not be connected to the USB Type-C connector A 108 of the digital camera 100 (NO in step S1016), the processing proceeds to step S1010. In step S1010, the switch A 122 performs the foregoing signal assignment processing.

In step S1004, in a case where the device connected to the USB Type-C connector A 108 of the digital camera 100 is determined to not be the adaptor apparatus 200 (NO in step S1004), the processing proceeds to step S1017.

In step S1017, the system control circuit A 121 performs processing for establishing communication using a USB method between the digital camera 100 and the device determined to be connected in step S1002. Since the communication using a USB method is a widely known technique, a description thereof will be omitted.

In step S1018, the system control circuit A 121 determines whether the device is connected to the USB Type-C connector A 108 which is the external interface connector of the digital camera 100. In a case where the device is determined to be connected to the USB Type-C connector A 108 of the digital camera 100 (YES in step S1018), the processing proceeds to step S1018. That is, in step S1018, the system control circuit A 121 waits until the device is determined to not be connected.

In step S1018, in a case where the device is determined to not be connected to the USB Type-C connector A 108 of the digital camera 100 (NO in step S1018), the processing returns to step S1002, and the processing of step S1002 and subsequent steps is performed. If the processing returns to step S1002, the switch A 122 maintains the state in which the standard signal group of USB Type-C illustrated in FIG. 9C is assigned to the terminals of the USB Type-C connector A 108.

In the digital camera 100 according to the present exemplary embodiment described above, the system control circuit A 121 detects whether the adaptor apparatus 200 is electrically connected via the USB Type-C connector A 108 (steps S1002 to S1004, S1009, and S1016 of FIG. 10). The system control circuit A 121 performing such detection processing is included in a first detection unit. In the foregoing description of FIG. 10, the detection processing is described to be performed by the system control circuit A 121. However, the present exemplary embodiment is not limited thereto. For example, the controller A 123 may perform the detection processing.

The switch A 122 then changes the signal group to be assigned to the terminals of the USB Type-C connector A 108 (between the signal group (first signal group) based on the processing of steps S1001 and S1010 of FIG. 10 and the signal group (second signal group) based on the processing of steps S1005 and S1011 of FIG. 10) according to the result of detection by the foregoing system control circuit A 121 whether the adaptor apparatus 200 is connected.

With such a configuration, the signal group to be assigned to the terminals of the general-purpose USB connector is changed. This can provide high versatility without causing an increase in the size of the USB connector. The digital camera 100 according to the present exemplary embodiment includes the USB Type-C connector A 108 as the only external interface connector. The digital camera 100 can thus be reduced in size, compared to when the accessory shoe 204 and the remote release cable connection connector 212 are included in addition to the USB Type-C connector A 108.

Specifically, in the present exemplary embodiment described above, if the adaptor apparatus 200 is not connected, the switch A 122 assigns the signal group compliant with the USB standard (first signal group) to the terminals of the USB Type-C connector A 108 (steps S1001 and S1010 of FIG. 10).

If the adaptor apparatus 200 is connected, the switch A 122 assigns a signal group (second signal group) different from the signal group compliant with the USB standard (first signal group) to the terminals of the USB Type-C connector A 108 (steps S1005 and S1011 of FIG. 10). With such a configuration, if the adaptor apparatus 200 is not connected, the signal group compliant with the USB standard is assigned to the terminals of the USB Type-C connector A 108. This enables communication with electronic devices equipped with a communication unit of the USB standard which is prevalent in the world. If the adaptor apparatus 200 is connected, a signal group different from the one compliant with the USB standard is assigned to the terminals of the USB Type-C connector A 108. This allows use of other devices via the adaptor apparatus 200. For example, if the adaptor apparatus 200 is connected, the signals corresponding to the accessory shoe 204 and the remote release cable connection connector 212 provided on the adaptor apparatus 200 are assigned to the terminals of the USB Type-C connector A 108. The external flash unit 320 and the remote release cable 321 can thus be used via the adaptor apparatus 200.

In the present exemplary embodiment described above, the system control circuit A 121 detects whether the adaptor apparatus 200 is directly connected to the USB Type-C connector A 108 (step S1007 of FIG. 10). The system control circuit A 121 performing such detection processing is included in a second detection unit. In the foregoing description of FIG. 10, the detection processing is described to be performed by the system control circuit A 121. However, the present exemplary embodiment is not limited thereto. For example, the controller A 123 may perform the detection processing.

The switch A 122 then changes the foregoing second signal group to be assigned to the terminals of the USB Type-C connector A 108 (steps S1005 and S1011 of FIG. 10), according to the result of detection, by the foregoing system control circuit A 121, of whether the adaptor apparatus 200 is directly connected.

In the present exemplary embodiment described above, the switch A 122 assigns at least some of the signals constituting the foregoing second signal group to different terminals of the USB Type-C connector A 108 (FIGS. 9A and 9B), according to whether the adaptor apparatus 200 is directly connected to the USB Type-C connector A 108.

In the present exemplary embodiment described above, the signal groups for the switch A 122 to assign to the terminals of the USB Type-C connector A 108 include signals for performing communications compliant with the USB 2.0 standard and the USB 3.1 standard which are a plurality of USB standards having different communication speeds.

In the present exemplary embodiment, the adaptor apparatus 200 includes the USB Type-C connectors D 203, 206, and 207. The adaptor apparatus 200 can be configured so that if, for example, the digital camera 100 and the adaptor apparatus 200 are directly connected, one path is secured for communication of the USB 2.0 standard, and one for communication of the USB 3.1 standard. The adaptor apparatus 200 can be configured so that if, for example, the adaptor apparatus 200 and the digital camera 100 are connected via the communication cable 310, one path is secured for communication of the USB 2.0 standard. If electronic devices equipped with a communication unit of the USB standard are connected to the adaptor apparatus 200, the electronic devices and the digital camera 100 can perform communication according to the USB standard.

In the present exemplary embodiment, if the digital camera 100 and the adaptor apparatus 200 are directly connected, in which case the number of usable terminals of the USB Type-C connector A 108 is large, communication of the USB 3.1 standard can be performed in addition to communication of the USB 2.0 standard. The terminals of the USB Type-C connector A 108 can thus be effectively utilized.

The signal assignments to the terminals of the USB Type-C connector A 108 of the digital camera 100, illustrated in FIGS. 9A and 9B are merely examples. The exemplary embodiment of the present disclosure is not limited thereto. For example, signal assignments other than those illustrated in FIGS. 9A and 9B are also applicable to the exemplary embodiment of the present disclosure as long as the external flash unit 320 and the remote release cable 321 can be used and the signal assignments are capable of communication compliant with the USB standards.

A second exemplary embodiment includes parts common to those described in the first exemplary embodiment with reference to FIGS. 1A to 8. A detailed description of the common parts will be omitted.

In the present exemplary embodiment, the user can switch operation modes of the digital camera 100 by operating the mode dial 105. Examples of operation modes include a still image capturing mode for capturing a still image, a moving image capturing mode for capturing a moving image, and a playback mode for displaying a captured image on the display unit 106. When the digital camera 100 is operating in the still image capturing mode, the user can switch between a state of enabling light emission and a state of disabling light emission of the external flash unit (320 in FIG. 4) by making predetermined operations on the group of various operation buttons 107. The state of enabling light emission refers to a state in which the external flash unit (320 in FIG. 4) is caused to emit light if the system control circuit (121 in FIG. 6) of the digital camera 100 determines that the light emission of the external flash unit (320 in FIG. 4) is desirable for the purpose of still image capturing, based on various conditions including ambient brightness. The state of disabling light emission refers to a state in which the external flash unit (320 in FIG. 4) is not caused to emit light regardless of various conditions including the ambient brightness.

FIGS. 11A to 11F are tables illustrating examples of signal groups to be assigned to the terminals of the USB Type-C connector A 108 of the digital camera 100 included in camera systems according to the present exemplary embodiment.

FIG. 11A will initially be described.

FIG. 11A is a chart illustrating an example of the signal group to be assigned to the terminals of the USB Type-C connector A 108 in a case where the external flash unit 320 is attached to the adaptor apparatus 200 and the external flash unit 320 is in a use state in the camera system illustrated in FIG. 6, i.e., in the camera system illustrated in FIG. 3A in which the digital camera 100 and the adaptor apparatus 200 are directly connected.

The case where the external flash unit 320 is in a use state refers to one where the external flash unit 320 is attached to the accessory shoe 204 of the adaptor apparatus 200, the operation mode of the digital camera 100 is the still image capturing mode, and the digital camera 100 enables light emission of the external flash unit 320.

As illustrated in FIGS. 11A to 11F, the USB Type-C connector A 108 of the digital camera 100 has a two-row terminal layout structure including an A row and a B row. The USB Type-C connector A 108 includes 12 terminals in each row, or a total of 24 terminals. In the examples illustrated in FIGS. 11A to 11F, the terminals in the A row are named A1 to A12. The terminals in the B row are named B1 to B12.

As illustrated in FIG. 11A, a GND signal is assigned to the terminals A1, A12, B1, and B12. The GND signal is a ground signal serving as a reference potential of the digital camera 100 and the adaptor apparatus 200. A TX1+ signal, a TX1− signal, an RX1− signal, and an RX1+ signal are assigned to the terminals A2, A3, B10, and B11, respectively. The TX1+ and TX1− signals constitute a pair of differential signals, and the RX1+ and RX1− signals constitute another pair of differential signals. The TX1+, TX1−, RX1+, and RX1− signals are signals for performing communication compliant with the USB 3.1 standard.

A VBUS signal is assigned to the terminals A4, A9, B4, and B9. The VBUS signal is a signal for transferring power. A CC1 signal is assigned to the terminal A5. The CC1 signal is a signal for exchanging information between the controller A 123 in the digital camera 100 and a controller in another device connected via the USB Type-C connector A 108. By communication using the CC1 signal, the digital camera 100 can learn a communication method of the other device connected, and the other device can learn a communication method of the digital camera 100. For example, if the digital camera 100 is connected to the adaptor apparatus 200 via the USB Type-C connector A 108, the digital camera 100 and the adaptor apparatus 200 can learn each other's communication methods. Since what the connected device is can thus be found out, the digital camera 100 can identify its connection partner as the adaptor apparatus 200. The adaptor apparatus 200 can identify its connection partner as the digital camera 100. As will be described below with reference to the flowchart of FIG. 12, the digital camera 100 and the device connected to the digital camera 100 perform communication by using the CC1 signal before predetermined signals are assigned to the terminals in the USB Type-C connector A 108 of the digital camera 100.

A D+ signal and a D− signal are assigned to the terminals A6 and A7, respectively. The D+ and D− signals constitute a pair of differential signals. The D+ and D− signals are signals for performing communication compliant with the USB 2.0 standard. An SW1 signal and an SW2 signal are assigned to the terminals B5 and B6, respectively. As described above, the SW1 and SW2 signals are signals serving as a trigger for the system control circuit A 121 of the digital camera 100 to perform the imaging preparation processing and the image capturing processing.

A STROBE FLASH signal, a STROBE DET SW signal, an EF CLOCK signal, a STROBE CLOCK signal, an EF CHIP SELECT signal, a STROBE TX signal, and a STROBE RX signal are assigned to the terminals B8, A8, B7, A10, B3, A11, and B2, respectively. Such signals are signals related to the external flash unit 320 attached to the accessory shoe 204. Specifically, the STROBE FLASH signal is a signal for the flash emission control circuit 226 to transmit the external flash unit emission instruction signal to the flash emission control switch 225 if the flash emission control circuit 226 detects the STROBE FLASH signal. The STROBE DET SW signal is a signal for detecting whether the external flash unit 320 is mounted on the accessory shoe 204. The EF CLOCK signal is a clock signal for the flash emission control integrated circuit (IC) (not illustrated) in the flash emission control circuit 226 to operate.

The STROBE TX signal is a signal for transmitting information from the system control circuit A 121 of the digital camera 100 to the flash emission control IC (not illustrated). The STROBE RX signal is a signal for transmitting information from the flash emission control IC (not illustrated) to the system control circuit A 121 of the digital camera 100. The STROBE CLOCK signal is a reference clock signal during communication using the STROBE TX and STROBE RX signals. The EF CHIP SELECT signal is a signal for maintaining the communication using the STROBE TX and STROBE RX signals between the system control circuit A 121 of the digital camera 100 and the flash emission control IC (not illustrated). The system control circuit A 121 of the digital camera 100 and the flash emission control IC (not illustrated) can exchange various types of information by performing the communication using the STROBE TX and STROBE RX signals. Examples of the information include setting information about an imaging condition of the digital camera 100 and information about whether flash emission by the external flash unit 320 is available.

The SW1, SW2, STROBE FLASH, STROBE DET SW, EF CLOCK, STROBE CLOCK, EF CHIP SELECT, STROBE TX, and STROBE RX signals are signals that do not exist in the standard signal assignment of USB Type-C to be described below. Since such signals are dedicated signals to be used only when the adaptor apparatus 200 and the digital camera 100 are connected, the signals are hereinafter referred to as "dedicated signals".

Next, FIG. 11B will be described.

FIG. 11B is a diagram illustrating an example of the signal group to be assigned to the terminals of the USB Type-C connector A 108 in a case where the external flash unit 320 is attached to the adaptor apparatus 200 and the external flash unit 320 is in a use state in the camera system illustrated in FIG. 7, i.e., the camera system illustrated in FIG. 3B in which the digital camera 100 and the adaptor apparatus 200 are connected via the communication cable 310. In FIG. 11B, signals similar to those described in FIG. 11A are designated by the same reference symbols.

As illustrated in FIG. 11B, the GND signal is assigned to the terminals A1, A12, B1, and B12. The VBUS signal is assigned to the terminals A4, A9, B4, and B9. The CC1 signal is assigned to the terminal A5. The D+ and D− signals are assigned to the terminals A6 and A7, respectively. The SW1 and SW2 signals are assigned to the terminals A2 and A3, respectively.

The STROBE FLASH, STROBE DET SW, EF CLOCK, STROBE CLOCK, EF CHIP SELECT, STROBE TX, and STROBE RX signals are assigned to the terminals B8, A8, B10, A10, B3, A11, and B2, respectively. No signal is assigned to the terminal B5, B6, B7, or B11.

Differences between the signal assignment illustrated in FIG. 11A and the signal assignment illustrated in FIG. 11B are described below.

The SW1 and SW2 signals which are assigned to the terminals B5 and B6 in FIG. 11A are assigned to the terminals A2 and A3 in FIG. 11B. The EF CLOCK signal which is assigned to the terminal B7 in FIG. 11A is assigned to the terminal B10 in FIG. 11B. In FIG. 11B, no signal is assigned to the terminal B5, B6, B7, or B11. The TX1+, TX1−, RX1−, and RX1+ signals, which are assigned to the terminals A2, A3, B10, and B11 in FIG. 11A, respectively, are not assigned to any of the terminals in FIG. 11B. In other words, the signal assignment in FIG. 11B is not capable of communication compliant with the USB 3.1 standard.

The reason why the signal assignments differ as illustrated in FIGS. 11A and 11B between the camera system illustrated in FIG. 6 (camera system illustrated in FIG. 3A in which the digital camera 100 and the adaptor apparatus 200 are directly connected) and the camera system illustrated in FIG. 7 (camera system illustrated in FIG. 3B in which the digital camera 100 and the adaptor apparatus 200 are connected via the communication cable 310) is described below.

There are two types of communication cables compliant with the USB Type-C standard. One is a cable without the signal terminals corresponding to the terminals B5, B6, and B7. The other is a cable without the signal terminals corresponding to the terminals B6 and B7. The purpose of such configurations is to reduce the number of conductor lines in the cable to reduce the thickness and hardness of the cable.

The communication cable 310 according to the present exemplary embodiment is assumed to be one without the signal terminals corresponding to the terminals B5, B6, and B7. Suppose that one end of the communication cable 310 is inserted into the USB Type-C connector B 211 of the adaptor apparatus 200, and the other end of the communication cable 310 is inserted into the USB Type-C connector A 108 of the digital camera 100. In such a case, if the signal assignment illustrated in FIG. 11A is applied, the SW1, SW2, and EF CLOCK signals are unable to be exchanged between the digital camera 100 and the adaptor apparatus 200. In FIG. 11B, the SW1, SW2, and EF CLOCK signals are therefore assigned to the terminals A2, A3, and B10, respectively, which have corresponding signal terminals in the communication cable 310, not to the terminals B5, B6, and B7 which have no corresponding signal terminal in the communication cable 310.

On the other hand, if the USB Type-C plug 210 of the adaptor apparatus 200 is directly inserted into the USB Type-C connector A 108 of the digital camera 100, all the 24 terminals can be used to exchange signals. In FIG. 11A, the SW1, SW2, and EF CLOCK signals are therefore assigned to the terminals B5, B6, and B7, respectively. In FIG. 11A, the TX1+, TX1−, RX1−, and RX1+ signals are respectively assigned to the terminals A2, A3, and B10, to which the SW1, SW2, and EF CLOCK signals are assigned in FIG. 11B, and the terminal B11, which is a vacant terminal in FIG. 11B. For example, if an accessory compliant with the USB 3.1 standard is connected to the USB Type-C connector D 203 provided on the adaptor apparatus 200, the digital camera 100 can therefore perform communication according to the USB 3.1 standard with the accessory compliant with the USB 3.1 standard, connected to the USB Type-C connector D 203, via the adaptor apparatus 200.

As described above, in the present exemplary embodiment, the signal assignment of the dedicated signals to the terminals in the USB Type-C connector A 108 of the digital camera 100 is changed according to whether the digital camera 100 and the adaptor apparatus 200 are connected directly or via the communication cable 310. The signal assignment is changed to give priority to enabling the exchange of the dedicated signals between the digital camera 100 and the adaptor apparatus 200.

Next, FIG. 11C will be described.

FIG. 11C is a table illustrating an example of the signal group to be assigned to the terminals of the USB Type-C connector A 108 in the camera system illustrated in FIG. 8, i.e., the camera system illustrated in FIG. 5 in which the digital camera 100 and the smartphone 330 are connected via the communication cable 310. The smartphone 330 is an example of another device capable of USB connection. In FIG. 11C, signals similar to those described in FIG. 11A are designated by the same reference symbols.

As illustrated in FIG. 11C, the GND signal is assigned to the terminals A1, A12, B1, and B12. The TX1+, TX1−, RX1−, and RX1+ signals are assigned to the terminals A2, A3, B10, and B11, respectively. A TX2+ signal, a TX2− signal, an RX2− signal, and an RX2+ signal are assigned to the terminals B2, B3, A10, and A11, respectively. The TX2+, TX2−, RX2−, and RX2+ signals have roles similar to those of the TX1+, TX1−, RX1−, and RX1+ signals. More specifically, the TX2+ and TX2− signals constitute a pair of differential signals and the RX2+ and RX2− signals constitute another pair of differential signals. These differential signals are used to perform communication compliant with the USB 3.1 standard. The VBUS signal is assigned to the terminals A4, A9, B4, and B9. The CC1 signal is assigned to the terminal A5. The D+ and D− signals are assigned to the terminals A6 and A7, respectively. The D+ and D− signals are also assigned to the terminals B6 and B7, respectively. A CC2 signal, an SBU1 signal, and an SBU2 signal are assigned to the terminals B5, A8, and B8, respectively. The CC2 signal is a signal having a role similar to that of the CC1 signal. The SBU1 and SBU2 signals are preliminary signals and have no particular role.

The signal assignment illustrated in FIG. 11C is the standard signal assignment defined by the standardization organization of USB Type-C. If the smartphone 330, an example of another device capable of USB communication, is connected to the USB Type-C connector A 108 of the digital camera 100 as in the camera system of FIG. 5, the digital camera 100 and the smartphone 330 can thus perform communication compliant with the USB standard with each other.

Next, FIG. 11D will be described.

FIG. 11D is a diagram illustrating an example of the signal group to be assigned to the terminals of the USB Type-C connector A 108 in a case where the external flash unit 320 attachable to the adaptor apparatus 200 is in a non-use state in the camera system illustrated in FIG. 6, i.e., the camera system illustrated in FIG. 3A in which the digital camera 100 and the adaptor apparatus 200 are directly connected. In FIG. 11D, signals similar to those described in FIGS. 11A and 11C are designated by the same reference symbols.

The case where the external flash unit 320 is in a non-use state refers to one where the digital camera 100 operates in a state in which at least one of the following conditions is satisfied. The conditions include that the external flash unit 320 is not attached (not connected) to the accessory shoe 204 of the adaptor apparatus 200, that the operation mode of the digital camera 100 is other than the still image capturing mode (the digital camera 100 is not operating in the still image capturing mode), and that light emission of the external flash unit 320 is disabled.

As illustrated in FIG. 11D, the GND signal is assigned to the terminals A1, A12, B1, and B12. The VBUS signal is assigned to the terminals A4, A9, B4, and B9. The CC1 signal is assigned to the terminal A5. The CC2 signal is assigned to the terminal B5. The SBU2 signal is assigned to the terminal B8. The D+ and D− signals are assigned to the terminals A6 and A7, respectively. The SW1 and SW2 signals are assigned to the terminals B6 and B7, respectively. The STROBE DET SW signal is assigned to the terminal A8. The TX1+, TX1−, RX1−, and RX1+ signals are assigned to the terminals A2, A3, B10, and B11, respectively. The TX2+, TX2−, RX2−, and RX2+ signals are assigned to the terminals B2, B3, A10, and A11, respectively.

Differences between the signal assignment illustrated in FIG. 11A and the signal assignment illustrated in FIG. 11D are described below.

The SW1 and SW2 signals which are assigned to the terminals B5 and B6 in FIG. 11A are assigned to the terminals B6 and B7 in FIG. 11D. The CC2 and SBU2 signals which are not assigned in FIG. 11A are assigned to the terminals B5 and B8 in FIG. 11D, respectively. The STROBE FLASH, EF CLOCK, STROBE CLOCK, EF CHIP SELECT, STROBE TX, and STROBE RX signals which are assigned to the terminals B8, B7, A10, B3, A11, and B2 in FIG. 11A, respectively, are not assigned to any of the terminals in FIG. 11D. The TX2+, TX2−, RX2−, and RX2+ signals which are not assigned in FIG. 11A are assigned to the terminals B2, B3, A10, and A11 in FIG. 11D, respectively.

The reason why the signal assignments differ as illustrated in FIGS. 11A and 11D according to whether the external flash unit 320 is in a use state despite the same camera system illustrated in FIG. 3A in which the digital camera 100 and the adaptor apparatus 200 are directly connected with each other will be described below.

If the external flash unit 320 is in a use state, the system control circuit A 121 of the digital camera 100 needs to communicate with the flash emission control circuit 226 of the adaptor apparatus 200 to make the external flash unit 320 emit light according to need. Specifically, the system control circuit A 121 and the flash emission control circuit 226 need to perform communication using the STROBE FLASH, EF CLOCK, STROBE CLOCK, EF CHIP SELECT, STROBE TX, and STROBE RX signals.

On the other hand, if the external flash unit 320 is in a non-use state, the system control circuit A 121 of the digital camera 100 does not need to make the external flash unit 320 emit light. In FIG. 11D, the STROBE FLASH, EF CLOCK, STROBE CLOCK, EF CHIP SELECT, STROBE TX, and STROBE RX signals therefore do not need to be assigned. In FIG. 11D, the terminals B2, B3, A10, and A11 not occupied by the assignment of such signals are then allocated for the TX2+, TX2−, RX2−, and RX2+ signals, respectively. This results in two systems of USB 3.1 communication in FIG. 11D, while there is only one system in FIG. 11A. The digital camera 100 and the adaptor apparatus 200 can thus perform high-capacity communication therebetween.

Note that the STROBE DET SW signal, which is also a signal related to the external flash unit 320, is assigned to the terminal A8 in FIG. 11D. The reason is that the STROBE DET SW signal is a signal needed for the system control circuit A 121 of the digital camera 100 to determine whether the external flash unit 320 is mounted on the accessory shoe 204 of the adaptor apparatus 200. In the present exemplary embodiment, the STROBE DET SW signal is therefore assigned to the USB Type-C connector A 108 regardless of whether the external flash unit 320 is in a use state or in a non-use state.

Next, FIG. 11E will be described.

FIG. 11E is a diagram illustrating an example of the signal group to be assigned to the terminals of the USB Type-C connector A 108 in a case where the external flash unit 320 attachable to the adaptor apparatus 200 is in a non-use state and the digital camera 100 and the adaptor apparatus 200 are in a state of needing USB 2.0 communication therebetween in the camera system illustrated in FIG. 7, i.e., the camera system illustrated in FIG. 3B in which the digital camera 100 and the adaptor apparatus 200 are connected with each other via the communication cable 310. In FIG. 11E, signals similar to those described in FIGS. 11A and 11C are designated by the same reference symbols.

The case where the digital camera 100 and the adaptor apparatus 200 are in a state of needing USB 2.0 communication therebetween refers to one where another device capable of USB 2.0 communication and not capable of USB 3.1 communication is connected to at least any one of the USB Type-C connectors D 203, 206, and 207 of the adaptor apparatus 200.

As illustrated in FIG. 11E, the GND signal is assigned to the terminals A1, A12, B1, and B12. The VBUS signal is assigned to the terminals A4, A9, B4, and B9. The CC1 signal is assigned to the terminal A5. The SBU2 signal is assigned to the terminal B8. The D+ and D− signals are assigned to the terminals A6 and A7, respectively. The SW1 and SW2 signals are assigned to the terminals A2 and A3, respectively. The STROBE DET SW signal is assigned to the terminal A8. The TX2+, TX2−, RX2−, and RX2+ signals are assigned to the terminals B2, B3, A10, and A11, respectively. No signal is assigned to the terminal B5, B6, B7, B10, or B11.

Differences between the signal assignment illustrated in FIG. 11B and the signal assignment illustrated in FIG. 11E are described below.

The SBU2 signal which is not assigned in FIG. 11B is assigned to the terminal B8 in FIG. 11E. The STROBE FLASH, EF CLOCK, STROBE CLOCK, EF CHIP SELECT, STROBE TX, and STROBE RX signals which are assigned to the terminals B8, B10, A10, B3, A11, and B2 in FIG. 11B, respectively, are not assigned to any of the terminals in FIG. 11E. The TX2+, TX2−, RX2−, and RX2+ signals which are not assigned in FIG. 11B are assigned to the terminals B2, B3, A10, and A11 in FIG. 11E, respectively.

The reason why the signal assignments differ as illustrated in FIGS. 11B and 11E according to whether the external flash unit 320 is in a use state despite the same camera system in which the digital camera 100 and the adaptor apparatus 200 are connected with each other via the communication cable 310 will be described below.

If the external flash unit 320 is in a use state, the system control circuit A 121 of the digital camera 100 needs to communicate with the flash emission control circuit 226 of the adaptor apparatus 200 to make the external flash unit 320 emit light according to need. Specifically, the system control circuit A 121 and the flash emission control circuit 226 need to perform communication using the STROBE FLASH, EF CLOCK, STROBE CLOCK, EF CHIP SELECT, STROBE TX, and STROBE RX signals.

On the other hand, if the external flash unit 320 is in a non-use state, the system control circuit A 121 of the digital camera 100 does not need to make the external flash unit 320 emit light. In FIG. 11E, the STROBE FLASH, EF CLOCK, STROBE CLOCK, EF CHIP SELECT, STROBE TX, and STROBE RX signals therefore do not need to be assigned. In FIG. 11E, the terminals B2, B3, A10, and A11 not occupied by the assignment of such signals are then allocated for the TX2+, TX2−, RX2−, and RX2+ signals, respectively. This provides a system of USB 3.1 communication in FIG. 11E, while there is none in FIG. 11B. The digital camera 100 and the adaptor apparatus 200 can thus perform USB 3.1 communication therebetween. In other words, the signal assignment illustrated in FIG. 11E enables one system of USB 3.1 communication and one system of USB 2.0 communication between the digital camera 100 and the adaptor apparatus 200.

Note that the STROBE DET SW signal, which is also a signal related to the external flash unit 320, is assigned to the terminal A8 in FIG. 11E. The reason is that the STROBE DET SW signal is a signal needed for the system control circuit A 121 of the digital camera 100 to determine whether the external flash unit 320 is mounted on the accessory shoe 204 of the adaptor apparatus 200. In the present exemplary embodiment, the STROBE DET SW signal is therefore assigned to the USB Type-C connector A 108 regardless of whether the external flash unit 320 is in a use state or in a non-use state.

Next, FIG. 11F will be described.

FIG. 11F is a diagram illustrating an example of the signal group to be assigned to the terminals of the USB Type-C connector A 108 in a case where the external flash unit 320 attachable to the adaptor apparatus 200 is in a non-use state and the digital camera 100 and the adaptor apparatus 200 are in a state of not needing USB 2.0 communication therebetween in the camera system illustrated in FIG. 7, i.e., the camera system illustrated in FIG. 3B in which the digital camera 100 and the adaptor apparatus 200 are connected with each other via the communication cable 310. In FIG. 11E, signals similar to those described in FIGS. 11A and 11C are designated by the same reference symbols.

The case where the digital camera 100 and the adaptor apparatus 200 is in a state of not needing USB 2.0 communication therebetween refers to one where another device capable of USB 2.0 communication and not capable of USB 3.1 communication is not connected to any of the USB Type-C connectors D 203, 206, and 207 of the adaptor apparatus 200. What device(s) is/are connected to the USB Type-C connectors D 203, 206, and 207 can be detected by the controller B 222 of the adaptor apparatus 200.

As illustrated in FIG. 11F, the GND signal is assigned to the terminals A1, A12, B1, and B12. The VBUS signal is assigned to the terminals A4, A9, B4, and B9. The CC1 signal is assigned to the terminal A5. The SBU2 signal is assigned to the terminal B8. The SW1 and SW2 signals are assigned to the terminals A6 and A7, respectively. The STROBE DET SW signal is assigned to the terminal A8. The TX1+, TX1−, RX1−, and RX1+ signals are assigned to the terminals A2, A3, B10, and B11, respectively. The TX2+, TX2−, RX2−, and RX2+ signals are assigned to the terminals B2, B3, A10, and A11, respectively. No signal is assigned to the terminal B5, B6, or B7.

Differences between the signal assignment illustrated in FIG. 11E and the signal assignment illustrated in FIG. 11F are described below.

The SW1 and SW2 signals which are assigned to the terminals A2 and A3 in FIG. 11E, respectively, are assigned to the terminals A6 and A7 in FIG. 11F, respectively. The D+ and D− signals which are assigned in FIG. 11E are not assigned in FIG. 11F. The TX1+, TX1−, RX1−, and RX1+ signals which are not assigned in FIG. 11E are assigned to the terminals A2, A3, B10, and B11 in FIG. 11F, respectively.

The reason why the signal assignments differ as illustrated in FIGS. 11E and 11F according to whether USB 2.0 communication is needed despite the same camera system in which the digital camera 100 and the adaptor apparatus 200 are connected with each other via the communication cable 310 and although the external flash unit 320 is similarly in a non-use state will be described below.

In a state of needing USB 2.0 communication, the D+ and D− signals need to be assigned to the USB Type-C connector A 108 for the sake of performing USB 2.0 communication.

In a state of not needing USB 2.0 communication, the D+ and D− signals do not need to be assigned to the USB Type-C connector A 108. The D+ and D− signals which are assigned to the terminals A6 and A7, respectively, in FIG. 11E in a state of needing USB 2.0 communication are therefore not assigned to any of the terminals in FIG. 11F in a state of not needing USB 2.0 communication. The SW1 and SW2 signals which are assigned to the terminals A2 and A3, respectively, in FIG. 11E in a state of needing USB 2.0 communication are then assigned to the terminals A6 and A7, respectively, in FIG. 11F in a state of not needing USB 2.0 communication.

In FIG. 11F, the TX1+ and TX1− signals are assigned to the resulting vacant terminals A2 and A3, respectively. The RX1− and RX1+ signals are assigned to the terminals B10 and B11, respectively, which are also vacant in FIG. 11E. This results in two systems of USB 3.1 communication in FIG. 11F, whereas there is only one in FIG. 11E. The digital camera 100 and the adaptor apparatus 200 can thus perform communication of higher capacity using USB 3.1 communication therebetween. In other words, the signal assignment of FIG. 11F enables two systems of USB 3.1 communication between the digital camera 100 and the adaptor apparatus 200 by not assigning the D+ and D− signals for unneeded USB 2.0 communication to the terminals of the USB Type-C connector A 108.

In the present exemplary embodiment, the digital camera 100 switches the assignments of signals illustrated in FIGS. 11A to 11F to the terminals in the USB Type-C connector A 108 based on predetermined determinations. Details of such signal assignment processing for the terminals in the USB Type-C connector A 108 will be described below with reference to FIGS. 12 to 14.

Figure 12:
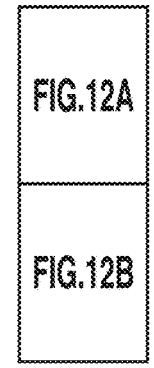
FIG. 12 is a diagram including flowcharts of FIGS. 12A and 12B illustrating an example of a detailed processing procedure of signal assignment processing for the terminals in the USB Type-C connector A of the digital camera (imaging apparatus) according to the second exemplary embodiment of the present disclosure.
Figure 12A:
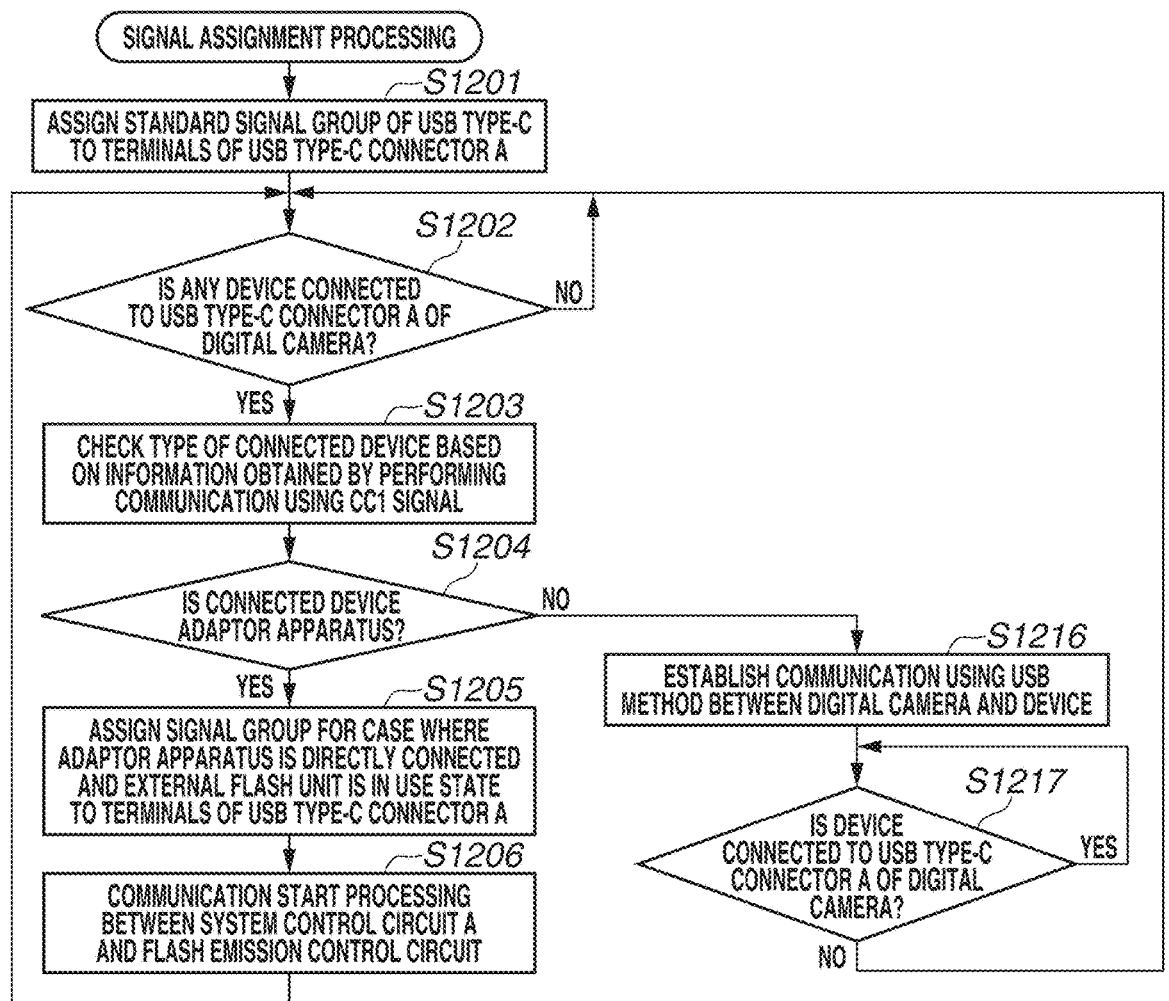
Figure 12B:
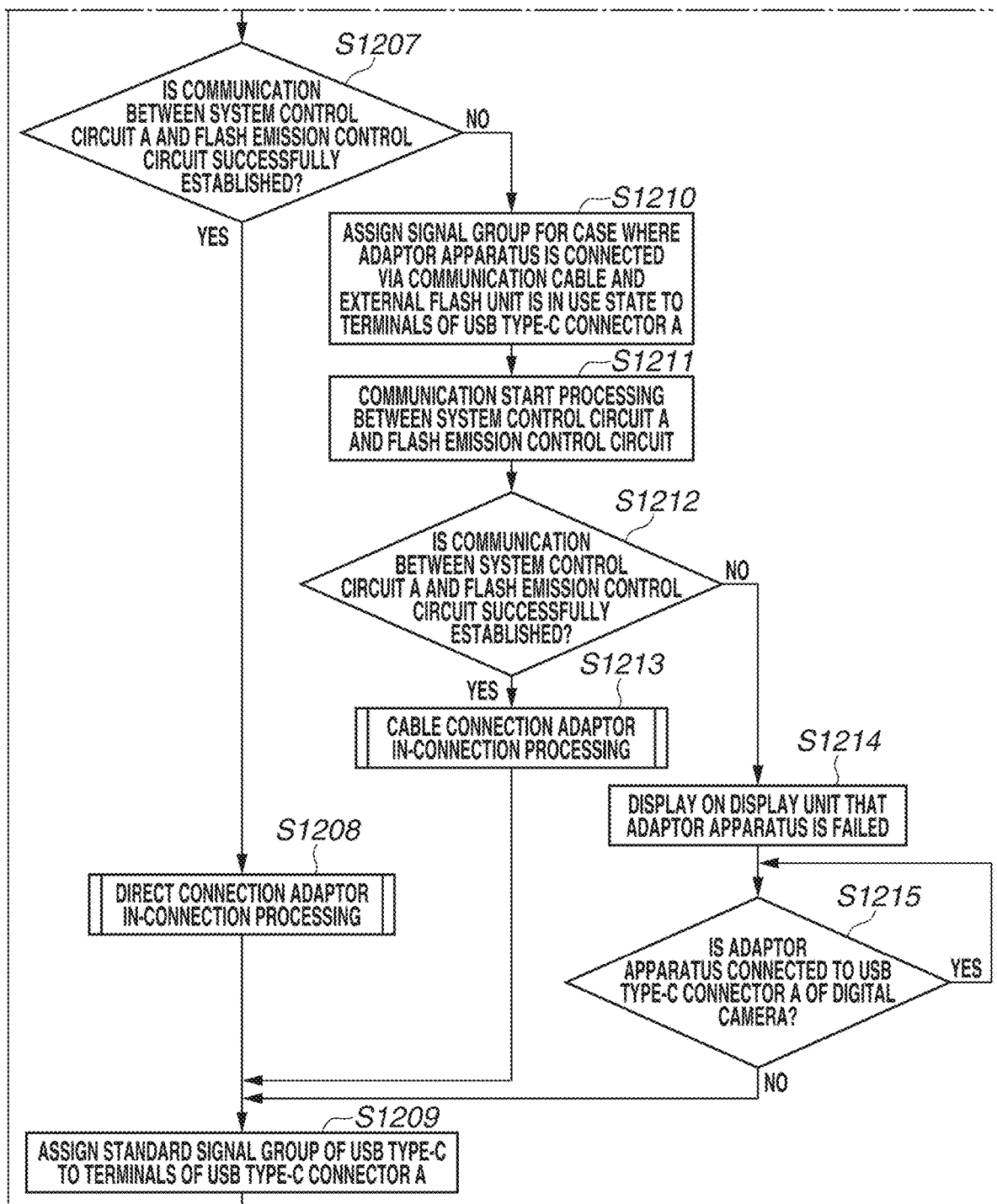

FIG. 12 is a flowchart illustrating an example of a detailed processing procedure of the signal assignment processing for the terminals in the USB Type-C connector A 108 of the digital camera (imaging apparatus) 100 according to the present exemplary embodiment. Specifically, in the present exemplary embodiment, FIG. 12 corresponds to a flowchart illustrating an example of the processing procedure of a method for controlling the digital camera (imaging apparatus) 100 according to the present exemplary embodiment.

If the user presses the power button 103, for example, the system control circuit A 121 turns on power of the digital camera 100. In step S1201, the switch A 122 assigns the standard signal group of USB Type-C illustrated in FIG. 11C to the terminals of the USB Type-C connector A 108 based on control of the controller A 123 and the system control circuit A 121.

In step S1202, the system control circuit A 121 determines (detects), for example, via the controller A 123 whether any device is connected to the USB Type-C connector A 108 of the digital camera 100. In a case where no device is determined to be connected to the USB Type-C connector A 108 (NO in step S1202), the processing proceeds to step S1202. That is, in step S1202, the system control circuit A 121 waits until a device is determined to be connected to the USB Type-C connector A 108.

In step S1202, in a case where a device is determined to be connected to the USB Type-C connector A 108 (YES in step S1202), the processing proceeds to step S1203.

In step S1203, the system control circuit A 121 performs processing for checking and detecting the type of the connected device based on information obtained by the controller A 123 performing communication with the device determined to be connected in step S1202 by using the CC1 signal.

In step S1204, the system control circuit A 121 determines (detects) whether the device connected to the USB Type-C connector A 108 is the adaptor apparatus 200, based on the detection result obtained by the checking in step S1203.

In step S1204, in a case where the device connected to the USB Type-C connector A 108 of the digital camera 100 is determined to be the adaptor apparatus 200 (YES in step S1204), the processing proceeds to step S1205.

In step S1205, the switch A 122 assigns the signal group illustrated in FIG. 11A to the terminals of the USB Type-C connector A 108 based on control of the controller A 123 and the system control circuit A 121. The signal group illustrated in FIG. 11A is intended for the case where the adaptor apparatus 200 is directly connected (the state of FIG. 3A) and the external flash unit 320 connected to the adaptor apparatus 200 is in a use state.

In step S1206, the system control circuit A 121 attempts communication start processing with the flash emission control circuit 226 of the adaptor apparatus 200. Specifically, the system control circuit A 121 transmits the EF CLOCK, STROBE CLOCK, EF CHIP SELECT, STROBE TX, and STROBE RX signals to the flash emission control IC (not illustrated) in the flash emission control circuit 226 to activate the flash emission control IC. In such a manner, the system control circuit A 121 attempts processing for starting communication with the flash emission control IC (not illustrated) in the flash emission control circuit 226 by using the EF CHIP SELECT, STROBE TX, and STROBE RX signals.

In step S1207, the system control circuit A 121 determines (detects) whether communication with the flash emission control circuit 226 (specifically, flash emission control IC (not illustrated)) is successfully established. Since the signal group illustrated in FIG. 11A for the case where the adaptor apparatus 200 is directly connected is assigned to the terminals of the USB Type-C connector A 108 in step S1205, the adaptor apparatus 200 is determined to be directly connected to the USB Type-C connector A 108 of the digital camera 100 in a case where the communication with the flash emission control circuit 226 is successfully established in this step.

In step S1207, in a case where the communication between the system control circuit A 121 and the flash emission control circuit 226 is determined to be successfully established (YES in step S1207), the processing proceeds to step S1208.

In step S1208, the system control circuit A 121 performs direct connection adaptor in-connection processing to be described below with reference to FIG. 13.

When the processing of step S1208 ends, the processing proceeds to step S1209.

In step S1209, the switch A 122 assigns the standard signal group of USB Type-C illustrated in FIG. 11C to the terminals of the USB Type-C connector A 108 based on control of the controller A 123 and the system control circuit A 121. The processing then returns to step S1202, and the processing of step S1202 and subsequent steps is performed.

In step S1207, in a case where the communication between the system control circuit A 121 and the flash emission control circuit 226 is determined to not be successfully established (NO in step S1207), the processing proceeds to step S1210.

In step S1210, the switch A 122 assigns the signal group illustrated in FIG. 11B to the terminals of the USB Type-C connector A 108 based on control of the controller A 123 and the system control circuit A 121. The signal group illustrated in FIG. 11B is intended for the case where the adaptor apparatus 200 is connected via the communication cable 310 (the state of FIG. 3B) and the external flash unit 320 connected to the adaptor apparatus 200 is in a use state.

The reason why the signal assignment is changed to that illustrated in FIG. 11B in step S1210 if the communication between the system control circuit A 121 and the flash emission control circuit 226 is not successfully established in step S1207 (NO in step S1207) will be described below.

In step S1205 of FIG. 12, the signal assignment illustrated in FIG. 11A for the case where the adaptor apparatus 200 is directly connected (the state of FIG. 3A) and the external flash unit 320 is in a use state is applied to the USB Type-C connector A 108. If the USB Type-C plug 210 of the adaptor apparatus 200 is in fact directly inserted into the USB Type-C connector A 108 of the digital camera 100, the digital camera 100 and the adaptor apparatus 200 can normally communicate with each other. The communication between the system control circuit A 121 and the flash emission control circuit 226 is therefore successfully established unless the adaptor apparatus 200 is failed. On the other hand, if the adaptor apparatus 200 and the digital camera 100 are in fact connected via the communication cable 310, as illustrated in FIG. 11B, the communication cable 310 is unable to transmit the signals assigned to the terminals B5, B6, and B7 of the USB Type-C connector A 108 of the digital camera 100.

If the signal assignment of the USB Type-C connector A 108 illustrated in FIG. 11A is applied, the SW1, SW2, and EF CLOCK signals which are the signals assigned to the terminals B5, B6, and B7 are unable to be communicated between the adaptor apparatus 200 and the digital camera 100. If the flash emission control circuit 226 of the adaptor apparatus 200 does not receive the EF CLOCK signal, the flash emission control IC (not illustrated) inside of the flash emission control circuit 226 is unable to operate normally. As a result, the system control circuit A 121 is unable to establish communication with the flash emission control circuit 226 (specifically, flash emission control IC (not illustrated)).

In the present exemplary embodiment, in a case where the communication between the system control circuit A 121 and the flash emission control circuit 226 is not successfully established (NO in step S1207), then in step S1210, the switch A 122 applies the signal assignment illustrated in FIG. 11B to the USB Type-C connector A 108.

Now, return to the description of FIG. 12.

When the processing of step S1210 ends, the processing proceeds to step S1211.

In step S1211, like step S1206, the system control circuit A 121 attempts the communication start processing with the flash emission control circuit 226 of the adaptor apparatus 200. Specifically, the system control circuit A 121 transmits the EF CLOCK, STROBE CLOCK, EF CHIP SELECT, STROBE TX, and STROBE RX signals to the flash emission control IC (not illustrated) in the flash emission control circuit 226 to activate the flash emission control IC. In such a manner, the system control circuit A 121 attempts the processing for starting communication with the flash emission control IC (not illustrated) in the flash emission control circuit 226 by using the EF CHIP SELECT, STROBE TX, and STROBE RX signals.

In step S1212, the system control circuit A 121 determines (detects) whether communication with the flash emission control circuit 226, specifically, flash emission control IC (not illustrated, is successfully established. Since the signal group illustrated in FIG. 11B for the case where the adaptor apparatus 200 is connected via the communication cable 310 is assigned to the terminals of the USB Type-C connector A 108 in step S1210, the adaptor apparatus 200 is determined to be connected to the USB Type-C connector A 108 of the digital camera 100 via the communication cable 310 if the communication with the flash emission control circuit 226 is successfully established in this step.

In step S1212, in a case where the communication between the system control circuit A 121 and the flash emission control circuit 226 is determined to be successfully established (YES in step S1212), the processing proceeds to step S1213.

In step S1213, the system control circuit A 121 performs cable connection adaptor in-connection processing to be described below with reference to FIG. 14. When the processing of step S1213 ends, the processing proceeds to step S1209. The processing of step S1209 and subsequent steps is then performed.

In step S1212, in a case where the communication between the system control circuit A 121 and the flash emission control circuit 226 is determined to not be successfully established (NO in step S1212), the processing proceeds to step S1214.

In step S1214, the system control circuit A 121 (or controller A 123) displays on the display unit 106 that the adaptor apparatus 200 is failed.

In step S1215, the system control circuit A 121 determines (detects) whether the adaptor apparatus 200 (specifically, communication cable 310) is connected to the USB Type-C connector A 108 of the digital camera 100. In a case where the adaptor apparatus 200 is determined to be connected to the USB Type-C connector A 108 of the digital camera 100 (YES in step S1215), the processing proceeds to step S1215. That is, in step S115, the system control circuit A 121 waits until the adaptor apparatus 200 is determined to not be connected.

In step S1215, in a case where the adaptor apparatus 200 is determined to not be connected to the USB Type-C connector A 108 of the digital camera 100 (NO in step S1215), the processing proceeds to step S1209, and the processing of step S1209 and subsequent steps is performed.

In step S1204, in a case where the device connected to the USB Type-C connector A 108 of the digital camera 100 is determined to not be the adaptor apparatus 200 (NO in step S1204), the processing proceeds to step S1216.

In step S1216, the system control circuit A 121 performs processing for establishing communication using a USB method between the digital camera 100 and the device determined to be connected in step S1202. Since the communication using a USB method is a widely known technique, a description thereof will be omitted.

In step S1217, the system control circuit A 121 determines whether the device is connected to the USB Type-C connector A 108 which is the external interface connector of the digital camera 100. In a case where the device is determined to be connected to the USB Type-C connector A 108 of the digital camera 100 (YES in step S1217), the processing proceeds to step S1217. That is, in step S1217, the system control circuit A 121 waits until the device is determined to not be connected.

In step S1217, in a case where the device is determined to not be connected to the USB Type-C connector A 108 of the digital camera 100 (NO in step S1217), the processing returns to step S1202, and the processing of step S1202 and subsequent steps is performed. If the processing returns to step S1202, the switch A 122 maintains the state in which the standard signal group of USB Type-C illustrated in FIG. 11C is assigned to the terminals of the USB Type-C connector A 108.

Next, a detailed processing procedure of the direct connection adaptor in-connection processing in step S1208 of FIG. 12 will be described.

Figure 13:
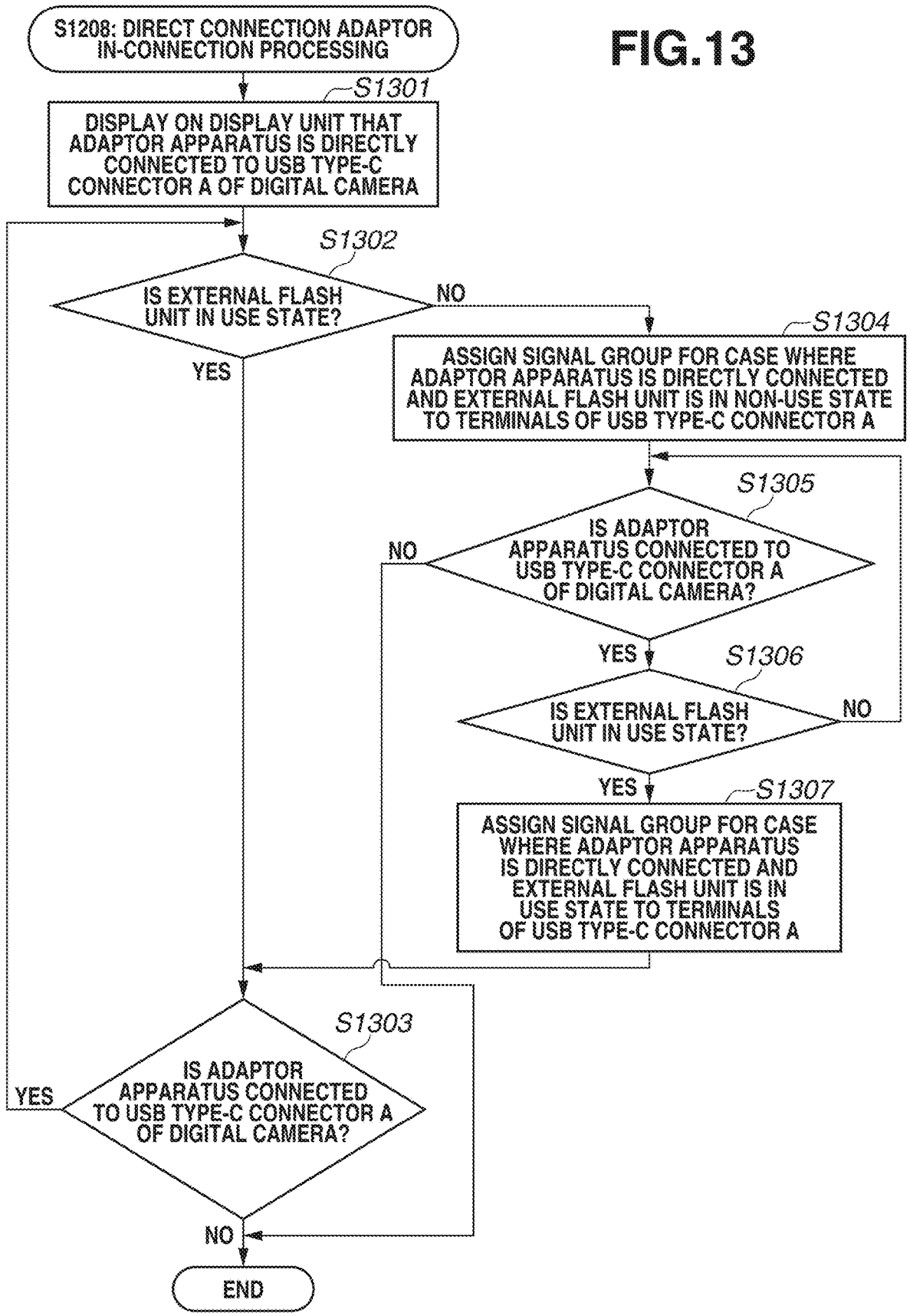
FIG. 13 is a flowchart illustrating an example of a detailed processing procedure of direct connection adaptor in-connection processing in step S1208 of FIG. 12, according to one or more embodiment of the present disclosure.

FIG. 13 is a flowchart illustrating an example of the detailed processing procedure of the direct connection adaptor in-connection processing in step S1208 of FIG. 12.

If the processing of step S1208 in FIG. 12 is started, then in step S1301 of FIG. 13, the system control circuit A 121 (or controller A 123) displays on the display unit 106 that the adaptor apparatus 200 is directly connected to the USB Type-C connector A 108 of the digital camera 100.

In step S1302, the system control circuit A 121 determines whether the external flash unit 320 is in a use state, for example, based on communication with the flash emission control circuit 226.

In step S1302, in a case where the external flash unit 320 is determined to be in a use state (YES in step S1302), the processing proceeds to step S1303.

In step S1303, the system control circuit A 121 determines (detects) whether the adaptor apparatus 200 (specifically, USB Type-C plug 210) is connected to the USB Type-C connector A 108 of the digital camera 100. In a case where the adaptor apparatus 200 is determined to be connected to the USB Type-C connector A 108 of the digital camera 100 (YES in step S1303), the processing returns to step S1302, and the processing of step S1302 and subsequent steps is performed.

In step S1303, in a case where the adaptor apparatus 200 is determined to not be connected to the USB Type-C connector A 108 of the digital camera 100 (NO in step S1303), the processing of the flowchart of FIG. 13 ends. The processing proceeds to step S1209 of FIG. 12.

In step S1302, in a case where the external flash unit 320 is determined to not be in a use state (to be in a non-use state) (NO in step S1302), the processing proceeds to step S1304.

In step S1304, the switch A 122 assigns the signal group illustrated in FIG. 11D to the terminals of the USB Type-C connector A 108 based on control of the controller A 123 and the system control circuit A 121. The signal group illustrated in FIG. 11D is intended for the case where the adaptor apparatus 200 is directly connected (the state of FIG. 3A) and the external flash unit 320 connected to the adaptor apparatus 200 is in a non-use state.

In step S1305, the system control circuit A 121 determines (detects) whether the adaptor apparatus 200 (specifically, USB Type-C plug 210) is connected to the USB Type-C connector A 108 of the digital camera 100. In a case where the adaptor apparatus 200 is determined to not be connected to the USB Type-C connector A 108 of the digital camera 100 (NO in step S1305), the processing of the flowchart FIG. 13 ends. The processing proceeds to step S1209 of FIG. 12.

In step S205, in a case where the adaptor apparatus 200 is determined to be connected to the USB Type-C connector A 108 of the digital camera 100 (YES in step S1305), the processing proceeds to step S1306.

In step S1306, the system control circuit A 121 determines whether the external flash unit 320 is in a use state, for example, based on communication with the flash emission control circuit 226. In a case where the external flash unit 320 is determined to not be in a use state (to be in a non-use state) (NO in step S1306), the processing returns to step S1305. The processing of step S1305 and subsequent steps is then performed.

In step S1306, in a case where the external flash unit 320 is determined to be in a use state (YES in step S1306), the processing proceeds to step S1307.

In step S1307, the switch A 122 assigns the signal group illustrated in FIG. 11A to the terminals of the USB Type-C connector A 108, based on control of the controller A 123 and the system control circuit A 121. The signal group illustrated in FIG. 11A is intended for the case where the adaptor apparatus 200 is directly connected (the state of FIG. 3A) and the external flash unit 320 connected to the adaptor apparatus 200 is in a use state. The processing then proceeds to step S1303, and the processing of step S1303 and subsequent steps is performed.

Next, a detailed processing procedure of the cable connection adaptor in-connection processing in step S1213 of FIG. 12 will be described.

Figure 14:
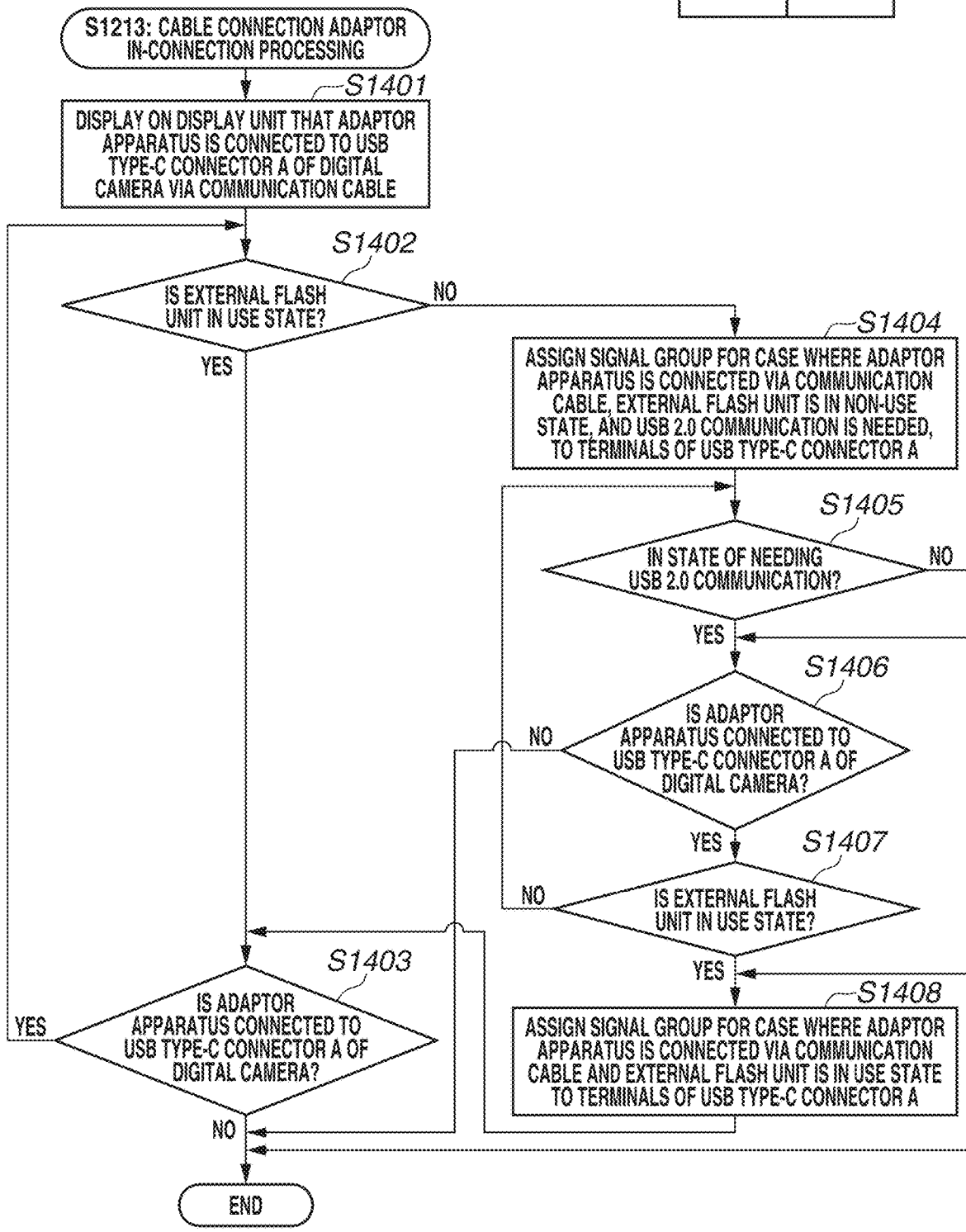
FIG. 14 is a diagram including flowcharts of FIGS. 14A and 14B illustrating an example of a detailed processing procedure of cable connection adaptor in-connection processing in step S1213 of FIG. 12, according to one or more embodiment of the present disclosure.

FIG. 14 is a flowchart illustrating an example of the detailed processing procedure of the cable connection adaptor in-connection processing in step S1213 of FIG. 12.

If the processing of step S1213 of FIG. 12 is started, then in step S1401 of FIG. 14, the system control circuit A 121 (or controller A 123) displays on the display unit 106 that the adaptor apparatus 200 is connected to the USB Type-C connector A 108 of the digital camera 100 via the communication cable 310.

In step S1402, the system control circuit A 121 determines whether the external flash unit 320 is in a use state, for example, based on communication with the flash emission control circuit 226.

In step S1402, in a case where the external flash unit 320 is determined to be in a use state (YES in step S1402), the processing proceeds to step S1403.

In step S1403, the system control circuit A 121 determines (detects) whether the adaptor apparatus 200 (specifically, communication cable 310) is connected to the USB Type-C connector A 108 of the digital camera 100. In a case where the adaptor apparatus 200 is determined to be connected to the USB Type-C connector A 108 of the digital camera 100 (YES in step S1403), the processing returns to step S1402. The processing of step S1402 and subsequent steps is then performed.

In step S1403, in a case where the adaptor apparatus 200 is determined to not be connected to the USB Type-C connector A 108 of the digital camera 100 (NO in step S1403), the processing of the flowchart of FIG. 14 ends. The processing proceeds to step S1209 of FIG. 12.

In step S1402, in a case where the external flash unit 320 is determined to not be in a use state (to be in a non-use state) (NO in step S1402), the processing proceeds to step S1404.

In step S1404, the switch A 122 assigns the signal group illustrated in FIG. 11E to the terminals of the USB Type-C connector A 108 based on control of the controller A 123 and the system control circuit A 121. The signal group illustrated in FIG. 11E is intended for the case where the adaptor apparatus 200 is connected via the communication cable 310 (the state of FIG. 3B), the external flash unit 320 connected to the adaptor apparatus 200 is in a non-use state, and USB 2.0 communication with the adaptor apparatus 200 is needed.

In step S1405, the system control circuit A 121 determines whether the digital camera 100 and the adaptor apparatus 200 are in a state of needing USB 2.0 communication therebetween, for example, based on communication with the controller B 222.

In step S1405, in a case where the digital camera 100 and the adaptor apparatus 200 are determined to be in a state of needing USB 2.0 communication (YES in step S1405), the processing proceeds to step S1406.

In step S1406, the system control circuit A 121 determines (detects) whether the adaptor apparatus 200 (specifically, communication cable 310) is connected to the USB Type-C connector A 108 of the digital camera 100. In a case where the adaptor apparatus 200 is determined to not be connected to the USB Type-C connector A 108 of the digital camera 100 (NO in step S1406), the processing of the flowchart of FIG. 14 ends. The processing proceeds to step S1209 of FIG. 12.

In step S1406, in a case where the adaptor apparatus 200 is determined to be connected to the USB Type-C connector A 108 of the digital camera 100 (YES in step S1406), the processing proceeds to step S1407.

In step S1407, the system control circuit A 121 determines whether the external flash unit 320 is in a use state, for example, based on communication with the flash emission control circuit 226. In a case where the external flash unit 320 is determined to not be in a use state (to be in a non-use state) (NO in step S1407), the processing returns to step S1405. The processing of step S1405 and subsequent steps is then performed.

In step S1407, in a case where the external flash unit 320 is determined to be in a use state (YES in step S1407), the processing proceeds to step S1408.

In step S1408, the switch A 122 assigns the signal group illustrated in FIG. 11B to the terminals of the USB Type-C connector A 108, based on control of the controller A 123 and the system control circuit A 121. The signal group illustrated in FIG. 11B is intended for the case where the adaptor apparatus 200 is connected via the communication cable 310 (the state of FIG. 3B) and the external flash unit 320 connected to the adaptor apparatus 200 is in a use state. The processing then proceeds to step S1403, and the processing of step S1403 and subsequent steps is performed.

In step S1405, in a case where the digital camera 100 and the adaptor apparatus 200 are determined to not be in a state of needing USB 2.0 communication (NO in step S1405), the processing proceeds to step S1409.

In step S1409, the switch A 122 assigns the signal group illustrated in FIG. 11F to the terminals of the USB Type-C connector A 108, based on control of the controller A 123 and the system control circuit A 121. The signal group illustrated in FIG. 11F is intended for the case where the adaptor apparatus 200 is connected via the communication cable 310 (the state of FIG. 3B), the external flash unit 320 connected to the adaptor apparatus 200 is in a non-use state, and USB 2.0 communication with the adaptor apparatus 200 is not needed.

In step S1410, the system control circuit A 121 determined (detects) whether the adaptor apparatus 200 (specifically, communication cable 310) is connected to the USB Type-C connector A 108 of the digital camera 100. In a case where the adaptor apparatus 200 is determined to not be connected to the USB Type-C connector A 108 of the digital camera 100 (NO in step S1410), the processing of the flowchart of FIG. 14 ends. The processing proceeds to step S1209 of FIG. 12.

In step S1410, in a case where the adaptor apparatus 200 is determined to be connected to the USB Type-C connector A 108 of the digital camera 100 (YES in step S1410), the processing proceeds to step S1411.

In step S1411, the system control circuit A 121 determines whether the external flash unit 320 is in a use state, for example, based on communication with the flash emission control circuit 226. In a case where the external flash unit 320 is determined to be in a use state (YES in step S1411), the processing proceeds to step S1408. The processing of step S1408 and subsequent steps is then performed.

In step S1411, in a case where the external flash unit 320 is determined to not be in a use state (to be in a non-use state) (NO in step S1411), the processing proceeds to step S1412.

In step S1412, the system control circuit A 121 determines whether the digital camera 100 and the adaptor apparatus 200 are in a state of needing USB 2.0 communication therebetween, for example, based on communication with the controller B 222. In a case where the digital camera 100 and the adaptor apparatus 200 are determined to not be in a state of needing USB 2.0 communication therebetween (NO in step S1412), the processing returns to step S1410. The processing of step S1410 and subsequent steps is then performed.

In step S1412, in a case where the digital camera 100 and the adaptor apparatus 200 are determined to be in a state of needing USB 2.0 communication therebetween (YES in step S1212), the processing proceeds to step S1413.

In step S1413, the switch A 122 assigns the signal group illustrated in FIG. 11E to the terminals of the USB Type-C connector A 108, based on control of the controller A 123 and the system control circuit A 121. The signal group illustrated in FIG. 11E is intended for the case where the adaptor apparatus 200 is connected via the communication cable 310 (the state of FIG. 3B), the external flash unit 320 connected to the adaptor apparatus 200 is in a non-use state, and USB 2.0 communication with the adaptor apparatus 200 is needed. The processing then proceeds to step S1406, and the processing of step S1406 and subsequent steps is performed.

In the digital camera 100 according to the present exemplary embodiment described above, the system control circuit A 121 detects whether the adaptor apparatus 200 is electrically connected via the USB Type-C connector A 108 (steps S1202 to S1204 and S1215 of FIG. 12, steps S1303 and S1305 of FIG. 13, and steps S1403, S1406, and S1410 of FIG. 14). The system control circuit A 121 performing such detection processing is included in a first detection unit. In the foregoing description of FIGS. 12 to 14, the detection processing is described to be performed by the system control circuit A 121. However, the present exemplary embodiment is not limited thereto. For example, the controller A 123 may perform the detection processing.

In a case where the adaptor apparatus 200 is detected to be electrically connected via the USB Type-C connector A 108, the system control circuit A 121 detects whether the external flash unit 320 (another device) connected to the adaptor apparatus 200 is in a use state (steps S1302 and S1306 of FIG. 13 and steps S1402, S1407, and S1411 of FIG. 14).

The system control circuit A 121 performing such detection processing is included in a second detection unit. In the foregoing description of FIGS. 13 and 14, the detection processing is described to be performed by the system control circuit A 121. However, the present exemplary embodiment is not limited thereto. For example, the controller A 123 may perform the detection processing.

The switch A 122 then changes the signal group (FIGS. 11A to 11F) to be assigned to the terminals of the USB Type-C connector A 108 according to the result of detection by the foregoing first detection unit and the result of detection by the second detection unit.

With such a configuration, the signal group to be assigned to the terminals of the general-purpose USB connector is changed. This can provide high versatility without causing an increase in the size of the USB connector. Since the signal group to be assigned to the terminals of the USB connector can be changed according to whether the external flash unit 320 is in a use state, the terminals of the USB connector can be effectively utilized, for example, by not assigning the signals related to the use state if the external flash unit 320 is in a non-use state. The digital camera 100 according to the present exemplary embodiment includes the USB Type-C connector A 108 as the only external interface connector. The digital camera 100 can thus be reduced in size, compared to when the accessory shoe 204 and the remote release cable connection connector 212 are included in addition to the USB Type-C connector A 108.

Specifically, in the present exemplary embodiment described above, if the adaptor apparatus 200 is not connected, the switch A 122 assigns the signal group (first signal group) compliant with the USB standard to the terminals of the USB Type-C connector A 108 (steps S1201 and S1209 of FIG. 12).

If the adaptor apparatus 200 is connected, the switch A 122 assigns a signal group (second signal group) different from the signal group (first signal group) compliant with the USB standard to the terminals of the USB Type-C connector A 108 (steps S1205, S1208 (FIG. 13), S1210, and S1213 (FIG. 14) of FIG. 12).

With such a configuration, if the adaptor apparatus 200 is not connected, the signal group compliant with the USB standard is assigned to the terminals of the USB connector. This enables communication with electronic devices equipped with a communication unit of the USB standard which is prevalent in the world. If the adaptor apparatus 200 is connected, a signal group different from the one compliant with the USB standard is assigned to the terminals of the USB Type-C connector A 108. This allows use of other devices via the adaptor apparatus 200. For example, if the adaptor apparatus 200 is connected, the signals corresponding to the accessory shoe 204 and the remote release cable connection connector 212 provided on the adaptor apparatus 200 are assigned to the terminals of the USB Type-C connector A 108. The external flash unit 320 and the remote release cable 321 can thus be used via the adaptor apparatus 200.

In the present exemplary embodiment described above, the system control circuit A 121 detects whether adaptor apparatus 200 is directly connected to the USB Type-C connector A 108 (steps S1207 and S1212 of FIG. 12). The system control circuit A 121 performing such detection processing is included in a third detection unit. In the foregoing description of FIG. 12, the detection processing is described to be performed by the system control circuit A 121. However, the present exemplary embodiment is not limited thereto. For example, the controller A 123 may perform the detection processing.

The switch A 122 further changes the foregoing second signal group to be assigned to the terminals of the USB Type-C connector A 108 according to the result of detection by the foregoing third detection unit (steps S1208 (FIG. 13) and S1213 (FIG. 14) of FIG. 12).

In the present exemplary embodiment described above, the switch A 122 assigns at least some of the signals constituting the foregoing second signal group to different terminals of the USB Type-C connector A 108 according to whether the adaptor apparatus 200 is directly connected to the USB Type-C connector A 108 (FIGS. 11A and 11B).

In the present exemplary embodiment described above, the signal groups for the switch A 122 to assign to the terminals of the USB Type-C connector A 108 include signals for performing communication compliant with the USB 2.0 standard and the USB 3.1 standard which are a plurality of USB standards having different communication speeds.

In the present exemplary embodiment, the adaptor apparatus 200 includes the USB Type-C connectors D 203, 206, and 207. The adaptor apparatus 200 can be configured so that if, for example, the digital camera 100 and the adaptor apparatus 200 are directly connected, one path is secured for communication of the USB 2.0 standard, and one for communication of the USB 3.1 standard. The adaptor apparatus 200 can be configured so that if, for example, the adaptor apparatus 200 and the digital camera 100 are connected via the communication cable 310, one path is secured for communication of the USB 2.0 standard. If electronic devices equipped with a communication unit of the USB standard are connected to the adaptor apparatus 200, the electronic devices and the digital camera 100 can perform communication according to the USB standard.

In the present exemplary embodiment, if the digital camera 100 and the adaptor apparatus 200 are directly connected, in which case the number of usable terminals of the USB Type-C connector A 108 is large, communication of the USB 3.1 standard can be performed in addition to communication of the USB 2.0 standard. The terminals of the USB Type-C connector A 108 can thus be effectively utilized.

In the present exemplary embodiment described above, if the external flash unit 320 (another device) is detected to be in a non-use state, the system control circuit A 121 detects whether communication compliant with the USB 2.0 standard (communication compliant with one USB standard among communications compliant with the foregoing plurality of USB standards) with the adaptor apparatus 200 is needed (steps S1405 and S1412 of FIG. 14). The system control circuit A 121 performing such detection processing is included in a fourth detection unit. In the foregoing description of FIG. 14, the detection processing is described to be performed by the system control circuit A 121. However, the present exemplary embodiment is not limited thereto. For example, the controller A 123 may perform the detection processing.

The switch A 122 then changes the foregoing second signal group to be assigned to the terminals of the USB Type-C connector A 108 according to the result of detection by the foregoing fourth detection unit (steps S1409 and S1413 of FIG. 14).

According to such a configuration, if USB 2.0 communication is not needed, the terminals of the USB connector can be effectively used by not assigning the signals for the case where USB 2.0 communication is needed.

The signal assignments to the terminals of the USB Type-C connector A 108 of the digital camera 100, illustrated in FIGS. 11A to 11F are merely examples. The exemplary embodiment of the present disclosure is not limited thereto. For example, signal assignments other than those illustrated in FIGS. 11A to 11F are also applicable to the exemplary embodiment of the present disclosure as long as the external flash unit 320 and the remote release cable 321 can be used and the signal assignments are capable of communication compliant with the USB standard. A mode in which the signal assignments to the terminals of the USB Type-C connector A 108 are changed according to the type of USB communication of other devices that are connected to the USB Type-C connectors D 203, 206, and 207 of the adaptor apparatus 200 for purposes other than connecting to the digital camera 100 is also included in the present disclosure.

In both the first and second exemplary embodiments, the adaptor apparatus 200 illustrated in FIGS. 2A, 2B, 6, and 7 is described to include the three USB Type-C connectors D 203, 206, and 207 as its USB Type-C connectors D. However, the exemplary embodiments of the present disclosure are not limited thereto. For example, more than three USB Type-C connectors D may be provided as the USB Type-C connectors D. Less than three USB Type-C connectors D may be provided as the USB Type-C connectors D. If there is provided only one USB Type-C connector D, the USB hub 224 is not needed.

In both the first and second exemplary embodiments, FIGS. 6 and 7 illustrate an example in which the flash emission control circuit 226 is provided inside the adaptor apparatus 200. However, the exemplary embodiments of the present disclosure are not limited thereto. For example, the flash emission control circuit 226 may be provided inside the digital camera 100. In such a case, the signal groups to be assigned to the terminals of the USB Type-C connector A 108 of the digital camera 100 are modified accordingly.

A third exemplary embodiment includes parts common to those described in the first exemplary embodiment with reference to FIGS. 1A to 5 and 8. A detailed description of the common parts will be omitted.

As described above in FIGS. 2A and 2B, the adaptor apparatus 200 includes the accessory shoe 204, the remote release cable connection connector 212, and the USB Type-C connectors D 203, 206, and 207 as external interfaces. If the digital camera 100 and the adaptor apparatus 200 are connected as illustrated in FIG. 3A or 3B, circuits (FIG. 15) configured inside such apparatuses are electrically connected via external interfaces provided on the apparatuses. The digital camera 100 can thus electrically connect to other devices, such as the external flash unit 320, the remote release cable 321, and electronic devices equipped with a USB communication unit of the USB standard, by using the external interfaces of the adaptor apparatus 200.

Next, connection modes of the camera systems (imaging systems) in the case where the USB Type-C plug 210 of the adaptor apparatus 200 is directly inserted into the USB Type-C connector A 108 of the digital camera 100 (the state of FIG. 3A) and in the case where one end of the communication cable 310 is inserted into the USB Type-C connector E 332 of the smartphone 330 and the other end is inserted into the USB Type-C connector A 108 of the digital camera 100 (the state of FIG. 5) will be described with reference to FIGS. 8 and 15.

Figure 15:
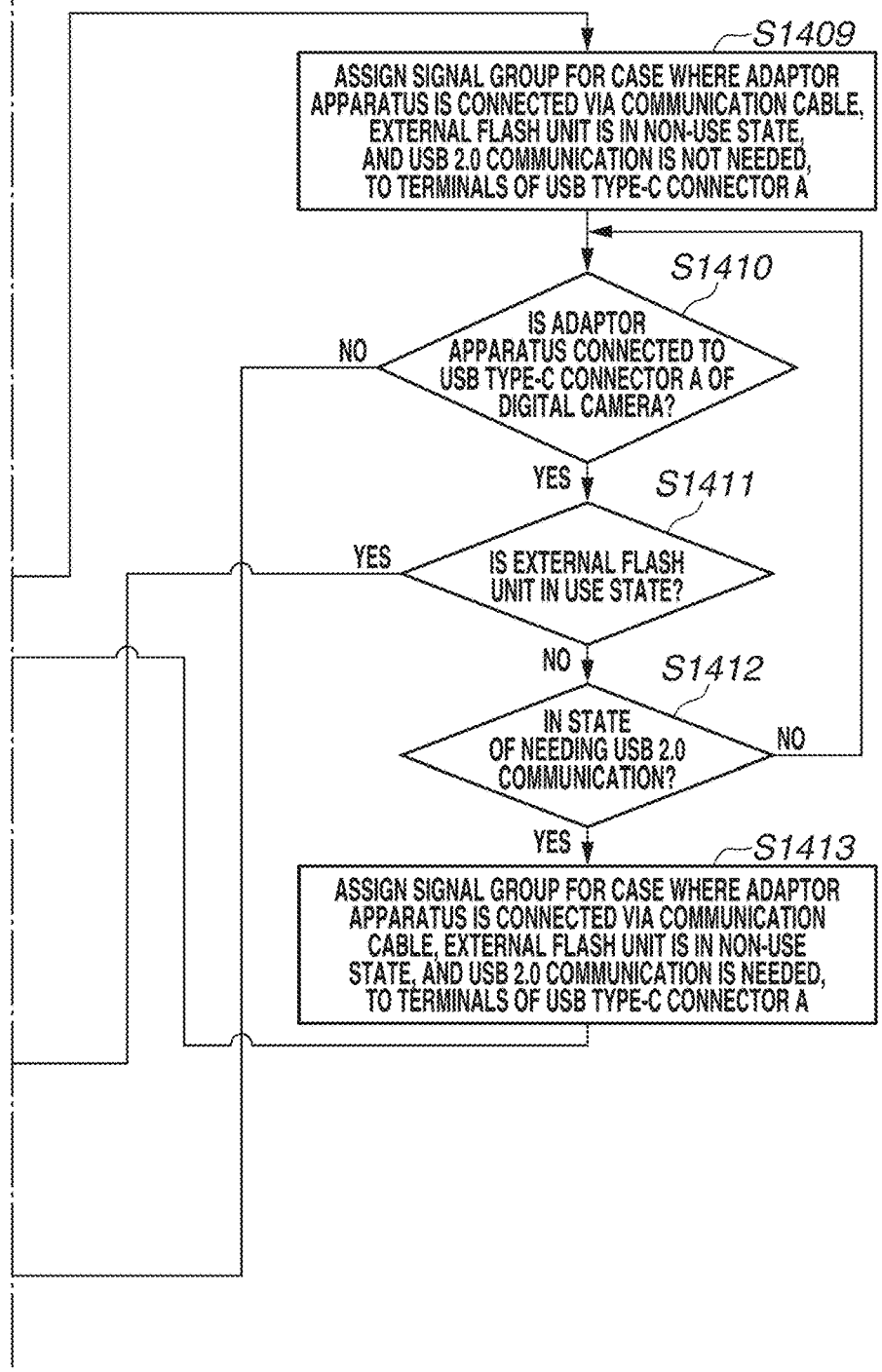
FIG. 15 is a diagram illustrating an example of a schematic configuration of a camera system according to a third exemplary embodiment of the present disclosure.

FIG. 15 is a diagram illustrating an example of a schematic configuration of the camera system in which the digital camera 100 illustrated in FIGS. 1A and 1B and the adaptor apparatus 200 illustrated in FIGS. 2A and 2B are directly connected (the camera system of FIG. 3A). In FIG. 15, components similar to those of FIGS. 1A, 1B, 2A, and 2B are designated by the same reference numerals. For simplicity of the drawing, some of the components illustrated in FIGS. 1A, 1B, 2A, and 2B are omitted.

Functional components of the digital camera 100 in FIG. 15 will be described.

The digital camera 100 illustrated in FIG. 15 includes the USB Type-C connector A 108, the system control circuit A 121, the switch A 122, and the controller A 123.

The system control circuit A 121 governs various types of control in the digital camera 100. The controller A 123 transmits a signal connection switch instruction to the switch A 122 based on instructions from the system control circuit A 121 or a result of communication with an internal controller of an external apparatus, such as the adaptor apparatus 200, that is connected to the USB Type-C connector A 108. The USB Type-C connector A 108 includes a plurality of terminals (not illustrated) inside. The switch A 122 functions as a signal assignment unit for assigning predetermined signals to the terminals in the USB Type-C connector A 108 based on the signal connection switch instruction from the controller A 123. The assignment of the predetermined signals to the terminals in the USB Type-C connector A 108 will be described in detail below. The controller A 123 also controls transfer of power with the external apparatus, such as the adaptor apparatus 200 via the USB Type-C connector A 108.

Next, functional components of the adaptor apparatus 200 in FIG. 15 will be described.

The adaptor apparatus 200 illustrated in FIG. 15 includes the release button 202, the USB Type-C connectors D 203, 206, and 207, the accessory shoe 204, the USB Type-C plug 210, the USB Type-C connector B 211, the remote release cable connection connector 212, the switch B 221, the controller B 222, the power supply circuit 223, the USB hub 224, the flash emission control switch 225, the flash emission control circuit 226, and a system control circuit B 227.

The controller B 222 transmits a signal connection switch instruction to the switch B 221 based on a result of communication with the controller A 123 in the digital camera 100 connected to the USB Type-C plug 210. The switch B 221 assigns predetermined signals to the terminals in the USB Type-C plug 210 based on the signal connection switch instruction from the controller B 222.

The controller B 222 also controls transfer of power with the digital camera 100 via the USB Type-C plug 210 or the USB Type-C connector B 211. The controller B 222 can further detect, by using a CC1 signal to be described below, whether USB devices connected to the USB Type-C connectors D 203, 206, and 207 are devices capable of USB 2.0 communication or devices capable of USB 3.1 communication. Power that the controller B 222 receives from the digital camera 100 is supplied to the power supply circuit 223. The power supply circuit 223 supplies needed power to, for example, the controller B 222, the flash emission control circuit 226, and the system control circuit B 227 in the adaptor apparatus 200. In FIG. 15, lines for supplying power from the power supply circuit 223 to the flash emission control circuit 226 and the system control circuit B 227 are omitted for simplicity of the drawing.

The flash emission control circuit 226 is a circuit for controlling light emission of the external flash unit 320 electrically connected to the accessory shoe 204 based on a control signal from the system control circuit A 121 of the digital camera 100 via the USB Type-C plug 210 or a control signal from the system control circuit B 227. If the flash emission control switch 225 receives an external flash unit emission instruction signal transmitted from the flash emission control circuit 226, the flash emission control switch 225 short-circuits an emission standby signal of the external flash unit 320 and a ground signal in the adaptor apparatus 200. The external flash unit 320 is configured to emit flash light if the emission standby signal and the ground signal in the adaptor apparatus 200 are short-circuited.

The system control circuit B 227 communicates with the system control circuit A 121 of the digital camera 100 via signal lines of the USB Type-C plug 210. For example, the system control circuit B 227 receives a command to control signals related to the external flash unit 320 connected to the accessory shoe 204 from the system control circuit A 121, and transmits signals to the flash emission control circuit 226 and the accessory shoe 204.

The USB hub 224 has the function of distributing signals for USB communication to each of the USB Type-C connectors D 203, 206, and 207. The release button 202 is an operation unit capable of detecting two levels of pressing. At a first level of detection, the release button 202 transmits an SW1 signal to the system control circuit A 121 of the digital camera 100. At a second level of detection, the release button 202 transmits an SW2 signal to the system control circuit A 121. Specifically, the signals from the release button 202 are transmitted to the system control circuit A 121 via the switch B 221, either the USB Type-C plug 210 or the USB Type-C connector B 211, and the USB Type-C connector A 108 and the switch A 122 of the digital camera 100.

Receiving the SW1 signal, the system control circuit A 121 of the digital camera 100 performs imaging preparation processing including a focus adjustment and calculation of shutter speed. Receiving the SW2 signal, the system control circuit A 121 performs image capturing processing of an image formed by the lens barrel 102. Since the imaging preparation processing and the image capturing processing are widely known techniques, a detailed description thereof will be omitted. During the image capturing processing, the external flash unit 320 performs the foregoing emission of flash light according to need.

As described above, the remote release cable connection connector 212 is a connector for connecting the remote release cable 321. The remote release cable 321 also includes an operation unit similar to the release button 202. The operation unit transmits an SW1 signal at a first level of detection, and transmits an SW2 signal at a second level of detection. In the adaptor apparatus 200, the signal path of the SW1 and SW2 signals from the release button 202 and the signal path of the SW1 and SW2 signals from the remote release cable connection connector 212 are merged together and connected to terminals in the USB Type-C plug 210 and the USB Type-C connector B 211 of the adaptor apparatus 200 via the switch B 221.

As described above, FIG. 15 is a schematic block diagram of the camera system of FIG. 3A in which the digital camera 100 and the adaptor apparatus 200 are directly connected. A schematic block diagram of the camera system of FIG. 3B will also be described below with reference to FIG. 15.

As described above, the camera system of FIG. 3B is one in which the digital camera 100 and the adaptor apparatus 200 are connected via the communication cable 310. Unlike the schematic configuration illustrated in FIG. 15, the camera system of FIG. 3B therefore has a schematic configuration such that the USB Type-C plug 210 and the USB Type-C connector A 108 are not in contact with each other, and the USB Type-C connector A 108 and the USB Type-C connector B 211 are connected via the communication cable 310. In the camera system of FIG. 3B, the functional components of the digital camera 100 and the functional components of the adaptor apparatus 200 may be the same as those of the digital camera 100 and those of the adaptor apparatus 200 illustrated in FIG. 15, respectively. Like the camera system of FIG. 3A, the camera system of FIG. 3B can also transfer power and exchange various signals as described above via the communication cable 310.

Figure 16:
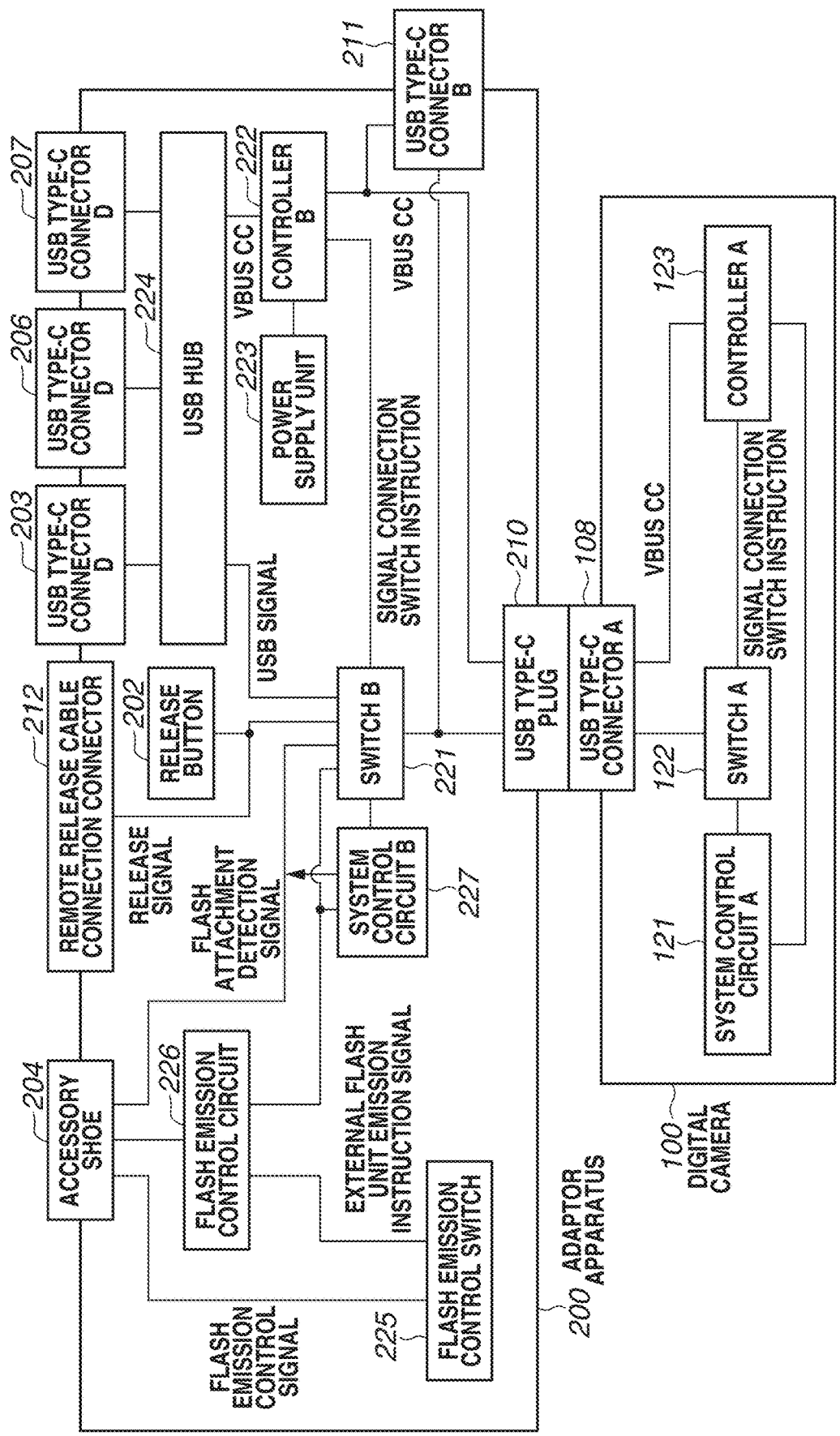
FIGS. 16A, 16B, and 16C are tables illustrating examples of signal groups to be assigned to terminals of a USB Type-C connector A of a digital camera included in camera systems according to the third exemplary embodiment of the present disclosure.

FIGS. 16A to 16C are tables illustrating examples of signal groups to be assigned to the terminals of the USB Type-C connector A 108 of the digital camera 100 included in the camera system illustrated in FIG. 15 and that illustrated in FIG. 8.

In the present exemplary embodiment, there are two types of signal assignment to the USB Type-C connector A 108 in a case where the USB Type-C plug 210 of the adaptor apparatus 200 is directly inserted into the USB Type-C connector A 108 of the digital camera 100 (the state of FIG. 3A). FIG. 16A is a chart illustrating an example of a first signal group when a first signal assignment is applied to the terminals of the USB Type-C connector A 108 in a state where the USB Type-C plug 210 is directly inserted into the USB Type-C connector A 108 (the state of FIG. 3A). FIG. 16B is a chart illustrating an example of a second signal group when a second signal assignment is applied to the terminals of the USB Type-C connector A 108 in the state where the USB Type-C plug 210 is directly inserted into the USB Type-C connector A 108 (the state of FIG. 3A).

FIG. 16C is a chart illustrating an example of a third signal group when a third signal assignment is applied to the terminals of the USB Type-C connector A 108 in a state where the smartphone 330, which is another device capable of USB communication, is connected to the USB Type-C connector A 108 of the digital camera 100 (the state of FIG. 5).

As illustrated in FIGS. 16A to 16C, the USB Type-C connector A 108 of the digital camera 100 has a two-row terminal layout structure including an A row and a B row. The USB Type-C connector A 108 includes 12 terminals in each row, or a total of 24 terminals. In the examples illustrated in FIGS. 16A to 16C, the terminals in the A row are named A1 to A12. The terminals in the B row are named B1 to B12. In FIGS. 16A to 16C, the same signals are named the same.

The first signal assignment for assigning the first signal group to the terminals of the USB Type-C connector A 108 will initially be described with reference to FIG. 16A.

As illustrated in FIG. 16A, a GND signal is assigned to the terminals A1, A12, B1, and B12. The GND signal is a ground signal serving as a reference potential of the digital camera 100 and the adaptor apparatus 200. A TX1+ signal, a TX1− signal, an RX1− signal, and an RX1+ signal are assigned to the terminals A2, A3, B10, and B11, respectively. The TX1+ and TX1− signals constitute a pair of differential signals, and the RX1+ and RX1− signals constitute another pair of differential signals. The TX1+, TX1−, RX1+, and RX1− signals are signals for performing communication according to the USB 3.1 standard.

A VBUS signal is assigned to the terminals A4, A9, B4, and B9. The VBUS signal is a signal for transferring power. The CC1 signal is assigned to the terminal A5. The CC1 signal is a signal for exchanging information between the controller A 123 in the digital camera 100 and a controller in another device connected via the USB Type-C connector A 108. By communication using the CC1 signal, the digital camera 100 can learn a communication method of the other device connected, and the other device can learn a communication method of the digital camera 100. For example, if the digital camera 100 is connected to the adaptor apparatus 200 via the USB Type-C connector A 108, the digital camera 100 and the adaptor apparatus 200 can learn each other's communication methods. Since what the connected device is can thus be found out, the digital camera 100 can identify its connection partner as the adaptor apparatus 200. The adaptor apparatus 200 can identify its connection partner as the digital camera 100. As will be described below with reference to the flowchart of FIG. 17, the digital camera 100 and the device connected to the digital camera 100 perform communication by using the CC1 signal before predetermined signals are assigned to the terminals in the USB Type-C connector A 108 of the digital camera 100.

A D+ signal and a D− signal are assigned to the terminals A6 and A7, respectively. The D+ and D− signals constitute a pair of differential signals. The D+ and D− signals are signals for performing communication according to the USB 2.0 standard. The SW1 and SW2 signals are assigned to the terminals B5 and B6, respectively. As described above, the SW1 and SW2 signals are signals serving as a trigger for the system control circuit A 121 of the digital camera 100 to perform the imaging preparation processing and the image capturing processing.

A STROBE FLASH signal, a STROBE DET SW signal, an EF CLOCK signal, a STROBE CLOCK signal, an EF CHIP SELECT signal, a STROBE TX signal, and a STROBE RX signal are assigned to the terminals B8, A8, B7, A10, B3, A11, and B2, respectively. Such signals are signals related to the external flash unit 320 attached to the accessory shoe 204. Specifically, the STROBE FLASH signal is a signal for the flash emission control circuit 226 to transmit the external flash unit emission instruction signal to the flash emission control switch 225 if the flash emission control unit 226 detects the STROBE FLASH signal. The STROBE DET SW signal is a signal for detecting whether the external flash unit 320 is mounted on the accessory shoe 204. The EF CLOCK signal is a clock signal for the flash emission control integrated circuit (IC) (not illustrated) in the flash emission control circuit 226 to operate. The STROBE TX signal is a signal for transmitting information from the system control circuit A 121 of the digital camera 100 to the flash emission control IC (not illustrated). The STROBE RX signal is a signal for transmitting information from the flash emission control IC (not illustrated) to the system control circuit A 121 of the digital camera 100. The STROBE CLOCK signal is a reference clock signal during communication using the STROBE TX and STROBE RX signals. The EF CHIP SELECT signal is a signal for maintaining the communication using the STROBE TX and STROBE RX signals between the system control circuit A 121 of the digital camera 100 and the flash emission control IC (not illustrated). The system control circuit A 121 of the digital camera 100 and the flash emission control IC (not illustrated) can exchange various types of information by performing communication using the STROBE TX and STROBE RX signals. Examples of the information include setting information about an imaging condition of the digital camera 100 and information about whether flash emission by the external flash unit 320 is available.

The SW1, SW2, STROBE FLASH, STROBE DET SW, EF CLOCK, STROBE CLOCK, EF CHIP SELECT, STROBE TX, and STROBE RX signals are signals that do not exist in the standard signal assignment of USB Type-C to be described below. Since such signals are dedicated signals to be used only when the adaptor apparatus 200 and the digital camera 100 are connected, the signals are hereinafter referred to as "dedicated signals".

Next, the second signal assignment for assigning the second signal group to the terminals of the USB Type-C connector A 108 will be described with reference to FIG. 16B. In the following description of FIG. 16B, the roles of the signal names are the same as those of the signal names described above with reference to FIG. 16A. A description thereof will thus be omitted.

As illustrated in FIG. 16B, the GND signal is assigned to the terminals A1, A12, B1, and B12. The TX1+, TX1−, RX1−, and RX1+ signals are assigned to the terminals A2, A3, B10, and B11, respectively. A TX2+ signal, a TX2− signal, an RX2− signal, and an RX2+ signal are assigned to the terminals B2, B3, A10, and A11, respectively. The TX2+, TX2−, RX2−, and RX2+ signals have roles similar to those of the TX1+, TX1−, RX1−, and RX1+ signals described above, respectively. Specifically, the TX2+ and TX2− signals constitute a pair of differential signals and the RX2+ and RX2− signals constitute another pair of differential signals. These differential signals are used to perform communication compliant with the USB 3.1 standard. The second signal assignment illustrated in FIG. 16B provides two systems of USB 3.1 communication.

The VBUS signal is assigned to the terminals A4, A9, B4, and B9. The CC1 signal is assigned to the terminal A5. An SBU1 signal and an SBU2 signal are assigned to the terminals A8 and B8, respectively. The SBU signals are used as extension signals for extending the functions of the USB Type-C connector A 108.

The SW1 and SW2 signals are assigned to the terminals B5 and B6, respectively. The D+ and D− signals are assigned to the terminals A6 and A7, respectively.

The STROBE FLASH signal is assigned to the terminal B7. According to the second signal assignment of FIG. 16B, the STROBE FLASH signal is the only signal to be singly assigned among the signals related to the external flash unit 320. The reason is described below. The system control circuit A 121 of the digital camera 100 instructs the system control circuit B 227 of the adaptor apparatus 200 to perform control about the external flash unit 320. The communication between the system control circuit A 121 and the system control circuit B 227 is performed by using the D+ and D− signals, i.e., USB 2.0 communication signals, respectively assigned to the terminals A6 and A7 as dedicated signals. Since an emission instruction to the external flash unit 320 needs to be issued in time with the release operation of the digital camera 100, the STROBE FLASH signal, the communication speed of which is important among the signals related to the external flash unit 320, is assigned as a dedicated signal. The other signals, the communication speed of which has low priority among the signals related to the external flash unit 320, are communicated by using the signal lines of the D+ and D− signals which are used, by specification, as signal lines of USB 2.0 communication. In the second signal assignment of FIG. 16B, the signal lines of the D+ and D− signals assigned to the terminals A6 and A7, respectively, are only used to perform communication between the system control circuit A 121 of the digital camera 100 and the system control circuit B 227 of the adaptor apparatus 200.

According to the first signal assignment illustrated in FIG. 16A, there is only one system of signals capable of USB 3.1 communication, namely, the TX1+, TX1−, RX1−, and RX1+ signals, and one system of signals capable of USB 2.0 communication, namely, the D+ and D− signals. In contrast, according to the second signal assignment illustrated in FIG. 16B, there are two systems of signals capable of USB 3.1 communication, namely, the TX1+, TX1−, RX1−, and RX1+ signals, and the TX2+, TX2−, RX2−, and RX2+ signals. The second signal assignment illustrated in FIG. 16B may include no signal capable of USB 2.0 communication, depending on the communication method.

For example, if the controller B 222 of the adaptor apparatus 200 illustrated in FIG. 15 detects a device connected to the USB Type-C connector D 203, 206, or 207, the controller B 222 issues instructions to the switch B 221 according to the connected device. Information about the connected device is then transmitted to the digital camera 100, for example, via the system control circuit B 227, the switch B 221, and the USB Type-C plug 210. Based on the information about the connected device, the digital camera 100 applies the first signal assignment or the second signal assignment to the terminals of the USB Type-C connector A 108.

Next, the third signal assignment for assigning the third signal group to the terminals of the USB Type-C connector A 108 will be described with reference to FIG. 16C. As described above, FIG. 16C illustrates the signal group to be assigned in the case where the smartphone 330, which is a device different from the digital camera 100 and is capable of USB communication, is connected to the USB Type-C connector A 108 of the digital camera 100 (the state of FIG. 5). Specifically, the third signal assignment for assigning the third signal group illustrated in FIG. 16C assigns the signal group compliant with the USB standard. In the following description of FIG. 16C, the roles of the signal names are the same as those of the signal names described above with reference to FIG. 16A. A description thereof will thus be omitted.

As illustrated in FIG. 16C, the GND signal is assigned to the terminals A1, A12, B1, and B12. The TX1+, TX1−, RX1−, and RX1+ signals are assigned to the terminals A2, A3, B10, and B11, respectively. The TX2+, TX2−, RX2−, and RX2+ signals are assigned to the terminals B2, B3, A10, and A11, respectively. The TX2+, TX2−, RX2−, and RX2+ signals have roles similar to those of the TX1+, TX1−, RX1−, and RX1+ signals. More specifically, the TX2+ and TX2− signals constitute a pair of differential signals and the RX2+ and RX2− signals constitute another pair of differential signals. These differential signals are used to perform communication compliant with the USB 3.1 standard. The VBUS signal is assigned to the terminals A4, A9, B4, and B9. The CC1 signal is assigned to the terminal A5. The D+ and D− signals are assigned to the terminals A6 and A7, respectively. The D+ and D− signals are also assigned to the terminals B6 and B7, respectively. A CC2 signal, the SBU1 signal, and the SBU2 signal are assigned to the terminals B5, A8, and B8, respectively. The CC2 signal is a signal having a role similar to that of the CC1 signal. The SBU1 and SBU2 signals are preliminary signals and have no particular role.

Specifically, the signal assignment illustrated in FIG. 16C is the standard signal assignment defined by the standardization organization of USB Type-C. If the smartphone 330, which is an example of another device capable of USB communication, is connected to the USB Type-C connector A 108 of the digital camera 100 as in the camera system of FIG. 5, the digital camera 100 and the smartphone 330 can thus perform communication compliant with the USB standard with each other.

In the exemplary embodiment, the digital camera 100 switches the assignment of signals illustrated in FIGS. 16A, 16B, and 16C to the terminals in the USB Type-C connector A 108 based on predetermined determinations. Details of such signal assignment processing for the terminals in the USB Type-C connector A 108 will be described below with reference to FIG. 17.

Figure 17:
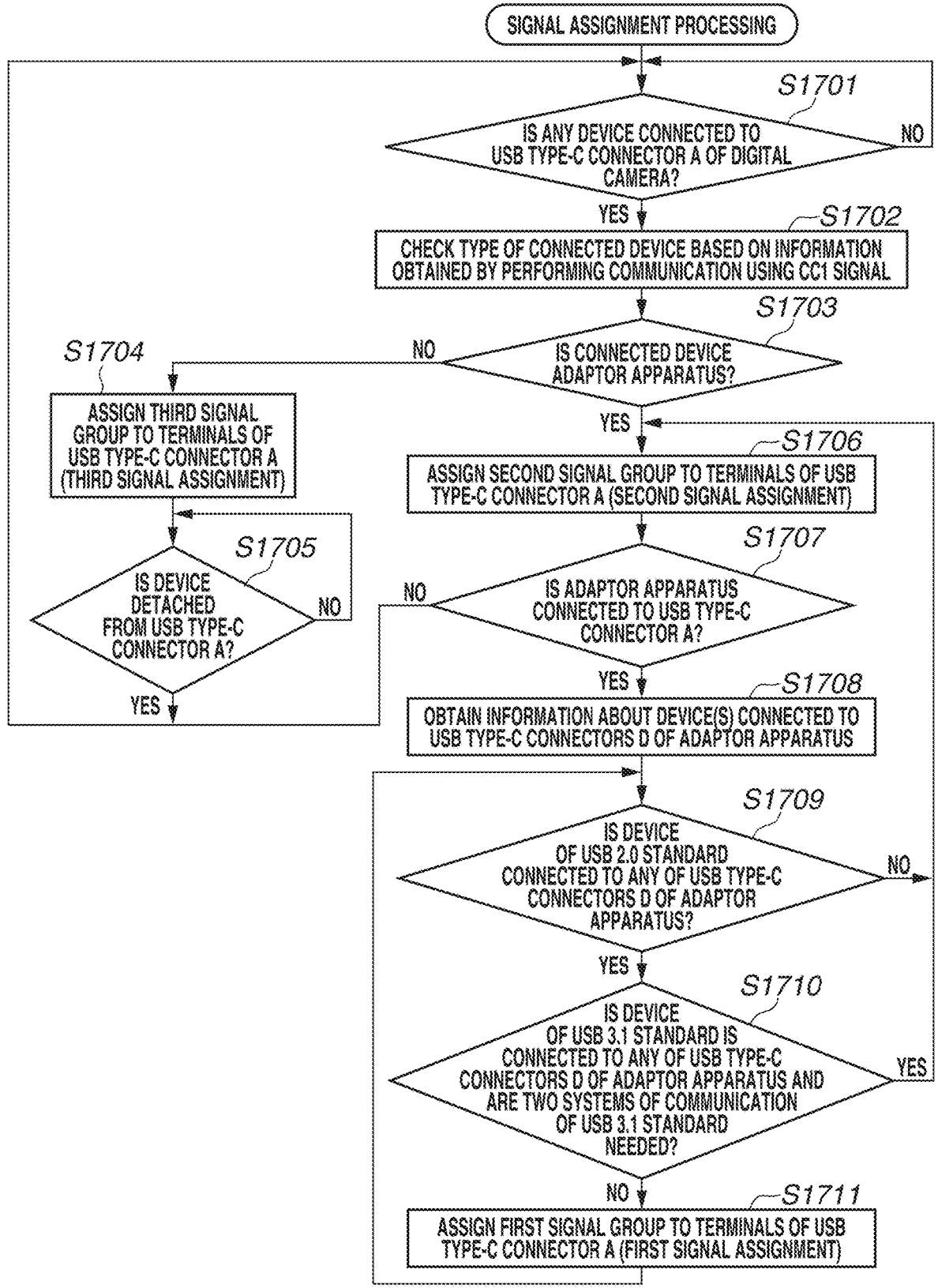
FIG. 17 is a flowchart illustrating an example of a detailed processing procedure of signal assignment processing for the terminals in the USB Type-C connector A of the digital camera (imaging apparatus) according to the third exemplary embodiment of the present disclosure.

FIG. 17 is a flowchart illustrating an example of a detailed processing procedure of the signal assignment processing for the terminals in the USB Type-C connector A 108 of the digital camera (imaging apparatus) 100 according to the present exemplary embodiment. Specifically, in the present exemplary embodiment, FIG. 17 corresponds to a flowchart illustrating an example of the processing procedure of a method for controlling the digital camera (imaging apparatus) 100 according to the present exemplary embodiment. In the following description of the processing of the flowchart of FIG. 17, any one of the first to third signal assignments illustrated in FIGS. 16A to 16C is described to be applied as a signal assignment to the terminals in the USB Type-C connector A 108.

In step S1701, the system control circuit A 121 determines (detects), for example, via the controller A 123 whether any device is connected to the USB Type-C connector A 108 of the digital camera 100. In a case where no device is determined to be connected to the USB Type-C connector A 108 (NO in step S1701), the processing proceeds to step S101. That is, in step S1701, the system control circuit A 121 waits until a device is determined to be connected to the USB Type-C connector A 1708.

In step S1701, in a case where a device is determined to be connected to the USB Type-C connector A 108 (YES in step S1701), the processing proceeds to step S1702.

In step S1702, the system control circuit A 121 performs processing for checking and detecting the type of the connected device, based on information obtained by performing communication with the connected device via the controller A 123 by using the CC1 signal.

In step S1703, the system control circuit A 121 determines (detects) whether the device connected to the USB Type-C connector A 108 is the adaptor apparatus 200, based on the detection result obtained by the checking in step S1702.

In step S1703, in a case where the device connected to the USB Type-C connector A 108 of the digital camera 100 is determined to not be the adaptor apparatus 200 (NO in step S1703), the processing proceeds to step S1704.

In step S1704, the switch A 122 applies the third signal assignment for assigning the third signal group illustrated in FIG. 16C to the terminals of the USB Type-C connector A 108, based on control of the controller A 123 and the system control circuit A 121. The reason is that, in the present exemplary embodiment, the smartphone 330 which is a device capable of USB communication is connected via the communication cable 310 if the device connected to the USB Type-C connector A 108 is not the adaptor apparatus 200.

In step S1705, the system control circuit A 121 determines (detects) via the controller A 123 whether the device connected to the USB Type-C connector A 108 is detached. In a case where the device connected to the USB Type-C connector A 108 is determined to not be detached (NO in step S1705), the processing proceeds to step S1705. That is, the system control circuit A 121 waits until the device connected to the USB Type-C connector A 108 is determined to be detached.

In step S1705, in a case where the device connected to the USB Type-C connector A 108 is determined to be detached (YES in step S1705), the processing returns to step S1701. The processing of step S1701 and subsequent steps is then performed.

In step S1703, in a case where the device connected to the USB Type-C connector A 108 of the digital camera 100 is determined to be the adaptor apparatus 200 (YES in step S1703), the processing proceeds to step S1706.

In step S1706, the switch A 122 applies the second signal assignment for assigning the second signal group illustrated in FIG. 16B to the terminals of the USB Type-C connector A 108, based on control of the controller A 123 and the system control circuit A 121. Details of step S1706 are described below.

Specifically, the processing proceeds to step S1706 in the case of the camera system of FIG. 3A, for example. In such a case, the controller A 123 communicates with the controller B 222 of the adaptor apparatus 200 by using the VBUS signal and the CC1 signal. The adaptor apparatus 200 identifies the device connected to the USB Type-C plug 210 as the digital camera 100. Then, for example, the controller B 222 issues a signal connection switch instruction to the switch B 221 so that the assignment of the signal lines of the USB Type-C plug 210 is switched to the state of the second signal assignment in FIG. 16B. For example, the system control circuit A 121 of the digital camera 100 accordingly obtains information that the assignment of the signal lines of the USB Type-C plug 210 is switched to the second signal assignment, from the controller B 222 of the adaptor apparatus 200 via the controller A 123. The controller A 123 of the digital camera 100 then transmits a signal connection switch instruction to the switch A 122, based on control of the system control circuit A 121, so that the signal assignment of the USB Type-C connector A 108 is also switched to the second signal assignment. The switch A 122 thus applies the second signal assignment for assigning the second signal group illustrated in FIG. 16B to the terminals of the USB Type-C connector A 108, based on the control of the controller A 123 and the system control circuit A 121.

By the processing of this step S1706, in terms of the signals related to the external flash unit 320 to a terminal or signal line as illustrated in FIG. 16B, the digital camera 100 and the adaptor apparatus 200 assign only the STROBE FLASH signal among these signals. In the processing of step S1706, the signals related to the external flash unit 320 other than the STROBE FLASH signal are communicated by using the D+ and D− signals which are assigned to the terminals A6 and A7 illustrated in FIG. 16B. Here, if the external flash unit 320 is connected to the accessory shoe 204 as illustrated in FIG. 4, the signals related to the external flash unit 320 except the STROBE FLASH signal are exchanged between the digital camera 100 and the adaptor apparatus 200 by using the D+ and D− signals assigned to the terminals A6 and A7 illustrated in FIG. 16B. The system control circuit A 121 of the digital camera 100 and the system control circuit B 227 of the adaptor apparatus 200 thereby communicate with each other. In the present exemplary embodiment, the contents of the signal exchange performed between the system control circuit A 121 and the system control circuit B 227 by using the D+ and D− signals are those of the STROBE DET SW, EF CLOCK, STROBE CLOCK, EF CHIP SELECT, STROBE TX, and STROBE RX signals. More specifically, the adaptor apparatus 200 obtains information about whether the external flash unit 320 to be connected to the accessory shoe 204 is connected, by using the STROBE DET SW signal transmitted from the system control circuit B 227. The system control circuit B 227 further transmits the EF CLOCK, STROBE CLOCK, EF CHIP SELECT, STROBE TX, and STROBE RX signals to the flash emission control circuit 226.

When the processing of step S1706 ends, the processing proceeds to step S1707.

In step S1707, the system control circuit A 121 determines (detects) via the controller A 123 whether the adaptor apparatus 200 is connected to the USB Type-C connector A 108. In a case where the adaptor apparatus 200 is determined to not be connected to the USB Type-C connector A 108 (NO in step S1707), the processing returns to step S1701. The processing of step S1701 and subsequent steps is then performed.

In step S1707, in a case where the adaptor apparatus 200 is determined to be connected to the USB Type-C connector A 108 (YES in step S1707), the processing proceeds to step S1708.

In step S1708, the system control circuit A 121 obtains information about another device or devices connected to the USB Type-C connectors D 203, 206, and 207 by communication using the CC1 signal between the controller A 123 and the controller B 222. In the present exemplary embodiment, devices of communication compliant with the USB 3.1 standard and devices of communication compliant with the USB 2.0 standard specified by the USB Type-C standard can be connected to the USB Type-C connectors D 203, 206, and 207 of the adaptor apparatus 200. The devices of communication compliant with the USB 3.1 standard are ones capable of communication faster than that of the USB 2.0 standard. The devices of communication compliant with the USB 2.0 standard are ones which performs communication slower than that of the USB 3.1 standard. Since the USB Type-C standard is a conventional technique, a description thereof will be omitted.

In step S1709, the system control circuit A 121 determines (detects) whether a device of the USB 2.0 standard is connected to any of the USB Type-C connectors D 203, 206, and 207, based on the information obtained in step S1708. In a case where no device of the USB 2.0 standard is determined to be connected to the USB Type-C connector D 203, 206, or 207 (NO in step S1709), the processing returns to step S1706. The processing of step S1706 and subsequent steps is then performed.

In step S1709, in a case where a device of the USB 2.0 standard is connected to any of the USB Type-C connectors D 203, 206, and 207 (YES in step S1709), the processing proceeds to step S1710.

In step S1710, the system control circuit A 121 determines (detects) whether a device of the USB 3.1 standard is connected to any of the USB Type-C connectors D 203, 206, and 207 other than the one to which the device of the USB 2.0 standard is connected, and two systems of communication of the USB 3.1 standard are needed, based on the communication between the controller A 123 and the controller B 222. Details of this step S1710 are described below.

Examples of the case where a device of the USB 2.0 standard is connected and two systems of USB 3.1 communication are needed in step S1710 may include the following. For example, a device of the USB 2.0 standard is connected to the USB Type-C connector D 203 of the adaptor apparatus 200, and devices of the USB 3.1 standard are connected to the USB Type-C connectors D 206 and 207, respectively. Such a mode is only an example. In the present exemplary embodiment, which device is connected to which of the USB Type-C connector D 203, 206, or 207 is not limited thereto.

The devices of the USB 3.1 standard do not necessarily need to be connected to two of the USB Type-C connectors D 203, 206, and 207 of the adaptor apparatus 200.

In step S1710, in a case where a device of the USB 3.1 standard is determined to be connected to any of the USB Type-C connectors D 203, 206, and 207, and two systems of USB 3.1 communication are determined to be needed (YES in step S1710), the processing returns to step S1706. The processing of step S1706 and subsequent steps is then performed. At the stage of returning to the step S1706, the device of the USB 2.0 standard is not made ready for communication, and priority is given to the communication of the device(s) of the USB 3.1 standard.

In step S1710, in a case where no device of the USB 3.1 standard is determined to be connected to the USB Type-C connector D 203, 206, or 207, or two systems of USB 3.1 communication are determined to not be needed (NO in step S1710), the processing proceeds to step S1711.

In step S1711, the switch A 122 applies the first signal assignment for assigning the first signal group illustrated in FIG. 16A to the terminals of the USB Type-C connector A 108, based on control of the controller A 123 and the system control circuit A 121. Details of this step S1711 are described below.

The first signal assignment illustrated in FIG. 16A provides one system of the USB 3.1 standard, as well as one system of the USB 2.0 standard, which allows use of the device of the USB 2.0 standard.

Specifically, in step S1711, the controller B 222 issues a signal connection switch instruction to the switch B 221, whereby the assignment of the signal lines of the USB Type-C plug 210 is switched to the state of the first signal assignment of FIG. 16A. For example, the system control circuit A 121 of the digital camera 100 accordingly obtains information that the assignment of the signal lines of the USB Type-C plug 210 is switched to the first signal assignment, from the controller B 222 of the adaptor apparatus 200 via the controller A 123. The controller A 123 of the digital camera 100 then transmits a signal connection switch instruction to the switch A 122, based on control of the system control circuit A 121, so that the signal assignment of the USB Type-C connector A 108 is also switched to the first signal assignment. The switch A 122 thus applies the first signal assignment for assigning the first signal group illustrated in FIG. 16A to the terminals of the USB Type-C connector A 108, based on the control of the controller A 123 and the system control circuit A 121.

By the processing of this step S1711, the digital camera 100 and the adaptor apparatus 200 assign the signals related to the external flash unit 320 to terminals or signal lines as illustrated in FIG. 16A. Here, if the external flash unit 320 is connected to the accessory shoe 204, the digital camera 100 and the adaptor apparatus 200 communicate the signals related to the external flash unit 320 therebetween. The system control circuit A 121 of the digital camera 100 performs the communication by using the signal lines of the respective dedicated signals assigned to the USB Type-C connector A 108 and the USB Type-C plug 210, without using the system control circuit B 227 of the adaptor apparatus 200.

When the processing of step S1711 ends, the processing returns to step S1709. In step S1709, in a case where no device of the USB 2.0 standard is determined to be connected to the USB Type-C connector D 203, 206, or 207 (NO in step S1709), the processing returns to step S1706 so that the second signal assignment is applied. Even if a device of the USB 2.0 standard is connected (YES in step S1709), two systems of USB 3.1 communication may be determined to be needed (YES in step S1710) due to connection of an additional device of the USB 3.1 standard. In such a case, the processing returns to step S1706 so that the second signal assignment is applied.

In the digital camera 100 according to the present exemplary embodiment described above, the system control circuit A 121 detects whether the adaptor apparatus 200 is electrically connected via the USB Type-C connector A 108 (step S1703 of FIG. 17). The system control circuit A 121 performing such detection processing is included in a first detection unit. In the foregoing description of FIG. 17, the detection processing is described to be performed by the system control circuit A 121. However, the present exemplary embodiment is not limited thereto. For example, the controller A 123 may perform the detection processing.

If the adaptor apparatus 200 is detected to be electrically connected via the USB Type-C connector A 108, the system control circuit A 121 detects whether a device of the USB 2.0 standard (first device) and a device of the USB 3.1 standard (second device) are connected to the adaptor apparatus 200 (steps S1709 and S1710 of FIG. 17). A device of the USB 2.0 standard performs a low-speed communication, and a device of the USB 3.1 standard performs a high-speed communication, among communications compliant with at least two USB standards having different communication speeds. The system control circuit A 121 performing such detection processing is included in a second detection unit. In the foregoing description of FIG. 17, the detection processing is described to be performed by the system control circuit A 121. However, the present exemplary embodiment is not limited thereto. For example, the controller A 123 may perform the detection processing.

The switch A 122 changes the signal group to be assigned to the terminals of the USB Type-C connector A 108 according to the result of detection by the first detection unit and that of the second detection unit described above (steps S1711, S1706, and S1704 of FIG. 17).

With such a configuration, the signal group to be assigned to the terminals of the general-purpose USB connector is changed. This can provide high versatility without causing an increase in the size of the USB connector. The digital camera 100 according to the present exemplary embodiment includes the USB Type-C connector A 108 as the only external interface connector. The digital camera 100 can thus be reduced in size, compared to when the accessory shoe 204 and the remote release cable connection connector 212 are included in addition to the USB Type-C connector A 108.

Specifically, in the present exemplary embodiment described above, the adaptor apparatus 200 is configured so that the external flash unit 320 can be mounted thereon. When the external flash unit 320 is mounted on the adaptor apparatus 200, the switch A 122 assigns the first signal group including the plurality of signals related to the external flash unit 320 to the terminals of the USB Type-C connector A 108 (step S1711 of FIG. 17, FIG. 16A) if a device of the USB 2.0 standard (first device) is detected to be connected to the adaptor apparatus 200 and two systems of devices of the USB 3.1 standard (second device) are detected to not be connected.

If a device of the USB 2.0 standard is detected to not be connected to the adaptor apparatus 200 or if a device of the USB 2.0 standard and a device of the USB 3.1 standard are detected to be connected, the switch A 122 assigns the second signal group including part of the plurality of signals related to the external flash unit 320, included in the first signal group illustrated in FIG. 16A, to the terminals of the USB Type-C connector A 108 (step S1706 of FIG. 17, FIG. 16B). The part included in the second signal group includes the STROBE FLASH signal serving as an emission instruction signal of the external flash unit 320 (FIG. 16B). If the second signal group illustrated in FIG. 16B is assigned, the rest of the plurality of signals related to the external flash unit 320, included in the first signal group illustrated in FIG. 16A, other than STROBE FLASH signal are communicated as signals related to USB 2.0 communication.

In the present exemplary embodiment described above, if the adaptor apparatus 200 is detected to not be connected, the switch A 122 assigns the third signal group compliant with the USB standard to the terminals of the USB Type-C connector A 108 (step S1704 of FIG. 17, FIG. 16C).

With such a configuration, if the adaptor apparatus 200 is not connected, the signal group compliant with the USB standard is assigned to the terminals of the USB Type-C connector A 108. This enables communication with electronic devices equipped with a communication unit of the USB standard which is prevalent in the world.

The signal assignments to the terminals of the USB Type-C connector A 108 of the digital camera 100 illustrated in FIGS. 16A to 16C are merely examples. The exemplary embodiment of the present disclosure is not limited thereto.

The adaptor apparatus 200 illustrated in FIGS. 2A, 2B, and 15 is described to include the three USB Type-C connectors D 203, 206, and 207 as its USB Type-C connectors D. However, the exemplary embodiment of the present disclosure is not limited thereto.

In FIG. 15, the flash emission control circuit 226 is provided inside the adaptor apparatus 200. However, the exemplary embodiment of the present disclosure is not limited thereto. For example, the flash emission control circuit 226 may be provided inside the digital camera 100. In such a case, the signal groups to be assigned to the terminals of the USB Type-C connector A 108 of the digital camera 100 are modified accordingly.

A fourth exemplary embodiment includes parts common to those described in the first exemplary embodiment with reference to FIGS. 1A to 5 and 8. A detailed description of the common parts will be omitted.

The communication cables 323 and 324 are communication cables each having USB Type-C plugs (not illustrated) at both cable ends. While the communication cables 323 and 324 are cables having USB Type-C plugs at both cable ends as described above, only a vicinity of the USB Type-C plug at one end of each communication cable is illustrated in FIG. 4 for the sake of simplicity. The USB Type-C plug at one end of the communication cable 323 is inserted into the USB Type-C connector D 206. The USB Type-C plug at the other end is inserted into a USB Type-C connector of another device (not illustrated). Similarly, the USB Type-C plug at one end of the communication cable 324 is inserted into the USB Type-C connector D 207. The USB Type-C plug at the other end is inserted into a USB Type-C connector of another device (not illustrated). In such a manner, the digital camera 100 is configured to be able to perform communication of the USB standard with the other devices (not illustrated) via the adaptor apparatus 200.

For USB Type-C connectors, communication in an alternate mode (hereinafter, referred to as "Alt") is defined. Alt communication enables use of communication of a communication standard different from the USB standard via a USB Type-C connector by changing signals assigned to some of the terminals of the USB Type-C connector to other arbitrary signals when the standard signal group of the USB Type-C standard is assigned to the terminals. Examples of the communication standard different from the USB standard include Thunderbolt and DisplayPort. The USB Type-C specifications define that the Alt communication is not usable for communication via a USB hub (224 in FIGS. 18 and 19), a branching unit.

Figure 18:
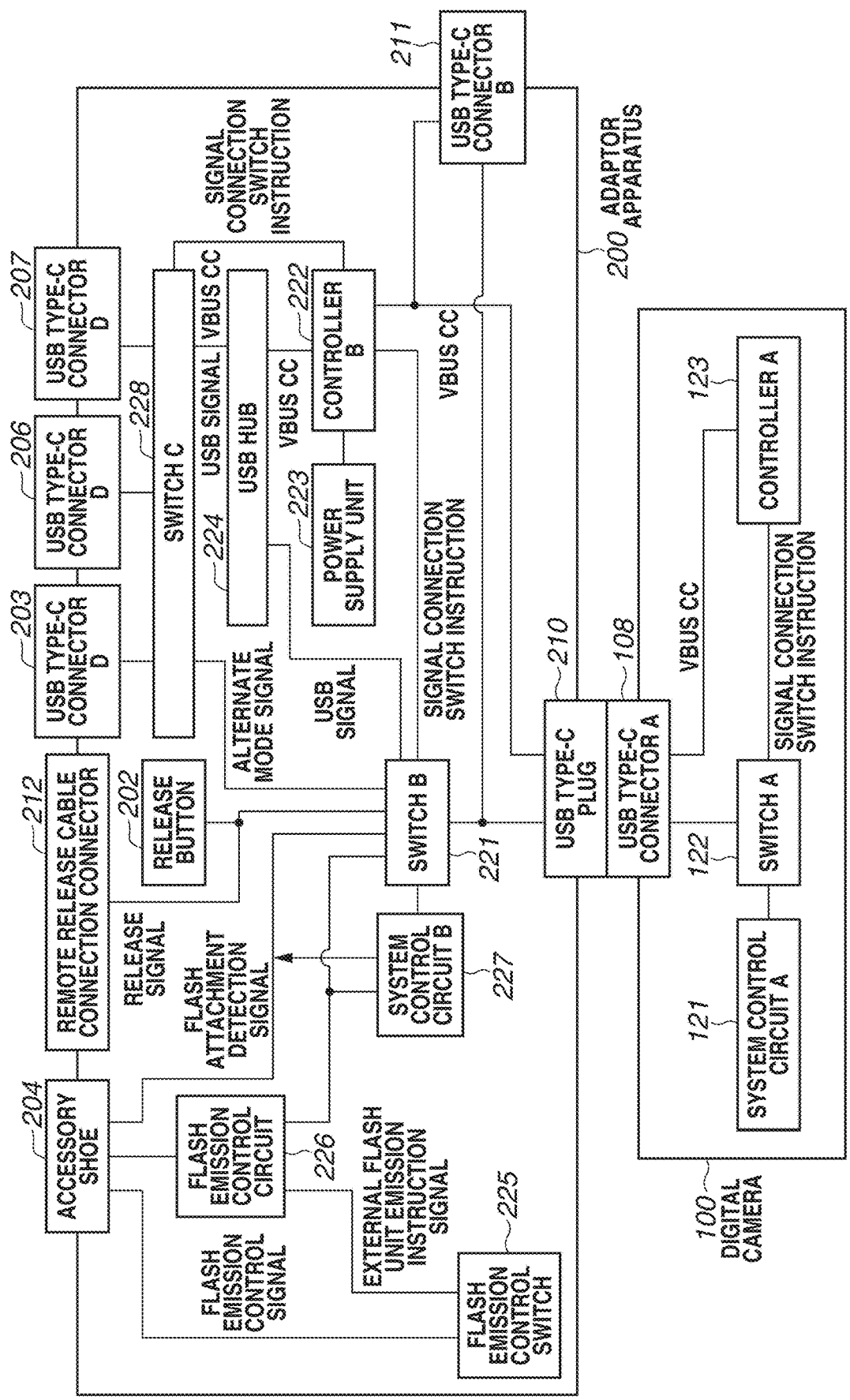
FIG. 18 is a diagram illustrating an example of a schematic configuration of a camera system according to a fourth exemplary embodiment of the present disclosure.

FIG. 18 is a diagram illustrating an example of a schematic configuration of a camera system in which the digital camera 100 illustrated in FIGS. 1A and 1B and the adaptor apparatus 200 illustrated in FIGS. 2A and 2B are directly connected (the camera system of FIG. 3A). In FIG. 18, components similar to those illustrated in FIGS. 1A, 1B, 2A, and 2B are designated by the same reference numerals. For simplicity of the drawing, some of the components illustrated in FIGS. 1A, 1B, 2A, and 2B are omitted.

Functional components of the digital camera 100 in FIG. 18 will be described.

The digital camera 100 illustrated in FIG. 18 includes the USB Type-C connector A 108, the system control circuit A 121, the switch A 122, and the controller A 123.

The system control circuit A 121 governs various types of control in the digital camera 100. The controller A 123 transmits a signal connection switch instruction to the switch A 122 based on instructions from the system control circuit A 121 or a result of communication with an internal controller of an external apparatus, such as the adaptor apparatus 200, that is connected to the USB Type-C connector A 108. The USB Type-C connector A 108 includes a plurality of terminals (not illustrated) inside. The switch A 122 functions as a signal assignment unit for assigning predetermined signals to the terminals in the USB Type-C connector A 108 based on the signal connection switch instruction from the controller A 123. The assignment of the predetermined signals to the terminals in the USB Type-C connector A 108 will be described in detail below. The controller A 123 also controls transfer of power with the external apparatus, such as the adaptor apparatus 200, via the USB Type-C connector A 108.

Next, functional components of the adaptor apparatus 200 in FIG. 18 will be described.

The adaptor apparatus 200 illustrated in FIG. 18 includes the release button 202, the USB Type-C connectors D 203, 206, and 207, the accessory shoe 204, the USB Type-C plug 210, the USB Type-C connector B 211, the remote release cable connection connector 212, the switch B 221, the controller B 222, the power supply circuit 223, the USB hub 224, the flash emission control switch 225, the flash emission control circuit 226, the system control circuit B 227, and a switch C 228.

The controller B 222 transmits a signal connection switch instruction to the switch B 221 based on a result of communication with the controller A 123 in the digital camera 100 connected to the USB Type-C plug 210. The switch B 221 assigns predetermined signals to the terminals in the USB Type-C plug 210 based on the signal connection switch instruction from the controller B 222.

The controller B 222 also controls transfer of power with the digital camera 100 via the USB Type-C plug 210 or the USB Type-C connector B 211. The controller B 222 can further detect, by using a CC1 signal to be described below, whether USB devices connected to the USB Type-C connectors D 203, 206, and 207 are devices capable of USB 2.0 communication or devices capable of USB 3.1 communication. Devices capable of USB 3.1 communication are ones capable of communication faster than that of devices capable of USB 2.0 communication. In other words, devices capable of USB 2.0 communication are devices that typically perform communication slower than that of devices capable of USB 3.1 communication.

Power that the controller B 222 receives from the digital camera 100 is supplied to the power supply circuit 223. The power supply circuit 223 supplies needed power to, for example, the controller B 222, the flash emission control circuit 226, and the system control circuit B 227 in the adaptor apparatus 200. In FIG. 18, lines for supplying power from the power supply circuit 223 to the flash emission control circuit 226 and the system control circuit B 227 and others are omitted for simplicity of the drawing.

The flash emission control circuit 226 is a circuit for controlling light emission of the external flash unit 320 electrically connected to the accessory shoe 204 based on a control signal from the system control circuit A 121 of the digital camera 100 via the USB Type-C plug 210 or a control signal from the system control circuit B 227. If the flash emission control switch 225 receives an external flash unit emission instruction signal transmitted from the flash emission control circuit 226, the flash emission control switch 225 short-circuits an emission standby signal of the external flash unit 320 and a ground signal in the adaptor apparatus 200. The external flash unit 320 is configured to emit flash light if the emission standby signal and the ground signal in the adaptor apparatus 200 are short-circuited.

The system control circuit B 227 communicates with the system control circuit A 121 of the digital camera 100 via signal lines of the USB Type-C plug 210. For example, the system control circuit B 227 receives a command to control signals related to the external flash unit 320 connected to the accessory shoe 204 from the system control circuit A 121, and transmits signals to the flash emission control circuit 226 and the accessory shoe 204. For example, if the system control circuit B 227 receives information about the external flash unit 320, the system control circuit B 227 transmits the information to the system control circuit A 121.

The USB hub 224 has the function of distributing signals for USB communication to each of the USB Type-C connectors D 203, 206, and 207. The controller B 222 transmits a signal connection switch instruction to the switch C 228, based on results of communication with communication devices connected to the USB Type-C connectors D 203, 206, and 207. Based on the signal connection switch instruction from the controller B 222, the switch C 228 assigns predetermined signals to the terminals of the USB Type-C connectors D 203, 206, and 207, and switches whether to connect predetermined signals to the USB hub 224 or directly connect the predetermined signals to the switch B 221 without the intervention of the USB hub 224. The controller B 222 further controls transfer of power with the communication devices connected to the USB Type-C connectors D 203, 206, and 207.

The release button 202 is an operation unit capable of detecting two levels of pressing. At a first level of detection, the release button 202 transmits an SW1 signal to the system control circuit A 121 of the digital camera 100. At a second level of detection, the release button 202 transmits an SW2 signal to the system control circuit A 121. Specifically, the signals from the release button 202 are transmitted to the system control circuit A 121 via the switch B 221, either the USB Type-C plug 210 or the USB Type-C connector B 211, and the USB Type-C connector A 108 and the switch A 122 of the digital camera 100.

Receiving the SW1 signal, the system control circuit A 121 of the digital camera 100 performs imaging preparation processing including a focus adjustment and calculation of shutter speed. Receiving the SW2 signal, the system control circuit A 121 performs image capturing processing of an image formed by the lens barrel 102. Since the imaging preparation processing and the image capturing processing of an image are widely known techniques, a detailed description thereof will be omitted. During the image capturing processing of an image, the external flash unit 320 performs the foregoing flash light according to need.

As described above, the remote release cable connection connector 212 is a connector for connecting the remote release cable 321. The remote release cable 321 also includes an operation unit similar to the release button 202. The operation unit transmits an SW1 signal at a first level of detection, and transmits an SW2 signal at a second level of detection. In the adaptor apparatus 200, the signal path of the SW1 and SW2 signals from the release button 202 and the signal path of the SW1 and SW2 signals from the remote release cable connection connector 212 are merged together and connected to terminals in the USB Type-C plug 210 and the USB Type-C connector B 211 of the adaptor apparatus 200 via the switch B 221.

FIG. 19 is a diagram illustrating an example of a schematic configuration of a camera system in which the digital camera 100 illustrated in FIGS. 1A and 1B and the adaptor apparatus 200 illustrated in FIGS. 2A and 2B are connected via the communication cable 310 (the camera system of FIG. 3B). In FIG. 19, components similar to those illustrated in FIG. 18 are designated by the same reference numerals. A detailed description thereof will be omitted. In FIG. 19, like FIG. 18, some of the components illustrated in FIGS. 1A, 1B, 2A, and 2B are omitted for simplicity of the drawing.

Specifically, in the camera system of FIG. 19, the USB Type-C connector A 108 of the digital camera 100 and the USB Type-C connector B 211 of the adaptor apparatus 200 are electrically connected via the communication cable 310, and transfer power and exchange various signals.

As described above, the switch A 122 assigns predetermined signals to the terminals in the USB Type-C connector A 108 of the digital camera 100 based on instructions from the controller A 123. The assignment of the signals are described in more detail below.

FIGS. 20A to 20C are tables illustrating examples of signal groups to be assigned to the terminals of the USB Type-C connector A 108 of the digital camera 100 included in the camera system illustrated in FIG. 18, the camera system illustrated in FIG. 19, and the camera system illustrated in FIG. 8.

FIG. 20A will initially be described.

FIG. 20A is a table illustrating an example of the signal group to be assigned to the terminals of the USB Type-C connector A 108 in the camera system illustrated in FIG. 18, i.e., the camera system illustrated in FIG. 3A in which the digital camera 100 and the adaptor apparatus 200 are directly connected.

As illustrated in FIGS. 20A to 20C, the USB Type-C connector A 108 of the digital camera 100 has a two-row terminal layout structure including an A row and a B row. The USB Type-C connector A 108 includes 12 terminals in each row, or a total of 24 terminals. In the examples illustrated in FIGS. 20A to 20C, the terminals in the A row are named A1 to A12. The terminals in the B row are named B1 to B12.

As illustrated in FIG. 20A, a GND signal is assigned to the terminals A1, A12, B1, and B12. The GND signal is a ground signal serving as a reference potential of the digital camera 100 and the adaptor apparatus 200. A TX1+ signal, a TX1− signal, an RX1− signal, and an RX1+ signal are assigned to the terminals A2, A3, B10, and B11, respectively. The TX1+ and TX1− signals constitute a pair of differential signals and the RX1+ and RX1− signals constitute another pair of differential signals. The TX1+, TX1−, RX1+, and RX1− signals are signals for performing communication according to the USB 3.1 standard.

A VBUS signal is assigned to the terminals A4, A9, B4, and B9. The VBUS signal is a signal for transferring power. A TX2+ signal, a TX2− signal, an RX2− signal, and an RX2+ signal are assigned to the terminals B2, B3, A10, and A11, respectively. The TX2+, TX2−, RX2−, and RX2+ signals have roles similar to those of the foregoing TX1+, TX1−, RX1−, and RX1+ signals, respectively. Specifically, the TX2+ and TX2− signals constitute a pair of differential signals and the RX2+ and RX2− signals constitute another pair of differential signals, which are signals for performing communication of the USB 3.1 standard. The assignment of the signal group illustrated in FIG. 20A provides two systems of USB 3.1 communication.

The CC1 signal is assigned to the terminal A5. The CC1 signal is a signal for exchanging information between the controller A 123 in the digital camera 100 and a controller in another device connected via the USB Type-C connector A 108. By communication using the CC1 signal, the digital camera 100 can learn a communication method of the other device connected, and the other device can learn a communication method of the digital camera 100. For example, if the digital camera 100 is connected to the adaptor apparatus 200 via the USB Type-C connector A 108, the digital camera 100 and the adaptor apparatus 200 can learn each other's communication methods. Since what the connected device is can thus be found out, the digital camera 100 can identify its connection partner as the adaptor apparatus 200. The adaptor apparatus 200 can identify its connection partner as the digital camera 100. As will be described below with reference to the flowchart of FIG. 21, the digital camera 100 and the device connected to the digital camera 100 perform communication by using the CC1 signal before predetermined signals are assigned to the terminals in the USB Type-C connector A 108 of the digital camera 100.

A D+ signal and a D− signal are assigned to the terminals A6 and A7, respectively. The D+ and D− signals constitute a pair of differential signals. The D+ and D− signals are signals for performing communication compliant with the USB 2.0 standard. In the assignment of the signal group illustrated in FIG. 20A, the D+ and D− signals are dedicated signals for performing communication between the system control circuit A 121 of the digital camera 100 and the system control circuit B 227 of the adaptor apparatus 200.

The SW1 and SW2 signals are assigned to the terminals B5 and B6, respectively. As described above, the SW1 and SW2 signals are signals serving as a trigger for the system control circuit A 121 of the digital camera 100 to perform the imaging preparation processing and the capturing processing of an image.

As described above, the system control circuit A 121 of the digital camera 100 transmits control signals related to the external flash unit 320 to the system control circuit B 227 of the adaptor apparatus 200. If the signal group illustrated in FIG. 20A is assigned, the system control circuit A 121 and the system control circuit B 227 communicate by using USB 2.0 standard-compliant communication of the D+ and D− signals assigned to the terminals A6 and A7. A STROBE FLASH signal is assigned to the terminal B7. Since an emission instruction to the external flash unit 320 needs to be issued in time with the release operation of the digital camera 100, the STROBE FLASH signal, the communication speed of which has high priority among the signals related to the external flash unit 320, is assigned as a dedicated signal in FIG. 20A. In the case of FIG. 20A, the signals other than the STROBE FLASH signal, the communication speed of which has low priority among the signals related to the external flash unit 320, are communicated by using the USB 2.0 standard-compliant communication of the D+ and D− signals assigned to the terminals A6 and A7. The signals related to the external flash unit 320 other than the STROBE FLASH signal, to be communicated by using the D+ and D− signals assigned to the terminals A6 and A7 include a STROBE DET SW signal, an EF CLOCK signal, a STROBE CLOCK signal, an EF CHIP SELECT signal, a STROBE TX signal, and a STROBE RX signal. Such signals are signals related to the external flash unit 320 attached to the accessory shoe 204.

Specifically, the STROBE FLASH signal is a signal for the flash emission control circuit 226 to transmit the external flash unit emission instruction signal to the flash emission control switch 225 if the flash emission control circuit 226 detects the STROBE FLASH signal. The STROBE DET SW signal is a signal for detecting whether the external flash unit 320 is mounted on the accessory shoe 204. The EF CLOCK signal is a clock signal for the flash emission control integrated circuit (IC) (not illustrated) in the flash emission control circuit 226 to operate. The STROBE TX signal is a signal for transmitting information from the system control circuit A 121 of the digital camera 100 to the flash emission control IC (not illustrated). The STROBE RX signal is a signal for transmitting information from the flash emission control IC (not illustrated) to the system control circuit A 121 of the digital camera 100. The STROBE CLOCK signal is a reference clock signal during communication using the STROBE TX and STROBE RX signals. The EF CHIP SELECT signal is a signal for maintaining the communication using the STROBE TX and STROBE RX signals between the system control circuit A 121 of the digital camera 100 and the flash emission control IC (not illustrated). The system control circuit A 121 of the digital camera 100 and the flash emission control IC (not illustrated) can exchange various types of information by performing communication using the STROBE TX and STROBE RX signals. Examples of the information include setting information about an imaging condition of the digital camera 100 and information about whether flash emission by the external flash unit 320 is available. In the present exemplary embodiment, the signals related to the external flash unit 320 thus refer to the STROBE FLASH, STROBE DET SW, EF CLOCK, STROBE CLOCK, EF CHIP SELECT, STROBE TX, and STROBE RX signals.

The SW1, SW2, STROBE FLASH, STROBE DET SW, EF CLOCK, STROBE CLOCK, EF CHIP SELECT, STROBE TX, and STROBE RX signals are signals that do not exist in the standard signal assignment of USB Type-C to be described below. Since such signals are dedicated signals to be used only when the adaptor apparatus 200 and the digital camera 100 are connected, the signals are hereinafter referred to as "dedicated signals".

Next, FIG. 20B will be described.

FIG. 20B is a chart illustrating an example of the signal group to be assigned to the terminals of the USB Type-C connector A 108 in the camera system illustrated in FIG. 19, i.e., the camera system illustrated in FIG. 3B in which the digital camera 100 and the adaptor apparatus 200 are connected via the communication cable 310. In FIG. 20B, signals similar to those described in FIG. 20A are designated by the same reference symbols.

As illustrated in FIG. 20B, the GND signal is assigned to the terminals A1, A12, B1, and B12. The VBUS signal is assigned to the terminals A4, A9, B4, and B9. The CC1 signal is assigned to the terminal A5. The D+ and D− signals are assigned to the terminals A6 and A7, respectively. The D+ and D− signals are dedicated signals for performing communication between the system control circuit A 121 of the digital camera 100 and the system control circuit B 227 of the adaptor apparatus 200.

The STROBE FLASH signal is assigned to the terminal B10. In the case of FIG. 20B, as with FIG. 20A, the STROBE FLASH signal, the communication speed of which has high priority among the signals related to the external flash unit 320, is assigned as a dedicated signal. Even in the case of FIG. 20B, the signals other than the STROBE FLASH signal, the communication speed of which has low priority among the signals related to the external flash unit 320, are communicated by using USB 2.0 standard-compliant communication of the D+ and D− signals assigned to the terminals A6 and A7. The signals related to the external flash unit 320, the communication speed of which has low priority, include the STROBE DET SW, EF CLOCK, STROBE CLOCK, EF CHIP SELECT, STROBE TX, and STROBE RX signals.

An SBU1 signal and an SBU2 signal are assigned to the terminals A8 and B8, respectively. The SBU1 and SBU2 signals are preliminary signals and have no particular role. The SW1 and SW2 signals are assigned to the terminals A2 and A3, respectively. No signal is assigned to the terminal B5, B6, B7, or B11.

Differences between the signal assignment illustrated in FIG. 20A and the signal assignment illustrated in FIG. 20B are described below.

The SW1 and SW2 signals which are assigned to the terminals B5 and B6 in FIG. 20A are assigned to the terminals A2 and A3 in FIG. 20B. The STROBE FLASH signal which is assigned to the terminal B7 in FIG. 20A is assigned to the terminal B10 in FIG. 20B. In FIG. 20B, no signal is assigned to the terminal B5, B6, B7, or B11. The TX1+, TX1−, RX1−, and RX1+ signals which are assigned to the terminals A2, A3, B10, and B11 in FIG. 20A, respectively, are not assigned to any of the terminals in FIG. 20B. In other words, the signal assignment in FIG. 20B provides one system of communication compliant with the USB 3.1 standard, including the TX2+, TX2−, RX2−, and RX2+ signals assigned to the terminals B2, B3, A10, and A11, respectively.

The reason why the signal assignments differ as illustrated in FIGS. 20A and 20B between the camera system illustrated in FIG. 18 (camera system illustrated in FIG. 3A in which the digital camera 100 and the adaptor apparatus 200 are directly connected) and the camera system illustrated in FIG. 19 (camera system illustrated in FIG. 3B in which the digital camera 100 and the adaptor apparatus 200 are connected with each other via the communication cable 310) is described below.

There are two types of communication cables compliant with the USB Type-C standard. One is a cable without the signal terminals corresponding to the terminals B5, B6, and B7. The other is a cable without the signal terminals corresponding to the terminals B6 and B7. The purpose of such configurations is to reduce the number of conductor lines in the cable to reduce the thickness and hardness of the cable.

The communication cable 310 according to the present exemplary embodiment is assumed to be one without the signal terminals corresponding to the terminals B5, B6, and B7. Suppose that one end of the communication cable 310 is inserted into the USB Type-C connector B 211 of the adaptor apparatus 200, and the other end of the communication cable 310 is inserted into the USB Type-C connector A 108 of the digital camera 100. In such a case, if the signal assignment illustrated in FIG. 20A is applied, the SW1, SW2, and STROBE FLASH signals are unable to be exchanged between the digital camera 100 and the adaptor apparatus 200. In FIG. 20B, the SW1, SW2, and STROBE FLASH signals are therefore assigned to the terminals A2, A3, and B10, respectively, which have corresponding signal terminals in the communication cable 310, not to the terminals B5, B6, and B7 which have no corresponding signal terminal in the communication cable 310.

On the other hand, if the USB Type-C plug 210 of the adaptor apparatus 200 is directly inserted into the USB Type-C connector A 108 of the digital camera 100, all the 24 terminals can be used to exchange signals. In FIG. 20A, the SW1, SW2, and STROBE FLASH signals are therefore assigned to the terminals B5, B6, and B7, respectively. In FIG. 20A, the TX1+, TX1−, RX1−, and RX1+ signals are respectively assigned to the terminals A2, A3, and B10, to which the SW1, SW2, and STROBE FLASH signals are assigned in FIG. 20B, and the terminal B11, which is a vacant terminal in FIG. 20B.

As described above, in the present exemplary embodiment, the signal assignment of the dedicated signals to the terminals in the USB Type-C connector A 108 of the digital camera 100 is changed according to whether the digital camera 100 and the adaptor apparatus 200 are connected directly or via the communication cable 310. The signal assignment is changed to give priority to enabling the exchange of the dedicated signals between the digital camera 100 and the adaptor apparatus 200.

Next, FIG. 20C will be described.

FIG. 20C is a table illustrating an example of the signal group to be assigned to the terminals of the USB Type-C connector A 108 in the camera system illustrated in FIG. 8, i.e., the camera system illustrated in FIG. 5 in which the digital camera 100 and the smartphone 330 are connected via the communication cable 310. In FIG. 20C, signals similar to those described in FIG. 20A are designated by the same reference symbols.

As illustrated in FIG. 20C, the GND signal is assigned to the terminals A1, A12, B1, and B12. The TX1+, TX1−, RX1−, and RX1+ signals are assigned to the terminals A2, A3, B10, and B11, respectively. The TX2+, TX2−, RX2−, and RX2+ signals are assigned to the terminals B2, B3, A10, and A11, respectively. As described above, the TX2+, TX2−, RX2−, and RX2+ signals have roles similar to those of the TX1+, TX1−, RX1−, and RX1+ signals, respectively. Specifically, the TX2+ and TX2− signals constitute a pair of differential signals and the RX2+ and RX2− signals constitute another pair of differential signals. These differential signals are used to perform communication compliant with the USB 3.1 standard. In other words, the assignment of the signal group illustrated in FIG. 20C provides two systems of USB 3.1 communication.

The VBUS signal is assigned to the terminals A4, A9, B4, and B9. The CC1 signal is assigned to the terminal A5. The D+ and D− signals are assigned to the terminals A6 and A7, respectively. The D+ and D− signals are also assigned to the terminals B6 and B7, respectively. The D+ and D− signals illustrated in FIG. 20C constitute a pair of differential signals. The D+ and D− signals are used to perform communication compliant with the USB 2.0 standard. A CC2 signal, the SBU1 signal, and the SBU2 signal are assigned to the terminals B5, A8, and B8, respectively. The CC2 signal is a signal having a role similar to that of the CC1 signal. The SBU1 and SBU2 signals are preliminary signals and have no particular role.

The signal assignment illustrated in FIG. 20C is the standard signal assignment defined by the standardization organization of USB Type-C. If the smartphone 330, an example of another device capable of USB communication, is connected to the USB Type-C connector A 108 of the digital camera 100 as in the camera system of FIG. 5, the digital camera 100 and the smartphone 330 can perform communication compliant with the USB standard with each other. In the present exemplary embodiment, as described above, the smartphone 330 is a communication apparatus (communication device) that performs communication compliant with the USB 3.1 standard. With the signal assignment of FIG. 20C, communication is performed either by using the TX1+, TX1−, RX1−, and RX1+ signals assigned to the terminals A2, A3, B10, and B11, or by using the TX2+, TX2−, RX2−, and RX2+ signals assigned to the terminals B2, B3, A10, and A11.

In the present exemplary embodiment, the digital camera 100 switches the signal assignments illustrated in FIGS. 20A, 20B, and 20C to the terminals in the USB Type-C connector A 108 based on predetermined determinations. Details of such signal assignment processing for the terminals in the USB Type-C connector A 108 will be described below with reference to FIG. 21.

Figure 21:
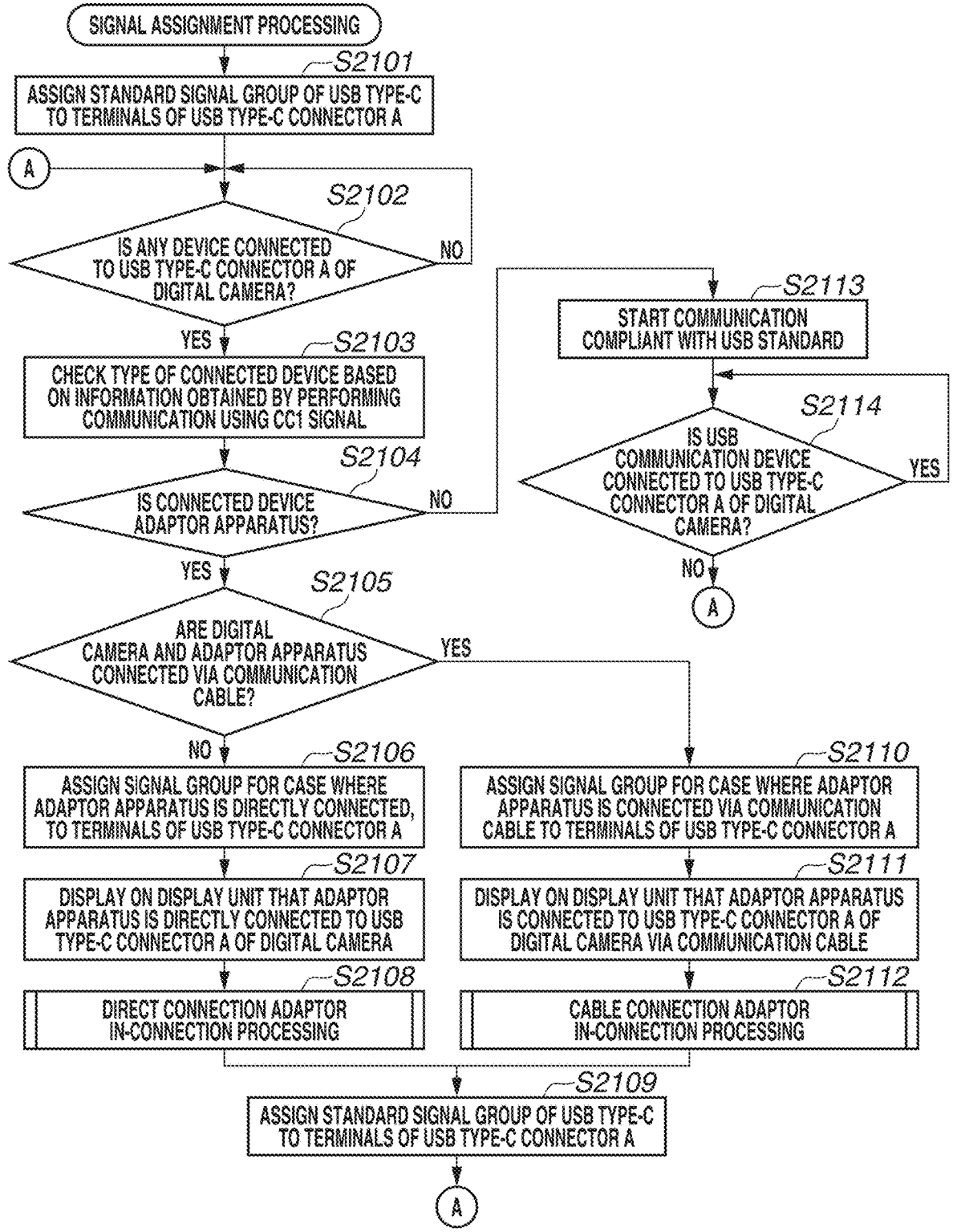
FIG. 21 is a flowchart illustrating an example of a detailed processing procedure of signal assignment processing for the terminals in the USB Type-C connector A of the digital camera according to the fourth exemplary embodiment of the present disclosure.

FIG. 21 is a flowchart illustrating an example of a detailed processing procedure of the signal assignment processing for the terminals in the USB Type-C connector A 108 of the digital camera 100 according to the present exemplary embodiment. Specifically, in the present exemplary embodiment, FIG. 21 corresponds to a flowchart illustrating an example of the processing procedure of a method for controlling the digital camera (imaging apparatus) 100 according to the exemplary embodiment of the present disclosure.

If the user presses the power button 103, for example, the system control circuit A 121 turns on power of the digital camera 100. In step S2101, the switch A 122 assigns the standard signal group of USB Type-C illustrated in FIG. 20C to the terminals of the USB Type-C connector A 108, based on control of the controller A 123 and the system control circuit A 121.

In step S2102, the system control circuit A 121 determines (detects), for example, via the controller A 123 whether any device is connected to the USB Type-C connector A 108 of the digital camera 100. In a case where no device is determined to be connected to the USB Type-C connector A 108 (NO in step S2102), the processing proceeds to step S2102. That is, in step S2102, the system control circuit A 121 waits until a device is determined to be connected to the USB Type-C connector A 108.

In step S2102, in a case where a device is determined to be connected to the USB Type-C connector A 108 (YES in step S2102), the processing proceeds to step S2103.

In step S2103, the system control circuit A 121 performs processing for checking and detecting the type of the connected device, based on information obtained by the controller A 123 performing communication with the device determined to be connected in step S2102 by using the CC1 signal.

In step S2104, the system control circuit A 121 determines (detects) whether the device connected to the USB Type-C connector A 108 is the adaptor apparatus 200, based on the detection result obtained by the checking in step S2103.

In step S2104, in a case where the device connected to the USB Type-C connector A 108 of the digital camera 100 is determined to be the adaptor apparatus 200 (YES in step S2104), the processing proceeds to step S2105.

In step S2105, the system control circuit A 121 determines (detects) whether the digital camera 100 and the adaptor apparatus 200 are connected via the communication cable 310.

Specific processing of step S2105 according to the present exemplary embodiment is described below.

At the time of step S2105, the standard signal group of USB Type-C illustrated in FIG. 20C is assigned to the terminals of the USB Type-C connector A 108. In such a case, the system control circuit A 121 attempts to communicate with the system control circuit B 227 of the adaptor apparatus 200 by using the D+ signal assigned to the terminal B6 of the USB Type-C connector A 108 or the D− signal assigned to the terminal B7. If the USB Type-C plug 210 of the adaptor apparatus 200 is directly inserted into the USB Type-C connector A 108 of the digital camera 100, the system control circuit A 121 and the system control circuit B 227 can communicate with each other. In a case where the system control circuit A 121 and the system control circuit B 227 can communicate with each other, the system control circuit A 121 then determines that the digital camera 100 and the adaptor apparatus 200 are not connected via the communication cable 310 (NO in step S2105).

On the other hand, if the digital camera 100 and the adaptor apparatus 200 are connected via the communication cable 310, the communication cable 310 is, as described above, unable to transmit the signals assigned to the terminals B5, B6, and B7 of the USB Type-C connector A 108. In a case where the system control circuit A 121 and the system control circuit B 227 fail to communicate normally, the system control circuit A 121 therefore determines that the digital camera 100 and the adaptor apparatus 200 are connected via the communication cable 310 (YES in step S2105).

In step S2105, in a case where the digital camera 100 and the adaptor apparatus 200 are determined to not be connected via the communication cable 310 (NO in step S2105), i.e., in a case where the digital camera 100 and the adaptor apparatus 200 are directly connected, the processing proceeds to step S2106.

In step S2106, the switch A 122 assigns the signal group illustrated in FIG. 20A to the terminals of the USB Type-C connector A 108, based on control of the controller A 123 and the system control circuit A 121. The signal group illustrated in FIG. 20A is intended for the case where the digital camera 100 and the adaptor apparatus 200 are directly connected (the case of FIG. 3A).

In step S2107, the system control circuit A 121 (or controller A 123) displays on the display unit 106 that the adaptor apparatus 200 is directly connected to the USB Type-C connector A 108 of the digital camera 100. In this step, the system control unit A 121 (or controller A 123) may display on the display unit 106 that the signal group illustrated in FIG. 20A for the case where the digital camera 100 and the adaptor apparatus 200 are directly connected is assigned to the terminals of the USB Type-C connector A 108.

In step S2108, the system control circuit A 121 performs direct connection adaptor in-connection processing to be described below with reference to FIG. 25.

When the processing of step S2108 ends, the processing proceeds to step S2109.

In step S2109, the switch A 122 assigns the standard signal group of USB Type-C illustrated in FIG. 20C to the terminals of the USB Type-C connector A 108, based on control of the controller A 123 and the system control circuit A 121. The processing then returns to step S2102, and the processing of step S2102 and subsequent steps is performed.

In step S2105, in a case where the digital camera 100 and the adaptor apparatus 200 are determined to be connected via the communication cable 310 (YES in step S2105), the processing proceeds to step S2110.

In step S2110, the switch A 122 assigns the signal group illustrated in FIG. 20B to the terminals of the USB Type-C connector A 108, based on control of the controller A 123 and the system control circuit A 121. The signal group illustrated in FIG. 20B is intended for the case where the digital camera 100 and the adaptor apparatus 200 are connected via the communication cable 310 (the case of FIG. 3B). The processing then proceeds to step S2111.

In step S2111, the system control circuit A 121 (or controller A 123) displays on the display unit 106 that the adaptor apparatus 200 is connected to the USB Type-C connector A 108 of the digital camera 100 via the communication cable 310. In this step, the system control circuit A 121 (or controller A 123) may display on the display unit 106 that the signal group illustrated in FIG. 20B for the case where the digital camera 100 and the adaptor apparatus 200 are connected via the communication cable 310 is assigned to the terminals of the USB Type-C connector A 108.

In step S2112, the system control circuit A 121 performs cable connection adaptor in-connection processing to be described below with reference to FIG. 26.

When the processing of step S2112 ends, the processing proceeds to step S2109.

In step S2109, as described above, the switch A 122 assigns the standard signal group of USB Type-C illustrated in FIG. 20C to the terminals of the USB Type-C connector A 108, based on control of the controller A 123 and the system control circuit A 121. The processing then returns to step S2102, and the processing of step S2102 and subsequent steps is performed.

In step S2104, in a case where the device connected to the USB Type-C connector A 108 of the digital camera 100 is determined to not be the adaptor apparatus 200 (NO in step S2104), the processing proceeds to step S2113. In a case where the processing proceeds to step S2113, the system control circuit A 121 determines that the device connected to the USB Type-C connector A 108 of the digital camera 100 is a device (USB communication device) that performs communication compliant with the USB standard (the state of FIG. 8).

In step S2113, the system control circuit A 121 starts communication compliant with the USB standard without changing the standard signal group of USB Type-C illustrated in FIG. 20C, currently applied to the terminals of the USB Type-C connector A 108.

In step S2114, the system control circuit A 121 determines (detects) whether the USB communication device having started communication in step S2113 is connected to the USB Type-C connector A 108 of the digital camera 100. In a case where the USB communication device having started communication in step S2113 is determined to be connected to the USB Type-C connector A 108 (YES in step S2114), the processing proceeds to step S2114 to continue the communication started in step S2113.

In step S2114, in a case where the USB communication device having started communication in step S2113 is determined to not be connected to the USB Type-C connector A 108 (NO in step S2114), the processing returns to step S2102. The processing of step S2102 and subsequent steps is then performed.

The direct connection adaptor in-connection processing in step S2108 of FIG. 21 and the cable connection adaptor in-connection processing in step S2112 of FIG. 21 will be described below with reference to FIGS. 22A to 26.

Figure 22A:
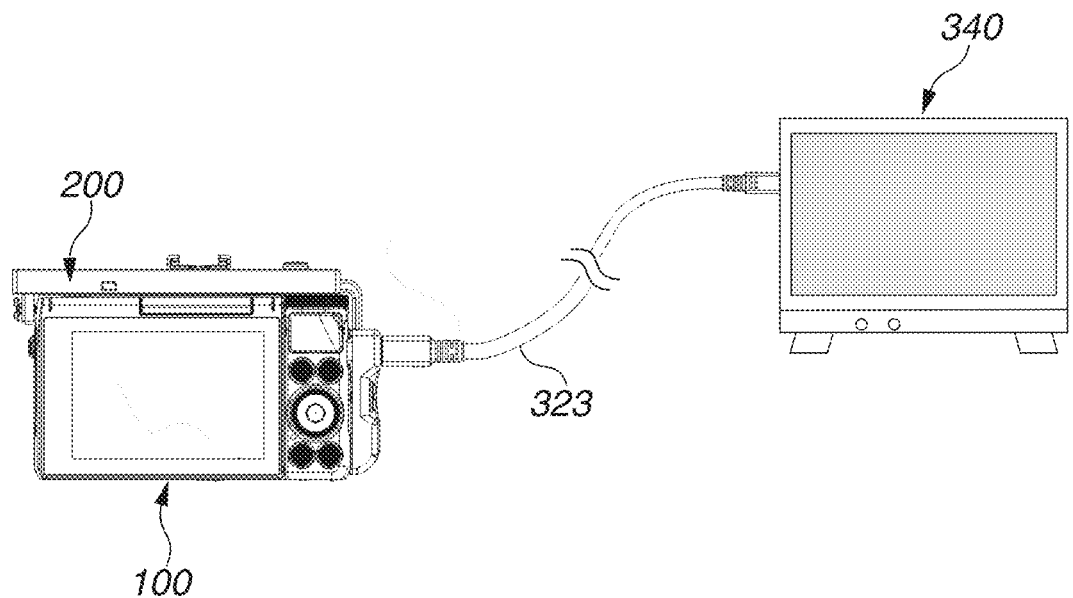
FIGS. 22A and 22B are diagrams illustrating examples of a camera system in which the digital camera and an adaptor apparatus according to the fourth exemplary embodiment of the present disclosure are electrically connected, and another device is electrically connected to the adaptor apparatus.
Figure 22B:
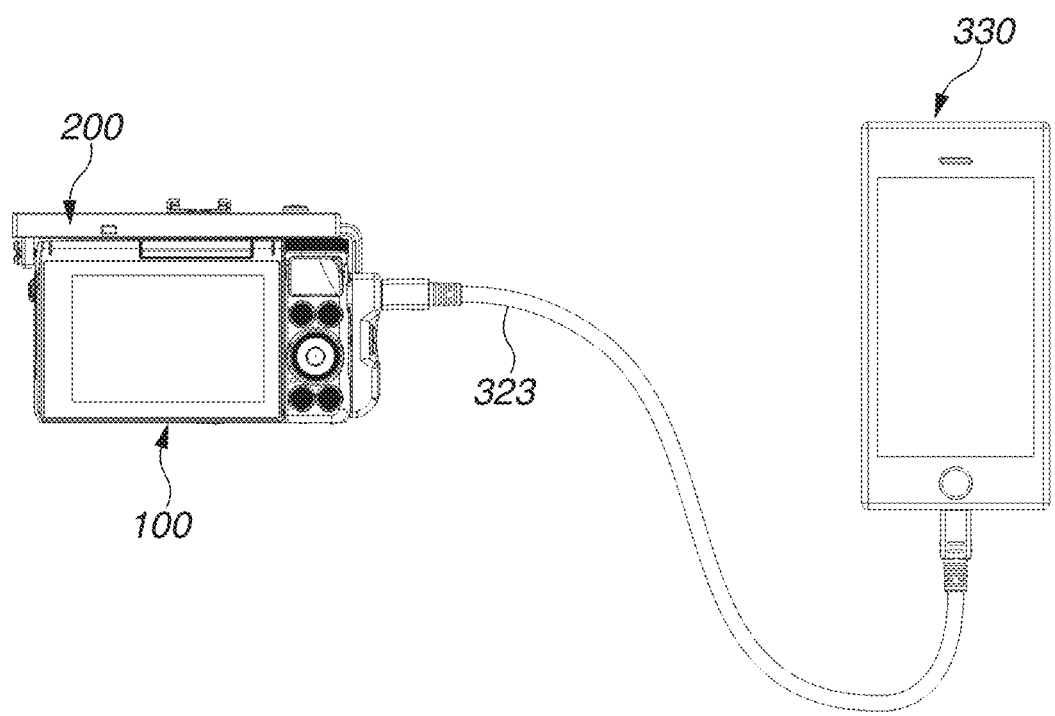

FIGS. 22A and 22B are diagrams illustrating examples of appearance of a camera system (imaging system) in which the digital camera 100 illustrated in FIGS. 1A and 1B and the adaptor apparatus 200 illustrated in FIGS. 2A and 2B are electrically connected and another device is electrically connected to the adaptor apparatus 200. In FIGS. 22A and 22B, components similar to those illustrated in FIGS. 1A to 5 are designated by the same reference numerals.

FIG. 22A is a diagram illustrating an example of appearance of a camera system in which the USB Type-C plug 210 of the adaptor apparatus 200 is directly inserted into the USB Type-C connector A 108 of the digital camera 100 (the state of FIG. 3A) and in which state a monitor 340 capable of Alt communication is connected during the direct connection adaptor in-connection processing in step S2108 of FIG. 21. Specifically, in FIG. 22A, one end of the communication cable 323 is inserted into the USB Type-C connector D 206 of the adaptor apparatus 200, and the other end of the communication cable 323 is inserted into a connector (not illustrated) of the monitor 340 for connection. As a result, the digital camera 100 and the monitor 340 can input and output video signals and audio signals via the adaptor apparatus 200 and the communication cable 323. As described above, the monitor 340 is a device capable of Alt communication. The signal assignment to the terminals of the USB Type-C connector A 108 in this camera system of FIG. 22A will be described below with reference to FIGS. 24A and 25.

FIG. 22B is a diagram illustrating an example of appearance of a camera system in which the USB Type-C plug 210 of the adaptor apparatus 200 is directly inserted into the USB Type-C connector A 108 of the digital camera 100 (the state of FIG. 3A) and in which state the smartphone 330 capable of USB connection is connected during the direct connection adaptor in-connection processing in step S2108 of FIG. 21. Specifically, in FIG. 22B, one end of the communication cable 323 is inserted into the USB Type-C connector D 206 of the adaptor apparatus 200, and the other end of the communication cable 323 is inserted into the USB Type-C connector E 332 of the smartphone 330 for connection. As a result, the digital camera 100 and the smartphone 330 can perform communication compliant with the USB standard with each other via the adaptor apparatus 200 and the communication cable 323. As described above, the smartphone 330 is a device capable of USB communication. The signal assignment to the terminals of the USB Type-C connector A 108 in this camera system of FIG. 22B will be described below with reference to FIGS. 24B and 25.

Figure 23A:
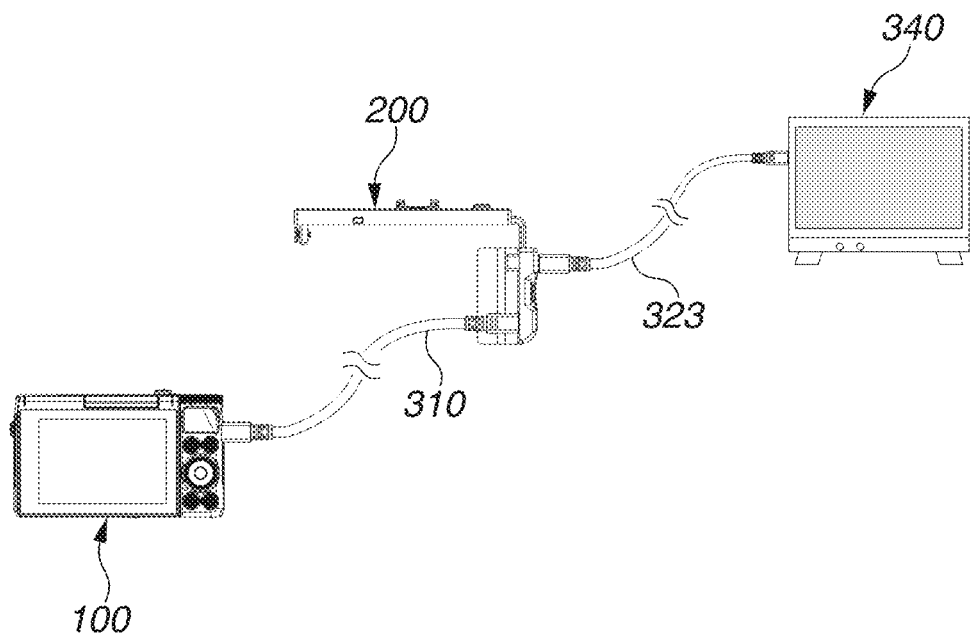
FIGS. 23A and 23B are diagrams illustrating examples of a camera system in which the digital camera and the adaptor apparatus according to the fourth exemplary embodiment of the present disclosure are electrically connected via a communication cable, and another device is electrically connected to the adaptor apparatus.
Figure 23B:
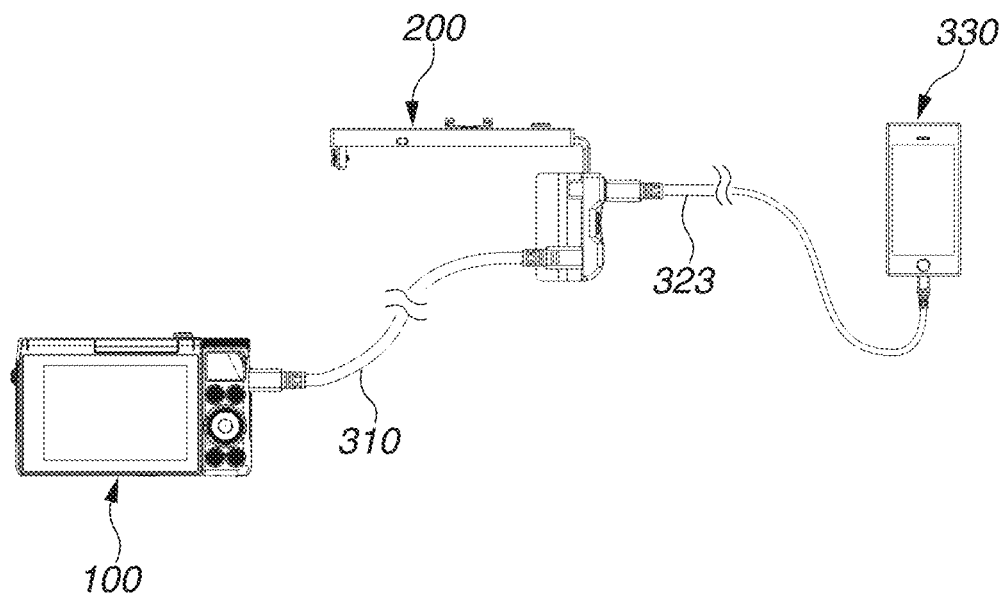

FIGS. 23A and 23B are diagrams illustrating examples of appearance of a camera system (imaging system) in which the digital camera 100 illustrated in FIGS. 1A and 1B and the adaptor apparatus 200 illustrated in FIGS. 2A and 2B are electrically connected via the communication cable 310, and another device is electrically connected to the adaptor apparatus 200. In FIGS. 23A and 23B, components similar to those illustrated in FIGS. 1A to 5, 22A, and 22B are designated by the same reference numerals.

FIG. 23A is a diagram illustrating an example of appearance of a camera system in which the digital camera 100 and the adaptor apparatus 200 are electrically connected via the communication cable 310 (the state of FIG. 3B) and in which state the monitor 340 capable of Alt communication is connected during the cable connection adaptor in-connection processing in step S2112 of FIG. 21. Specifically, in FIG. 23A, the digital camera 100 and the adaptor apparatus 200 are electrically connected via the communication cable 310, in which state one end of the communication cable 323 is inserted into the USB Type-C connector D 206 of the adaptor apparatus 200 and the other end of the communication cable 323 is inserted into the connector (not illustrated) of the monitor 340 for communication. As a result, the digital camera 100 and the monitor 340 can input and output video signals and audio signals via the adaptor apparatus 200 and the communication cable 323. As described above, the monitor 340 is a device capable of Alt communication. The signal assignment to the terminals of the USB Type-C connector A 108 in this camera system of FIG. 23A will be described below with reference to FIGS. 24C and 26.

FIG. 23B is a diagram illustrating an example of appearance of a camera system in which the digital camera 100 and the adaptor apparatus 200 are electrically connected via the communication cable 310 (the state of FIG. 3B) and in which state the smartphone 330 capable of USB communication is connected during the cable connection adaptor in-connection processing in step S2112 of FIG. 21. Specifically, in FIG. 23B, the digital camera 100 and the adaptor apparatus 200 are electrically connected via the communication cable 310, in which state one end of the communication cable 323 is connected to the USB Type-C connector D 206 of the adaptor apparatus 200 and the other end of the communication cable 323 is inserted into the USB Type-C connector E 332 of the smartphone 330 for connection. As a result, the digital camera 100 and the smartphone 330 can perform communication compliant with the USB standard with each other via the adaptor apparatus 200 and the communication cable 323. As described above, the smartphone 330 is a device capable of USB communication. The signal assignment to the terminals of the USB Type-C connector A 108 in this camera system of FIG. 23B will be described below with reference to FIGS. 24D and 26.

FIGS. 24A to 24D are tables illustrating examples of the signal groups to be assigned to the terminals of the USB Type-C connector A 108 of the digital camera 100 included in the camera systems illustrated in FIGS. 22A, 22B, 23A, and 23B.

FIG. 24A will be described.

FIG. 24A is a table illustrating an example of the signal group to be assigned to the terminals of the USB Type-C connector A 108 of the digital camera 100 included in the camera system illustrated in FIG. 22A. In the following description of FIG. 24A, signal names and their roles are the same as those described above with reference to FIGS. 20A to 20C. A description thereof will thus be omitted.

As illustrated in FIG. 24A, the GND signal is assigned to the terminals A1, A12, B1, and B12. The TX1+, TX1−, RX1−, and RX1+ signals are assigned to the terminals A2, A3, B10, and B11, respectively. The VBUS signal is assigned to the terminals A4, A9, B4, and B9.

The CC1 signal is assigned to the terminal A5. The D+ and D− signals are assigned to the terminals A6 and A7, respectively. As described above, the system control circuit A 121 of the digital camera 100 transmits the control signals related to the external flash unit 320 to the system control circuit B 227 of the adaptor apparatus 200. With the assignment of the signal group illustrated in FIG. 24A, the system control circuit A 121 and the system control circuit B 227 communicate by using USB 2.0 standard-compliant communication of the D+ and D− signals assigned to the terminals A6 and A7. Specifically, the signals related to the external flash unit 320, to be communicated by using the D+ and D− signals assigned to the terminals A6 and A7, are the STROBE DET SW, EF CLOCK, STROBE CLOCK, EF CHIP SELECT, STROBE TX, and STROBE RX signals described above.

The STROBE FLASH signal is assigned to the terminal B7. The SW1 and SW2 signals are assigned to the terminals B5 and B6, respectively.

The monitor 340 uses Alt communication signals which are assigned to the terminals A10, A11, B2, B3, A8, and B8. While the signals assigned to the terminals mentioned above are used as the Alt communication signals in the present exemplary embodiment, the number and types of signals may be arbitrarily set depending on the type of device capable of Alt communication. Specifically, a DS LANE0− signal, a DS LANE0+ signal, a DS LANE1+ signal, and a DS LANE1− signal are assigned to the terminals A10, A11, B2, and B3, respectively. The DS LANE0−, DS LANE0+, DS LANE1+, and DS LANE1− signals are video signals of the monitor 340. The DS LANE0− and DS LANE0+ signals constitute a pair of differential signals and the DS LANE1+ and DS LANE1− signals constitute another pair of differential signals. The use of the signals originally intended to perform communication of the USB 3.1 standard enables high-speed communication of video signals. An AUX+ signal and an AUX− signal, a pair of differential signals, are assigned to the terminals A8 and B8, respectively. The AUX+ and AUX− signals are audio signals of the monitor 340.

Next, FIG. 24B will be described.

FIG. 24B is a table illustrating an example of the signal group to be assigned to the terminals of the USB Type-C connector A 108 of the digital camera 100 included in the camera system illustrated in FIG. 22B. In the following description of FIG. 24B, signal names and their roles are the same as those described above with reference to FIG. 20A to 20C. A description thereof will thus be omitted.

Specifically, the assignment of the signal group illustrated in FIG. 24B is exactly the same as that of the signal group illustrated in FIG. 20A. Specifically, if the adaptor apparatus 200 is directly connected to the digital camera 100, and the adaptor apparatus 200 and the smartphone 330 are connected via the communication cable 323, communication compliant with the USB standard is performed via the USB hub 224 of the adaptor apparatus 200. In the present exemplary embodiment, as described above, the smartphone 330 is a device that performs communication compliant with the USB 3.1 standard. In the case of FIG. 24B, the communication is performed either by using the TX1+, TX1−, RX1−, and RX1+ signals assigned to the terminals A2, A3, B10, and B11, respectively, or by using the TX2+, TX2−, RX2−, and RX2+ signals assigned to the terminals B2, B3, A10, and A11, respectively.

Next, FIG. 24C will be described.

FIG. 24C is a table illustrating an example of the signal group to be assigned to the terminals of the USB Type-C connector A 108 of the digital camera 100 included in the camera system illustrated in FIG. 23A. In the following description of FIG. 24C, signal names and their roles are the same as those described above with reference to FIG. 20A to 20C. A description thereof will thus be omitted.

As illustrated in FIG. 24C, the GND signal is assigned to the terminals A1, A12, B1, and B12. The VBUS signal is assigned to the terminals A4, A9, B4, and B9.

The CC1 signal is assigned to the terminal A5. The D+ and D− signals are assigned to the terminals A6 and A7, respectively. As described above, the system control circuit A 121 of the digital camera 100 transmits the control signals related to the external flash unit 320 to the system control circuit B 227 of the adaptor apparatus 200. With the assignment of the signal group illustrated in FIG. 24C, the system control circuit A 121 and the system control circuit B 227 communicate by using USB 2.0 standard-compliant communication of the D+ and D− signals assigned to the terminals A6 and A7. Specifically, the signals related to the external flash unit 320, to be communicated by using the D+ and D− signals assigned to the terminals A6 and A7, are the STROBE DET SW, EF CLOCK, STROBE CLOCK, EF CHIP SELECT, STROBE TX, and STROBE RX signals described above.

The STROBE FLASH signal is assigned to the terminal B10. The SW1 and SW2 signals are assigned to the terminals A2 and A3, respectively.

The monitor 340 uses the Alt communication signals assigned to the terminals A10, A11, B2, B3, A8, and B8. Specifically, the DS LANE0−, DS LANE0+, DS LANE1+, and DS LANE1− signals, which are the video signals of the monitor 340, are assigned to the terminals A10, A11, B2, and B3, respectively. The DS LANE0− and DS LANE0+ signals constitute a pair of differential signals and the DS LANE1+ and DS LANE1− signals constitute another pair of differential signals. The use of the signals originally intended to perform USB 3.1 standard communication enables high-speed communication of video signals. The AUX+ and AUX− signals, a pair of differential signals, are assigned to the terminals A8 and B8, respectively. The AUX+ and AUX− signals are the audio signals of the monitor 340.

In FIG. 24C, no signal is assigned to the terminal B5, B6, B7, or B11. The reason why the assignment of the signal group illustrated in FIG. 24A differs from the assignment of the signal group illustrated in FIG. 24C is the same as the foregoing why the assignment of the signal group illustrated in FIG. 20A differs from the assignment of the signal group illustrated in FIG. 20B.

Next, FIG. 24D will be described.

FIG. 24D is a table illustrating an example of the signal group to be assigned to the terminals of the USB Type-C connector A 108 of the digital camera 100 included in the camera system illustrated in FIG. 23B. In the following description of FIG. 24D, signal names and their roles are the same as those described above with reference to FIG. 20A to 20C. A description thereof will thus be omitted.

Specifically, the assignment of the signal group illustrated in FIG. 24D is exactly the same as that of the signal group illustrated in FIG. 20B. Specifically, if the adaptor apparatus 200 is connected to the digital camera 100 via the communication cable 310, and the adaptor apparatus 200 and the smartphone 330 are connected via the communication cable 323, communication compliant with the USB standard is performed via the USB hub 224 of the adaptor apparatus 200. In the present exemplary embodiment, as described above, the smartphone 330 is a device that performs communication compliant with the USB 3.1 standard. In the case of FIG. 24D, the communication is thus performed by using the TX2+, TX2−, RX2−, and RX2+ signals assigned to the terminals B2, B3, A10, and A11, respectively.

Next, a detailed processing procedure of the direct connection adaptor in-connection processing in step S2108 of FIG. 21 will be described.

Figure 25:
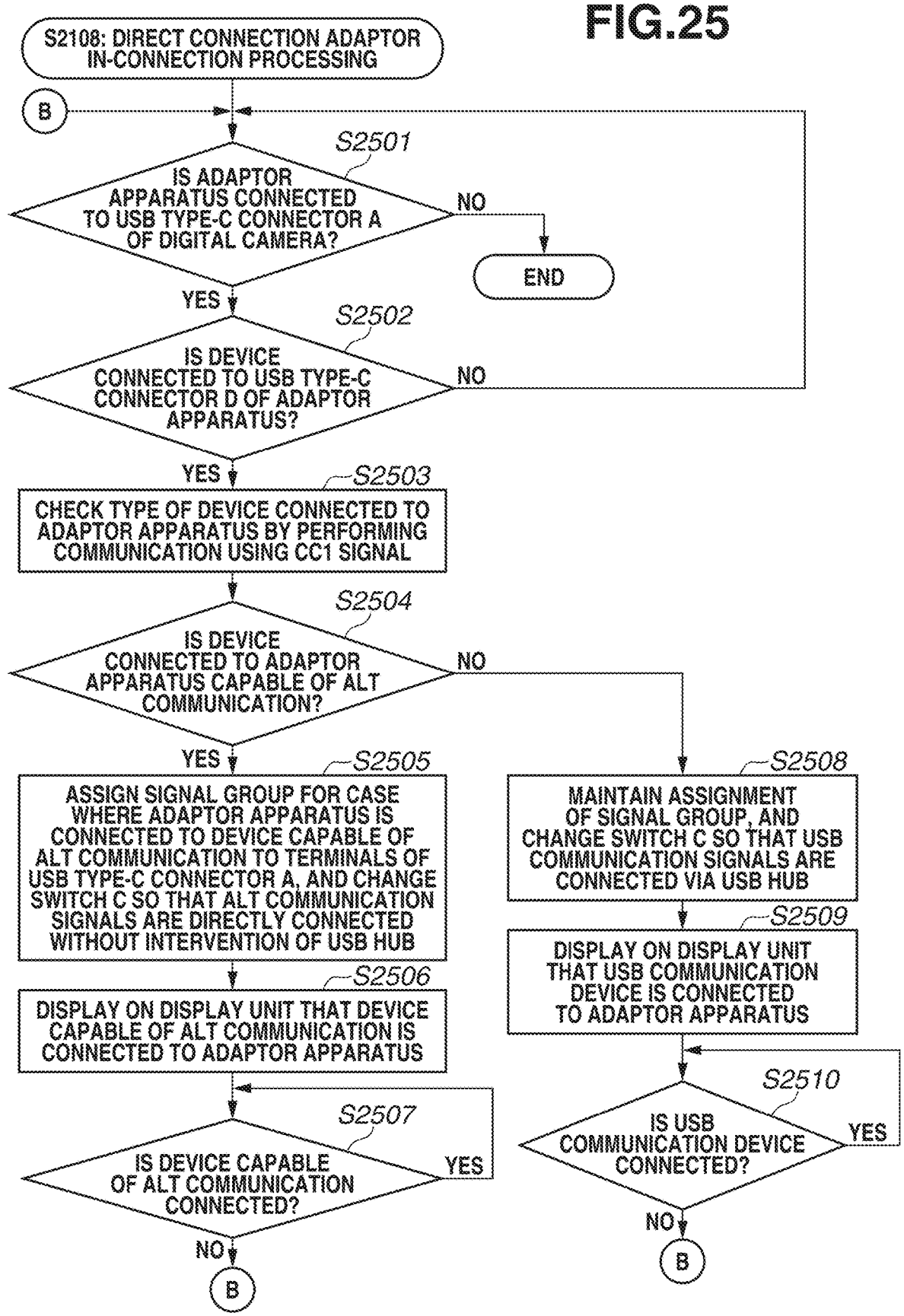
FIG. 25 is a flowchart illustrating an example of a detailed processing procedure of direct connection adaptor in-connection processing in step S2108 of FIG. 21.

FIG. 25 is a flowchart illustrating an example of the detailed processing procedure of the direct connection adaptor in-connection processing in step S2108 of FIG. 21. Specifically, the processing of the flowchart illustrated in FIG. 25 corresponds to an operation in the cases of the camera systems illustrated in FIGS. 22A and 22B.

In step S2501 of FIG. 25, the system control circuit A 121 determines (detects) whether the adaptor apparatus 200 is connected to the USB Type-C connector A 108 of the digital camera 100. In a case where the adaptor apparatus 200 is determined to not be connected to the USB Type-C connector A 108 of the digital camera 100 (NO in step S2501), the processing of the flowchart of FIG. 25 ends. The processing proceeds to step S2109 of FIG. 21.

In step S2501, in a case where the adaptor apparatus 200 is determined to be connected to the USB Type-C connector A 108 of the digital camera 100 (YES in step S2501), the processing proceeds to step S2502.

In step S2502, the system control circuit A 121 determines (detects) whether any device is connected to the USB Type-C connectors D 203, 206, and 207 of the adaptor apparatus 200, for example, based on communication with the system control circuit B 227. In a case where no device is determined to be connected to the USB Type-C connector D 203, 206, or 207 of the adaptor apparatus 200 (NO in step S2502), the processing returns to step S2501. The processing of step S2501 and subsequent steps is then performed.

In step S2502, in a case where a device is determined to be connected to the USB Type-C connector D 203, 206, or 207 of the adaptor apparatus 200 (YES in step S2502), the processing proceeds to step S2503.

In step S2503, the system control circuit A 121 performs processing for checking and detecting the type of the device, based on information obtained by the controller A 123 performing communication with the device connected to the USB Type-C connector D 203, 206, or 207 via the controller B 222 of the adaptor apparatus 200 by using the CC1 signal.

In step S2504, the system control circuit A 121 determines (detects) whether the device connected to the USB Type-C connector D 203, 206, or 207 of the adaptor apparatus 200 is a device capable of Alt communication, based on the detection result obtained by the checking in step S2503.

In step S2504, in a case where the device connected to the USB Type-C connector D 203, 206, or 207 of the adaptor apparatus 200 is determined to be a device capable of Alt communication (YES in step S2504), the processing proceeds to step S2505. In a case where the processing proceeds to step S2505, the signal group illustrated in FIG. 20A for the case where the digital camera 100 and the adaptor apparatus 200 are directly connected (the case of FIG. 3A) has been assigned to the terminals of the USB Type-C connector A 108 in step S2106 of FIG. 21.

In step S2505, the switch A 122 assigns the signal group illustrated in FIG. 24A to the terminals of the USB Type-C connector A 108, based on control of the controller A 123 and the system control circuit A 121. The signal group illustrated in FIG. 24A is intended for the case where the adaptor apparatus 200 is connected to the monitor 340 capable of Alt communication via the communication cable 323 (the case of FIG. 22A). Here, the adaptor apparatus 200 changes the switch C 228 according to instructions from the controller B 222 so that the Alt communication signals of the monitor 340, a device capable of Alt communication, are directly connected to the switch B 221 without the intervention of the USB hub 224. As described above, the USB Type-C specifications define that devices capable of Alt communication are unable to perform communication via the USB hub 224. Devices capable of Alt communication can be connected to a device including the USB hub 224, such as the adaptor apparatus 200, by performing the processing of step S2505.

In step S2506, the system control circuit A 121 (or controller A 123) displays on the display unit 106 that a device capable of Alt communication is connected to the adaptor apparatus 200 directly connected to the digital camera 100. In this step, the system control circuit A 121 (or controller A 123) may display on the display unit 106 that the signal group illustrated in FIG. 24A for the case where a device capable of Alt communication (monitor 340) is connected to the adaptor apparatus 200 is assigned to the terminals of the USB Type-C connector A 108.

In step S2507, the system control circuit A 121 determines (detects) whether the device capable of Alt communication (monitor 340), determined to be connected in step S2504, is connected to the USB Type-C connector D 203, 206, or 207 of the adaptor apparatus 200.

In a case where the device capable of Alt communication is determined to be connected to the USB Type-C connector D 203, 206, or 207 of the adaptor apparatus 200 (YES in step S2507), the processing proceeds to step S2507. That is, the system control circuit A 121 waits in step S2507.

In step S2507, in a case where the device capable of Alt communication is determined to not be connected to the USB Type-C connector D 203, 206, or 207 of the adaptor apparatus 200 (NO in step S2507), the system control circuit A 121 determines that the device capable of Alt communication is detached from the adaptor apparatus 200. The processing returns to step S2501, and the processing of step S2501 and subsequent steps is performed.

In step S2504, in a case where the device connected to the USB Type-C connector D 203, 206, or 207 of the adaptor apparatus 200 is determined to not be a device capable of Alt communication (NO in step S2504), the processing proceeds to step S2508. In the present exemplary embodiment, if the device connected to the USB Type-C connector D 203, 206, or 207 of the adaptor apparatus 200 is not a device capable of Alt communication, a USB communication device that performs communication compliant with the USB standard (smartphone 330) is connected. In a case where the processing proceeds to step S2508, the signal group illustrated in FIG. 20A for the case where the digital camera 100 and the adaptor apparatus 200 are directly connected has been assigned to the terminals of the USB Type-C connector A 108 in step S2106 of FIG. 21.

In step S2508, the switch A 122 assigns the signal group illustrated in FIG. 24B to the terminals of the USB Type-C connector A 108, based on control of the controller A 123 and the system control circuit A 121. The signal group illustrated in FIG. 24B is the same as the signal group illustrated in FIG. 20A, currently assigned to the terminals of the USB Type-C connector A 108. In this step, the switch A 122 therefore performs processing for maintaining the assignment of the signal group. The adaptor apparatus 200 changes the switch C 228 according to instructions from the controller B 222 so that the USB communication signals of the smartphone 330, which performs communication compliant with the USB standard, are connected to the switch B 221 via the USB hub 224. In the present exemplary embodiment, as described above, the smartphone 330 is a device that performs communication compliant with the USB 3.1 standard. In the case of FIG. 24B, the communication is therefore performed either by using the TX1+, TX1−, RX1−, and RX1+ signals assigned to the terminals A2, A3, B10, and B11, respectively, or by using the TX2+, TX2−, RX2−, and RX2+ signals assigned to the terminals B2, B3, A10, and A11, respectively.

In step S2509, the system control circuit A 121 (or controller A 123) displays on the display unit 106 that a USB communication device is connected to the adaptor apparatus 200 directly connected to the digital camera 100. In this step, the system control circuit A 121 (or controller A 123) may display on the display unit 106 that the signal group illustrated in FIG. 24B for the case where a USB communication device (smartphone 330) is connected to the adaptor apparatus 200 is assigned to the terminals of the USB Type-C connector A 108. In this step, the system control circuit A 121 (or controller A 123) may display on the display unit 106 that a communication with the USB communication device is started via the adaptor apparatus 200.

In step S2510, the system control circuit A 121 determines (detects) whether the USB communication device (smartphone 330) determined to be connected in step S2504 is connected to the USB Type-C connector D 203, 206, or 207 of the adaptor apparatus 200. In a case where the USB communication device is determined to be connected to the USB Type-C connector D 203, 206, or 207 of the adaptor apparatus 200 (YES in step S2510), the processing proceeds to step S2510. That is, the system control circuit A 121 waits in step S2510.

In step S2510, in a case where the USB communication device is determined to not be connected to the USB Type-C connector D 203, 206, or 207 of the adaptor apparatus 200 (NO in step S2510), the system control circuit A 121 determines that the USB communication device is detached from the adaptor apparatus 200. The processing returns to step S2501, and the processing of step S2501 and subsequent steps is performed.

Next, a detailed processing procedure of the cable connection adaptor in-connection processing in step S2112 of FIG. 21 will be described.

Figure 26:
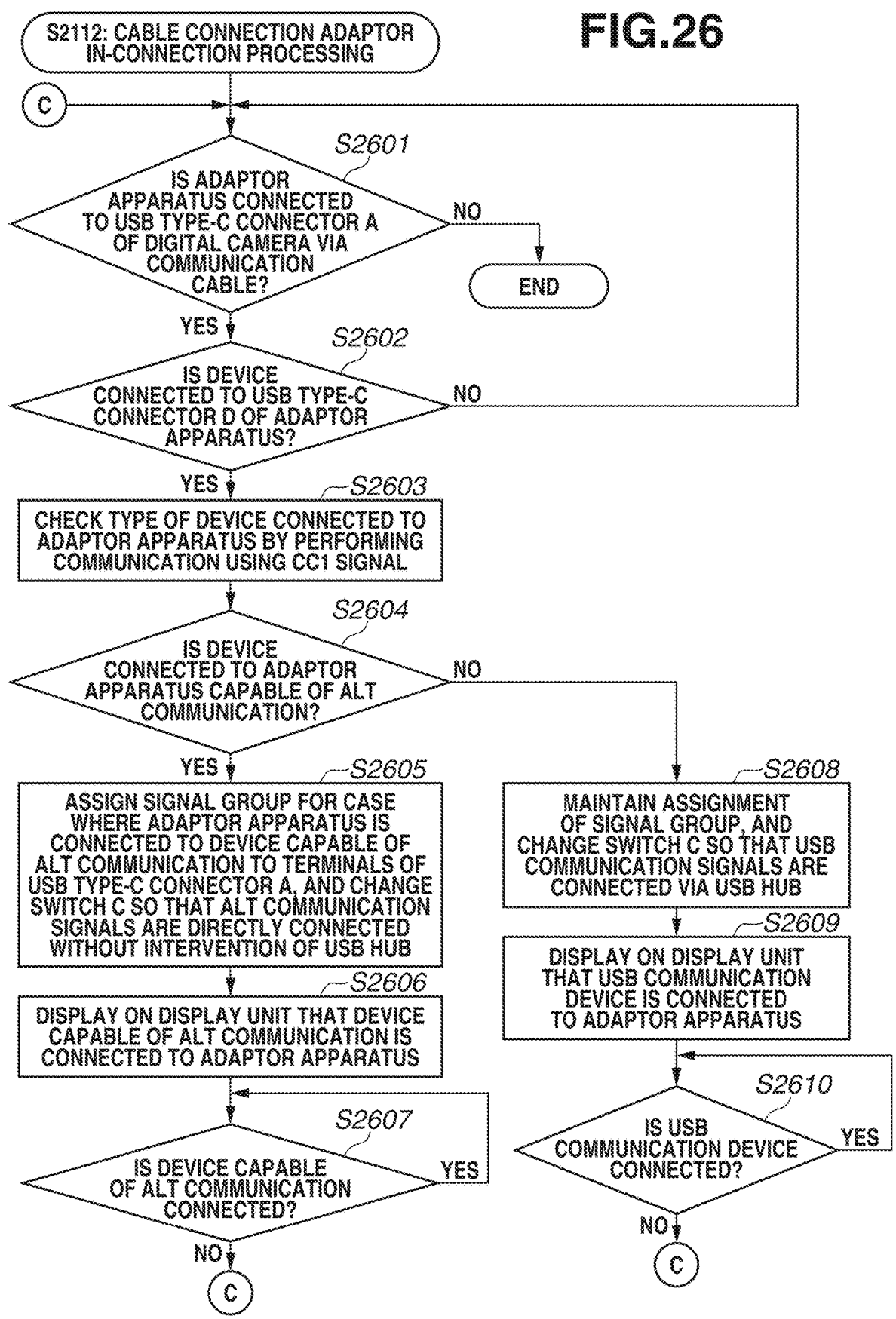
FIG. 26 is a flowchart illustrating an example of a detailed processing procedure of cable connection adaptor in-connection processing in step S2112 of FIG. 21.

FIG. 26 is a flowchart illustrating an example of the detailed processing procedure of the cable connection adaptor in-connection processing in step S2112 of FIG. 21. Specifically, the processing of the flowchart illustrated in FIG. 26 corresponds to an operation in the cases of the camera systems illustrated in FIGS. 23A and 23B.

In step S2601 of FIG. 26, the system control circuit A 121 determines (detects) whether the adaptor apparatus 200 is connected to the USB Type-C connector A 108 of the digital camera 100 via the communication cable 310. In a case where the adaptor apparatus 200 is determined to not be connected to the USB Type-C connector A 108 of the digital camera 100 via the communication cable 310 (NO in step S2601), the processing of the flowchart of FIG. 26 ends. The processing proceeds to step S2109 of FIG. 21.

In step S2601, in a case where the adaptor apparatus 200 is determined to be connected to the USB Type-C connector A 108 of the digital camera 100 via the communication cable 310 (YES in step S2601), the processing proceeds to step S2602.

In step S2602, the system control circuit A 121 determines (detects) whether any device is connected to the USB Type-C connectors D 203, 206, and 207 of the adaptor apparatus 200, for example, based on communication with the system control circuit B 227. In a case where no device is determined to be connected to the USB Type-C connector D 203, 206, or 207 of the adaptor apparatus 200 (NO in step S2602), the processing returns to step S2601. The processing of step S2601 and subsequent steps is then performed.

In step S2602, in a case where a device is determined to be connected to the USB Type-C connector D 203, 206, or 207 of the adaptor apparatus 200 (YES in step S2602), the processing proceeds to step S2603.

In step S2603, the system control circuit A 121 performs processing for checking and detecting the type of the device, based on information obtained by the controller A 123 performing communication with the device connected to the USB Type-C connector D 203, 206, or 207 via the controller B 222 of the adaptor apparatus 200 by using the CC1 signal.

In step S2604, the system control circuit A 121 determines (detects) whether the device connected to the USB Type-C connector D 203, 206, or 207 of the adaptor apparatus 200 is a device capable of Alt communication, based on the detection result obtained by the checking in step S2603.

In step S2604, in a case where the device connected to the USB Type-C connector D 203, 206, or 207 of the adaptor apparatus 200 is determined to be a device capable of Alt communication (YES in step S2604), the processing proceeds to step S2605. In a case where the processing proceeds to step S2605, the signal group illustrated in FIG. 20B for the case where the digital camera 100 and the adaptor apparatus 200 are connected via the communication cable 310 (the case of FIG. 3B) has been assigned to the terminals of the USB Type-C connector A 108 in step S2110 of FIG. 21.

In step S2605, the switch A 122 assigns the signal group illustrated in FIG. 24C to the terminals of the USB Type-C connector A 108, based on control of the controller A 123 and the system control circuit A 121. The signal group illustrated in FIG. 24C is intended for the case where the adaptor apparatus 200 is connected to the monitor 340 capable of Alt communication via the communication cable 323 (the case of FIG. 23A). Here, the adaptor apparatus 200 changes the switch C 228 according to instructions from the controller B 222 so that the Alt communication signals of the monitor 340, which is a device capable of Alt communication, are directly connected to the switch B 221 without the intervention of the USB hub 224. As described above, the USB Type-C specifications define that devices capable of Alt communication are unable to perform communication via the USB hub 224. Devices capable of Alt communication can be connected to a device including the USB hub 224, such as the adaptor apparatus 200, by performing the processing of step S2605.

In step S2606, the system control circuit A 121 (or controller A 123) displays on the display unit 106 that a device capable of Alt communication is connected to the adaptor apparatus 200 connected to the digital camera 100 via the communication cable 310. In this step, the system control circuit A 121 (or controller A 123) may display on the display unit 106 that the signal group illustrated in FIG. 24C for the case where a device capable of Alt communication (monitor 340) is connected to the adaptor apparatus 200 is assigned to the terminals of the USB Type-C connector A 108.

In step S2607, the system control circuit A 121 determines (detects) whether the device capable of Alt communication (monitor 340), determined to be connected in step S2604, is connected to the USB Type-C connector D 203, 206, or 207 of the adaptor apparatus 200.

In a case where the device capable of Alt communication is determined to be connected to the USB Type-C connector D 203, 206, or 207 of the adaptor apparatus 200 (YES in step S2607), the processing proceeds to step S2607. That is, the system control circuit A 121 waits in step S2607.

In step S2607, in a case where the device capable of Alt communication is determined to not be connected to the USB Type-C connector D 203, 206, or 207 of the adaptor apparatus 200 (NO in step S2607), the system control circuit A 121 determines that the device capable of Alt communication is detached from the adaptor apparatus 200. The processing returns to step S2601, and the processing of step S2601 and subsequent steps is performed.

In step S2604, in a case where the device connected to the USB Type-C connector D 203, 206, or 207 of the adaptor apparatus 200 is determined to not be a device capable of Alt communication (NO in step S2604), the processing proceeds to step S2608. In the present exemplary embodiment, in a case where the device connected to the USB Type-C connector D 203, 206, or 207 of the adaptor apparatus 200 is not a device capable of Alt communication, a USB communication device that performs communication compliant with the USB standard (smartphone 330) is connected. In a case where the processing proceeds to step S2608, the signal group illustrated in FIG. 20B for the case where the digital camera 100 and the adaptor apparatus 200 are connected via the communication cable 310 (the case of FIG. 3B) has been assigned to the terminals of the USB Type-C connector A 108 in step S2110 of FIG. 21.

In step S2608, the switch A 122 assigns the signal group illustrated in FIG. 24D to the terminals of the USB Type-C connector A 108, based on control of the controller A 123 and the system control circuit A 121. The signal group illustrated in FIG. 24D is the same as the signal group illustrated in FIG. 20B which is currently assigned to the terminals of the USB Type-C connector A 108. In this step, the switch A 122 therefore performs processing for maintaining the assignment of the signal group. The adaptor apparatus 200 further changes the switch C 228 according to instructions from the controller B 222 so that the USB communication signals of the smartphone 330, which performs communication compliant with the USB standard, are connected to the switch B 221 via the USB hub 224. In the present exemplary embodiment, as described above, the smartphone 330 is a device that performs communication compliant with the USB 3.1 standard. In the case of FIG. 24D, the communication is therefore performed by using the TX2+, TX2−, RX2−, and RX2+ signals assigned to the terminals B2, B3, A10, and A11, respectively.

In step S2609, the system control circuit A 121 (or controller A 123) displays on the display unit 106 that a USB communication device is connected to the adaptor apparatus 200 connected to the digital camera 100 via the communication cable 310. In this step, the system control circuit A 121 (or controller A 123) may display on the display unit 106 that the signal group illustrated in FIG. 24D for the case where a USB communication device (smartphone 330) is connected to the adaptor apparatus 200 is assigned to the terminals of the USB Type-C connector A 108. In this step, the system control circuit A 121 (or controller A 123) may display on the display unit 106 that a communication with the USB communication device is started via the adaptor apparatus 200.

In step S2610, the system control circuit A 121 determines (detects) whether the USB communication device (smartphone 330) determined to be connected in step S2604 is connected to the USB Type-C connector D 203, 206, or 207 of the adaptor apparatus 200. In a case where the USB communication device is determined to be connected to the USB Type-C connector D 203, 206, or 207 of the adaptor apparatus 200 (YES in step S2610), the processing proceeds to step S2610. That is, the system control circuit A 121 waits in step S2610.

In step S2610, in a case where the USB communication device is determined to not be connected to the USB Type-C connector D 203, 206, or 207 of the adaptor apparatus 200 (NO in step S2610), the system control circuit A 121 determines that the USB communication device is detached from the adaptor apparatus 200. The processing returns to step S2601, and the processing of step S2601 and subsequent steps is performed.

In the digital camera 100 according to the present exemplary embodiment described above, the system control circuit A 121 detects whether the adaptor apparatus 200 is electrically connected via the USB Type-C connector A 108 (step S2104 of FIG. 21, step S2501 of FIG. 25, and step S2601 of FIG. 26).

The system control circuit A 121 performing such detection processing is included in a first detection unit. In the foregoing description of FIGS. 21, 25, and 26, the detection processing is described to be performed by the system control circuit A 121. However, the present exemplary embodiment is not limited thereto. For example, the controller A 123 may perform the detection processing.

In a case where the adaptor apparatus 200 is detected to be electrically connected via the USB Type-C connector A 108, the system control circuit A 121 detects whether another device connected to the adaptor apparatus 200 is one capable of performing communication of a communication standard different from the USB standard (step S2504 of FIG. 25 and step S2604 of FIG. 26). The system control circuit A 121 performing such detection processing is included in a second detection unit. In the foregoing description of FIGS. 25 and 26, the detection processing is described to be performed by the system control circuit A 121. However, the present exemplary embodiment is not limited thereto. For example, the controller A 123 may perform the detection processing.

The switch A 122 changes the signal group to be assigned to the terminals of the USB Type-C connector A 108 according to the result of detection by the foregoing first detection unit and that of the second detection unit (FIGS.

20A to 20C and 24A to 24D). The switch A 122 performing such assignment of the signal group constitutes a signal assignment unit.

With such a configuration, the signal group to be assigned to the terminals of the general-purpose USB connector is changed. This can provide high versatility without causing an increase in the size of the USB connector. The digital camera 100 according to the present exemplary embodiment includes the USB Type-C connector A 108 as the only external interface connector. The digital camera 100 can thus be reduced in size, compared to when the accessory shoe 204 and the remote release cable connection connector 212 are included in addition to the USB Type-C connector A 108.

Specifically, in the present exemplary embodiment described above, if the adaptor apparatus 200 is not connected, the switch A 122 assigns the signal group compliant with the USB standard (first signal group) to the terminals of the USB Type-C connector A 108 (steps S2101 and S2109 of FIG. 21).

If the adaptor apparatus 200 is connected, the switch A 122 assigns a signal group (second signal group) different from the signal group compliant with the USB standard (first signal group) to the terminals of the USB Type-C connector A 108 (steps S2106 and S2110 of FIG. 21, step S2505 of FIG. 25, and step S2605 of FIG. 26).

With such a configuration, if the adaptor apparatus 200 is not connected, the signal group compliant with the USB standard is assigned to the terminals of the USB Type-C connector A 108. This enables communication with electronic devices equipped with a communication unit of the USB standard which is prevalent in the world. If the adaptor apparatus 200 is connected, a signal group different from the one compliant with the USB standard is assigned to the terminals of the USB Type-C connector A 108. This allows use of other devices via the adaptor apparatus 200. For example, if the adaptor apparatus 200 is connected, the signals corresponding to the accessory shoe 204 and the remote release cable connection connector 212 provided on the adaptor apparatus 200 are assigned to the terminals of the USB Type-C connector A 108. The external flash unit 320 and the remote release cable 321 can thus be used via the adaptor apparatus 200.

In the present exemplary embodiment described above, the system control circuit A 121 detects whether adaptor apparatus 200 is directly connected to the USB Type-C connector A 108 (step S2105 of FIG. 21). The system control circuit A 121 performing such detection processing is included in a third detection unit. In the foregoing description of FIG. 21, the detection processing is described to be performed by the system control circuit A 121. However, the present exemplary embodiment is not limited thereto. For example, the controller A 123 may perform the detection processing.

The switch A 122 further changes the foregoing second signal group to be assigned to the terminals of the USB Type-C connector A 108 according to the result of detection by the foregoing third detection unit (steps S2106 and S2111 of FIG. 21, step S2505 of FIG. 25, and step S2605 of FIG. 26).

In the present exemplary embodiment described above, the switch A 122 assigns at least some of the signals constituting the foregoing second signal group to different terminals of the USB Type-C connector A 108 according to whether the adaptor apparatus 200 is directly connected to the USB Type-C connector A 108 (FIGS. 24A and 24C).

In the present exemplary embodiment described above, the adaptor apparatus 200 includes the USB hub 224 (branching unit) which branches the signals for performing communication compliant with the USB standard to the plurality of USB Type-C connectors D 203, 206, and 207 which are intended to connect to another device. If another device is a device capable of communication of a communication standard different from the USB standard (for example, Alt communication described above), the communication is performed without the intervention of the USB hub 224 (branching unit).

According to such a configuration, for example, communication with the device capable of the foregoing Alt communication is performed without the intervention of the USB hub 224. This enables communication with the device while satisfying the USB Type-C specifications.

In the present exemplary embodiment described above, the signal groups for the switch A 122 to assign to the terminals of the USB Type-C connector A 108 include signals for performing communications compliant with the USB 2.0 standard and the USB 3.1 standard which are a plurality of USB standards having different communication speeds.

The signal assignments to the terminals of the USB Type-C connector A 108 of the digital camera 100 illustrated in FIGS. 20A to 20C and 24A to 24D are merely examples. The exemplary embodiment of the present disclosure is not limited thereto. For example, signal assignments other than those illustrated in FIGS. 20A to 20C and 24A to 24D are also applicable to the exemplary embodiment of the present disclosure as long as the external flash unit 320 and the remote release cable 321 can be used and the signal assignments are capable of communication compliant with the USB standard (and Alt communication if needed).

The adaptor apparatus 200 illustrated in FIGS. 2A, 2B, 18, and 19 is described to include the three USB Type-C connectors D 203, 206, and 207 as its USB Type-C connectors D. However, the exemplary embodiment of the present disclosure is not limited thereto. For example, more than three USB Type-C connectors D may be provided as the USB Type-C connectors D. Less than three USB Type-C connectors D may be provided as the USB Type-C connectors D.

All the foregoing exemplary embodiments of the present disclosure are merely examples of embodiment for carrying out the present disclosure, and the technical scope of the present disclosure should not be interpreted as limited thereto. The present disclosure may be practiced in various forms without departing from the technical idea or principle characteristics thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2017-005095, filed Jan. 16, 2017, No. 2017-005273, filed Jan. 16, 2017, No. 2017-005279, filed Jan. 16, 2017, and No. 2017-005322, filed Jan. 16, 2017, which are hereby incorporated by reference herein in their entirety.

What is claimed is:

1. An imaging apparatus including a Universal Serial Bus (USB) connector compliant with a USB standard, the imaging apparatus being configured to be electrically connectable to a device including an adaptor apparatus via the USB connector, the imaging apparatus comprising:
at least one processor, the processor executing following functions in accordance with a program stored in a memory;
a first detection unit configured to detect whether the adaptor apparatus is electrically connected via the USB connector; and
a signal assignment unit configured to perform processing for changing a signal group to be assigned to terminals of the USB connector, according to a result of detection by the first detection unit whether the adaptor apparatus is connected,
wherein the signal assignment unit is configured to, in a case where the first detection unit detects that the adaptor apparatus is not connected, assign a first signal group compliant with the USB standard to the terminals of the USB connector, and in a case where the first detection unit detects that the adaptor apparatus is connected, assign a second signal group different from the first signal group to the terminals of the USB connector.

2. The imaging apparatus according to claim 1, wherein the processor executes a following function in accordance with a program stored in the memory; a second detection unit configured to detect whether the adaptor apparatus is directly connected to the USB connector,
wherein the signal assignment unit is configured to perform processing for changing the second signal group to be assigned to the terminals of the USB connector, according to a result of detection by the second detection unit whether the adaptor apparatus is directly connected.

3. The imaging apparatus according to claim 2, wherein the signal assignment unit is configured to assign at least part of signals constituting the second signal group to different terminals of the USB connector depending on a case where the second detection unit detects that the adaptor apparatus is directly connected to the USB connector and a case where the second detection unit detects that the adaptor apparatus is not directly connected to the USB connector.

4. The imaging apparatus according to claim 2,
wherein the adaptor apparatus includes an emission controller configured to control light emission of a flash unit mounted on the adaptor apparatus, and
wherein the second detection unit is configured to detect whether the adaptor apparatus is directly connected to the USB connector, according to whether communication with the emission controller is successfully established.

5. The imaging apparatus according to claim 1, wherein the signal assignment unit assigns a standard signal group of USB Type-C to the terminals of the USB connector as the first signal group.

6. The imaging apparatus according to claim 1, wherein a case where the first detection unit detects that the adaptor apparatus is electrically connected via the USB connector includes a case where the adaptor apparatus is directly connected to the USB connector and a case where the adaptor apparatus and the USB connector are electrically connected via a communication cable.

7. The imaging apparatus according to claim 1, wherein a case where the first detection unit detects that the adaptor apparatus is not electrically connected via the USB connector includes a case where a device different from the adaptor apparatus is electrically connected via the USB connector.

8. The imaging apparatus according to claim 1, wherein the USB connector is a USB Type-C connector.

9. The imaging apparatus according to claim 1, wherein the signal group for the signal assignment unit to assign to the terminals of the USB connector includes signals for performing communications compliant with a plurality of USB standards having different communication speeds.

10. The imaging apparatus according to claim 9, wherein the communications compliant with the plurality of USB standards having different communication speeds include a communication of a USB 2.0 standard and a communication of a USB 3.1 standard.

11. An imaging system comprising:
an adaptor apparatus; and
an imaging apparatus including a USB connector compliant with a USB standard, the imaging apparatus being configured to be electrically connectable to a device including the adaptor apparatus via the USB connector,
wherein the imaging apparatus includes
at least one processor, the processor executing following functions in accordance with a program stored in a memory;
a first detection unit configured to detect whether the adaptor apparatus is electrically connected via the USB connector, and
a signal assignment unit configured to perform processing for changing a signal group to be assigned to terminals of the USB connector according to a result of detection by the first detection unit whether the adaptor apparatus is connected, and
wherein the signal assignment unit is configured to, in a case where the first detection unit detects that the adaptor apparatus is not connected, assign a first signal group compliant with the USB standard to the terminals of the USB connector, and in a case where the first detection unit detects that the adaptor apparatus is connected, assign a second signal group different from the first signal group to the terminals of the USB connector.

12. A method for controlling an imaging apparatus including a USB connector compliant with a USB standard, the imaging apparatus being configured to be electrically connectable to a device including an adaptor apparatus via the USB connector, the method comprising:
performing processing for assigning a first signal group compliant with the USB standard to terminals of the USB connector in a case where the adaptor apparatus is not electrically connected via the USB connector; and
performing processing for assigning a second signal group different from the first signal group to the terminals of the USB connector in a case where the adaptor apparatus is electrically connected via the USB connector.

13. An imaging apparatus including a USB connector compliant with a USB standard, the imaging apparatus being configured to be electrically connectable to a device including an adaptor apparatus via the USB connector, the imaging apparatus comprising:
at least one processor, the processor executing following functions in accordance with a program stored in a memory;
a first detection unit configured to detect whether the adaptor apparatus is electrically connected via the USB connector;
a second detection unit configured to, in a case where the first detection unit detects that the adaptor apparatus is connected, detect whether another device connected to the adaptor apparatus is in a use state; and
a signal assignment unit configured to perform processing for changing a signal group to be assigned to terminals of the USB connector, according to a result of detection by the first detection unit and a result of detection by the second detection unit.

14. An imaging system comprising:
an adaptor apparatus; and
an imaging apparatus including a USB connector compliant with a USB standard, the imaging apparatus being configured to be electrically connectable to a device including the adaptor apparatus via the USB connector,
wherein the imaging apparatus includes
at least one processor, the processor executing following functions in accordance with a program stored in a memory;
a first detection unit configured to detect whether the adaptor apparatus is electrically connected via the USB connector,
a second detection unit configured to, in a case where the first detection unit detects that the adaptor apparatus is connected, detect whether another device connected to the adaptor apparatus is in a use state, and
a signal assignment unit configured to perform processing for changing a signal group to be assigned to terminals of the USB connector, according to a result of detection by the first detection unit and a result of detection by the second detection unit.

15. A method for controlling an imaging apparatus including a USB connector compliant with a USB standard, the imaging apparatus being configured to be electrically connectable to a device including an adaptor apparatus via the USB connector, the method comprising:
detecting as a first detection whether the adaptor apparatus is electrically connected via the USB connector;
in a case where the adaptor apparatus is detected to be connected, detecting as a second detection whether another device connected to the adaptor apparatus is in a use state; and
performing processing for changing a signal group to be assigned to terminals of the USB connector, according to a result of the first detection and a result of the second detection.

16. An imaging apparatus including a USB connector compliant with a USB standard, the imaging apparatus being configured to be electrically connectable to a device including an adaptor apparatus via the USB connector, the adaptor apparatus being capable of communications compliant with at least two USB standards having different communication speeds, the imaging apparatus comprising:
at least one processor, the processor executing following functions in accordance with a program stored in a memory;
a first detection unit configured to detect whether the adaptor apparatus is electrically connected via the USB connector;
a second detection unit configured to, in a case where the first detection unit detects that the adaptor apparatus is connected, detect whether a first device and a second device are connected to the adaptor apparatus, the first device being configured to perform a low-speed one of the communications compliant with the two USB standards, the second device being configured to perform a high-speed one of the communications; and
a signal assignment unit configured to perform processing for changing a signal group to be assigned to terminals of the USB connector according to a result of detection by the first detection unit and a result of detection by the second detection unit.

17. An imaging system comprising:
an adaptor apparatus capable of communications compliant with at least two USB standards having different communication speeds; and
an imaging apparatus including a USB connector compliant with a USB standard, the imaging apparatus being configured to be electrically connectable to a device including the adaptor apparatus via the USB connector,
wherein the imaging apparatus includes
at least one processor, the processor executing following functions in accordance with a program stored in a memory;
a first detection unit configured to detect whether the adaptor apparatus is electrically connected via the USB connector,
a second detection unit configured to, in a case where the first detection unit detects that the adaptor apparatus is connected, detect whether a first device and a second device are connected to the adaptor apparatus, the first device being configured to perform a low-speed one of the communications compliant with the two USB standards, the second device being configured to perform a high-speed one of the communications, and
a signal assignment unit configured to perform processing for changing a signal group to be assigned to terminals of the USB connector, according to a result of detection by the first detection unit and a result of detection by the second detection unit.

18. A method for controlling an imaging apparatus including a USB connector compliant with a USB standard, the imaging apparatus being configured to be electrically connectable to a device including an adaptor apparatus via the USB connector, the adaptor apparatus being capable of communications compliant with at least two USB standards having different communication speeds, the method comprising:
- detecting as a first detection whether the adaptor apparatus is electrically connected via the USB connector;
- in a case where the adaptor apparatus is detected to be connected, detecting as a second detection whether a first device and a second device are connected to the adaptor apparatus, the first device being configured to perform a low-speed one of the communications compliant with the two USB standards, the second device being configured to perform a high-speed one of the communications; and
- performing processing for changing a signal group to be assigned to terminals of the USB connector, according to a result of the first detection and a result of the second detection.

19. An imaging apparatus including a USB connector compliant with a USB standard, the imaging apparatus being configured to be electrically connectable to a device including an adaptor apparatus via the connector, the imaging apparatus comprising:
- at least one processor, the processor executing following functions in accordance with a program stored in a memory;
- a first detection unit configured to detect whether the adaptor apparatus is electrically connected via the USB connector;
- a second detection unit configured to, in a case where the first detection unit detects that the adaptor apparatus is connected, detect whether another device connected to the adaptor apparatus is a device capable of communication of a communication standard different from the USB standard; and
- a signal assignment unit configured to perform processing for changing a signal group to be assigned to terminals of the USB connector, according to a result of detection by the first detection unit and a result of detection by the second detection unit.

20. An imaging system comprising:
an adaptor apparatus; and
an imaging apparatus including a USB connector compliant with a USB standard, the imaging apparatus being configured to be electrically connectable to a device including the adaptor apparatus via the USB connector,
wherein the imaging apparatus includes
at least one processor, the processor executing following functions in accordance with a program stored in a memory;
- a first detection unit configured to detect whether the adaptor apparatus is electrically connected via the USB connector,
- a second detection unit configured to, in a case where the first detection unit detects that the adaptor apparatus is connected, detect whether another device connected to the adaptor apparatus is a device capable of communication of a communication standard different from the USB standard, and
- a signal assignment unit configured to perform processing for changing a signal group to be assigned to terminals of the USB connector, according to a result of detection by the first detection unit and a result of detection by the second detection unit.

21. A method for controlling an imaging apparatus including a USB connector compliant with a USB standard, the imaging apparatus being configured to be electrically connectable to a device including an adaptor apparatus via the USB connector, the method comprising:
- detecting as a first detection whether the adaptor apparatus is electrically connected via the USB connector;
- in a case where the adaptor apparatus is detected to be connected, detecting as a second detection whether another device connected to the adaptor apparatus is a device capable of communication of a communication standard different from the USB standard; and
- performing processing for changing a signal group to be assigned to terminals of the USB connector, according to a result of the first detection and a result of the second detection.

* * * * *